United States Patent
Yang et al.

(10) Patent No.: US 11,611,979 B2
(45) Date of Patent: Mar. 21, 2023

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/716,400

(22) Filed: Apr. 8, 2022

(65) Prior Publication Data
US 2022/0304027 A1    Sep. 22, 2022

Related U.S. Application Data

(63) Continuation of application No. PCT/KR2020/015489, filed on Nov. 6, 2020.
(Continued)

(30) Foreign Application Priority Data

Feb. 13, 2020 (KR) .......... 10-2020-0017987
May 25, 2020 (KR) .......... 10-2020-0062631

(51) Int. Cl.
*H04W 72/12* (2009.01)
*H04W 72/1273* (2023.01)
*H04L 5/00* (2006.01)
*H04W 72/0446* (2023.01)
*H04W 72/121* (2023.01)

(52) U.S. Cl.
CPC ....... *H04W 72/1273* (2013.01); *H04L 5/0053* (2013.01); *H04W 72/0446* (2013.01); *H04W 72/121* (2013.01); *H04W 72/1289* (2013.01)

(58) Field of Classification Search
CPC ......... H04W 72/1273; H04W 72/0446; H04W 72/121; H04W 72/1289; H04L 5/0053
See application file for complete search history.

(56) References Cited

U.S. PATENT DOCUMENTS

2019/0103943 A1* 4/2019 Wang .................. H04L 1/1854
2022/0232602 A1* 7/2022 Liang .................. H04L 1/1812

FOREIGN PATENT DOCUMENTS

KR    20180091019    8/2018
WO    WO2019066630    4/2019

OTHER PUBLICATIONS

Intel Corporation, "Enhancements to HARQ for NR-unlicensed," R1-1906787, Presented at 3GPP TSG RAN WG1 Meeting #97, Reno, USA, May 13-17, 2019, 13 pages.
(Continued)

*Primary Examiner* — Khaled M Kassim
*Assistant Examiner* — Zhaohui Yang
(74) *Attorney, Agent, or Firm* — Fish & Richardson P.C.

(57) ABSTRACT

The present disclosure relates to a wireless communication system, and specifically, a method and an apparatus therefor, the method comprising: receiving at least one PDSCH, wherein each PDSCH belongs to one of two PDSCH groups; receiving DCI for scheduling a PUSCH, wherein the DCI includes a single DAI related to only one of the two PDSCH groups; and transmitting the control information including an A/N codebook for at least one of the two PDSCH groups.

16 Claims, 23 Drawing Sheets

Related U.S. Application Data

(60) Provisional application No. 63/012,248, filed on Apr. 19, 2020, provisional application No. 63/007,292, filed on Apr. 8, 2020, provisional application No. 63/006,704, filed on Apr. 7, 2020, provisional application No. 62/983,554, filed on Feb. 28, 2020, provisional application No. 62/938,280, filed on Nov. 20, 2019, provisional application No. 62/936,580, filed on Nov. 17, 2019, provisional application No. 62/932,537, filed on Nov. 8, 2019, provisional application No. 62/931,743, filed on Nov. 6, 2019.

(56) References Cited

OTHER PUBLICATIONS

LG Electronics, "HARQ procedure for NR-U," R1-1910821, Presented at 3GPP TSG RAN WG1 Meeting #98bis, Chongqing, China, Oct. 14-20, 2019, 24 pages.
Samsung, "HARQ enhancements for NR-U," R1-1908467, Presented at 3GPP TSG RAN WG1 Meeting#98, Prague, CZ, Aug. 26-30, 2019, 8 pages.
Ericsson, "HARQ and scheduling enhancements for NR U," R1-1910949, Presented at 3GPP TSG RAN WG1 Meeting # 98 Bis, Chongqing, China, Oct. 14 Oct. 21, 2019, 16 pages.
Office Action in Korean Appln. No. 10-2022-7007934, dated Jul. 18, 2022, 10 pages (with English translation).
Extended European Search Report in European Appln. No. 20884146.0, dated Dec. 13, 2022, 8 pages.
ZTE & Sanechips, "Discussion on scheduling and HARQ for NR-U," R1-1905953, Presented at 3GPP TSG RAN WG1 #97, Reno, USA, May 13-17, 2019, 8 pages.

* cited by examiner

Carrier aggregation between L-band and U-band

Standalone U-band(s)

t-A/N without DAI signaling t-A/N with DAI signaling

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

Pursuant to 35 U.S.C. § 119(e), this application is a continuation of International Application No. PCT/KR2020/015489, filed on Nov. 6, 2020, which claims the benefit of earlier filing date and right of priority to U.S. Provisional Application No. 62/931,743, filed on Nov. 6, 2019, No. 62/932,537, filed on Nov. 8, 2019, No. 62/936,580, filed on Nov. 17, 2019, No. 62/938,280, filed on Nov. 20, 2019, Korean Application No. 10-2020-0017987, filed on Feb. 13, 2020, U.S. Provisional Application No. 62/983,554, filed on Feb. 28, 2020, No. 63/006,704, filed on Apr. 7, 2020, No. 63/007,292, filed on Apr. 8, 2020, No. 63/012,248, filed on Apr. 19, 2020, Korean Application No. 10-2020-0062631, filed on May 25, 2020, the contents of which are all hereby incorporated by reference herein in their entirety.

TECHNICAL FIELD

The present disclosure relates to a wireless communication system, and in more detail, relates to a method and an apparatus of transmitting and receiving a wireless signal in a wireless communication system.

BACKGROUND ART

Wireless communication systems have been widely deployed to provide various types of communication services such as voice and data. In general, a wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, etc.

SUMMARY

An object of the present disclosure is to provide a method and an apparatus of efficiently performing a wireless signal transmission/reception process.

The technical objects to be achieved by the present disclosure are not limited to the above-described technical objects, and other technical objects which are not described herein will be clearly understood by those skilled in the pertinent art from the following description.

In a first aspect of the present disclosure, a method of transmitting control information by a user equipment (UE) in a wireless communication system is provided, the method includes receiving at least one physical downlink shared channel (PDSCH), wherein each PDSCH belongs to one of two PDSCH groups; receiving downlink control information (DCI) for scheduling a physical uplink shared channel (PUSCH), wherein the DCI includes a single downlink assignment index (DAI) related to only one of the two PDSCH groups; and transmitting the control information including at least one of, first acknowledgement/negative acknowledgement (A/N) codebook for one of the two PDSCH groups, and
second A/N codebook for the other one of the two PDSCH groups, wherein, based on the control information including one of the first and second A/N codebooks which is related to most recently scheduled PDSCH group, the DAI is used to generate an A/N codebook in the control information, regardless of which PDSCH group is the most recently scheduled PDSCH group, and wherein, based on the control information including both the first and second A/N codebooks, the DAI is used to generate an A/N codebook for one of the two PDSCH groups with a lowest PDSCH group index.

In a second aspect of the present disclosure, a UE used in a wireless communication system is provided, the UE may include at least one transceiver; at least one processor; and at least one computer memory operatively connected to the at least one processor and, when executed, causing the at least one processor to perform an operation, the operation includes: receiving at least one physical downlink shared channel (PDSCH), wherein each PDSCH belongs to one of two PDSCH groups; receiving downlink control information (DCI) for scheduling a physical uplink shared channel (PUSCH), wherein the DCI includes a single downlink assignment index (DAI) related to only one of the two PDSCH groups; and transmitting the control information including at least one of, first acknowledgement/negative acknowledgement (A/N) codebook for one of the two PDSCH groups, and
second A/N codebook for the other one of the two PDSCH groups, wherein, based on the control information including one of the first and second A/N codebooks which is related to most recently scheduled PDSCH group, the DAI is used to generate an A/N codebook in the control information, regardless of which PDSCH group is the most recently scheduled PDSCH group, and wherein, based on the control information including both the first and second A/N codebooks, the DAI is used to generate an A/N codebook for one of the two PDSCH groups with a lowest PDSCH group index.

In a third aspect of the present disclosure, a device for a UE is provided, the device may include at least one processor; and at least one computer memory operatively connected to the at least one processor and, when executed, causing the at least one processor to perform an operation, the operation includes: receiving at least one physical downlink shared channel (PDSCH), wherein each PDSCH belongs to one of two PDSCH groups; receiving downlink control information (DCI) for scheduling a physical uplink shared channel (PUSCH), wherein the DCI includes a single downlink assignment index (DAI) related to only one of the two PDSCH groups; and transmitting the control information including at least one of, first acknowledgement/negative acknowledgement (A/N) codebook for one of the two PDSCH groups, and
second A/N codebook for the other one of the two PDSCH groups, wherein, based on the control information including one of the first and second A/N codebooks which is related to most recently scheduled PDSCH group, the DAI is used to generate an A/N codebook in the control information, regardless of which PDSCH group is the most recently scheduled PDSCH group, and wherein, based on the control information including both the first and second A/N codebooks, the DAI is used to generate an A/N codebook for one of the two PDSCH groups with a lowest PDSCH group index.

In a fourth aspect of the present disclosure, a computer-readable medium storing at least one computer program, when executed, causing the at least one processor to perform an operation is provided, the operation includes: receiving at least one physical downlink shared channel (PDSCH), wherein each PDSCH belongs to one of two PDSCH groups; receiving downlink control information (DCI) for scheduling a physical uplink shared channel (PUSCH), wherein the DCI includes a single downlink assignment index (DAI) related to only one of the two PDSCH groups; and transmitting the control information including at least one of, first acknowledgement/negative acknowledgement (A/N) codebook for one of the two PDSCH groups, and
second A/N codebook for the other one of the two PDSCH groups, wherein, based on the control information including one of the first and second A/N codebooks which is related to most recently scheduled PDSCH group, the DAI is used to generate an A/N codebook in the control information, regardless of which PDSCH group is the most recently scheduled PDSCH group, and wherein, based on the control information including both the first and second A/N codebooks, the DAI is used to generate an A/N codebook for one of the two PDSCH groups with a lowest PDSCH group index.

In a fifth aspect of the present disclosure, a method of receiving control information by a base station in a wireless communication system is provided, the method includes transmitting at least one physical downlink shared channel (PDSCH), wherein each PDSCH belongs to one of two PDSCH groups; transmitting downlink control information (DCI) for scheduling a physical uplink shared channel (PUSCH), wherein the DCI includes a single downlink assignment index (DAI) related to only one of the two PDSCH groups; and receiving the control information including at least one of, first acknowledgement/negative acknowledgement (A/N) codebook for one of the two PDSCH groups, and
second A/N codebook for the other one of the two PDSCH groups, wherein, based on the control information including one of the first and second A/N codebooks which is related to most recently scheduled PDSCH group, the DAI is used to generate an A/N codebook in the control information, regardless of which PDSCH group is the most recently scheduled PDSCH group, and wherein, based on the control information including both the first and second A/N codebooks, the DAI is used to generate an A/N codebook for one of the two PDSCH groups with a lowest PDSCH group index.

In a sixth aspect of the present disclosure, a base station used in a wireless communication system is provided, the base station may include at least one processor; and at least one computer memory operatively connected to the at least one processor and, when executed, causing the at least one processor to perform an operation, the operation includes: transmitting at least one physical downlink shared channel (PDSCH), wherein each PDSCH belongs to one of two PDSCH groups; transmitting downlink control information (DCI) for scheduling a physical uplink shared channel (PUSCH), wherein the DCI includes a single downlink assignment index (DAI) related to only one of the two PDSCH groups; and receiving the control information including at least one of, first acknowledgement/negative acknowledgement (A/N) codebook for one of the two PDSCH groups, and
second A/N codebook for the other one of the two PDSCH groups, wherein, based on the control information including one of the first and second A/N codebooks which is related to most recently scheduled PDSCH group, the DAI is used to generate an A/N codebook in the control information, regardless of which PDSCH group is the most recently scheduled PDSCH group, and wherein, based on the control information including both the first and second A/N codebooks, the DAI is used to generate an A/N codebook for one of the two PDSCH groups with a lowest PDSCH group index.

Preferably, based on A/N feedback for only one PDSCH group among the two PDSCH groups being indicated from a base station, the control information may include only an A/N codebook for the most recently scheduled PDSCH group.

Preferably, based on A/N feedback for the two PDSCH groups being indicated from a base station, the control information may include both the first and second A/N codebooks.

Preferably, based on the control information including both the first and second A/N codebooks, a size of an A/N codebook for a remaining PDSCH group among the two PDSCH groups may be determined based on a total-DAI used for scheduling a PDSCH of corresponding PDSCH group.

Preferably, the control information may be transmitted in an unlicensed band.

According to the present disclosure, it is possible to efficiently transmit and receive wireless signals in a wireless communication system.

Effects achievable by the present disclosure are not limited to the above-described effects, and other effects which are not described herein may be clearly understood by those skilled in the pertinent art from the following description.

DESCRIPTION DRAWINGS

Accompanying drawings included as part of detailed description for understanding the present disclosure provide embodiments of the present disclosure and describe technical features of the present disclosure with detailed description.

DETAILED DESCRIPTION

The following description may be used for a variety of radio access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by a radio technology such as Universal Terrestrial Radio Access (UTRA) or CDMA2000. TDMA may be implemented by a radio technology such as Global System for Mobile communications (GSM)/General Packet Radio Service (GPRS)/Enhanced Data Rates for GSM Evolution (EDGE). OFDMA may be implemented by a radio technology such as IEEE 802.11 (Wi-Fi), IEEE 802.16 (WiMAX), IEEE 802-20, Evolved UTRA (E-UTRA), etc. UTRA is a part of the Universal Mobile Telecommunications System (UMTS). 3GPP (3rd Generation Partnership Project) long term evolution (LTE) is a part of an Evolved UMTS (E-UMTS) using E-UTRA and LTE-A (Advanced) is an advanced version of 3GPP LTE. 3GPP NR (New Radio or New Radio Access Technology) is an advanced version of 3GPP LTE/LTE-A.

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure.

To clarify description, it is described based on a 3GPP NR, but a technical idea of the present disclosure is not limited thereto.

In a wireless communication system, a user equipment receives information through a downlink (DL) from a base station, and a user equipment transmits information through an uplink (UL) to a base station. Information transmitted and received between a base station and a user equipment includes data and various control information, and various physical channels exist according to the type/use of the information they transmit and receive.

Figure 1:
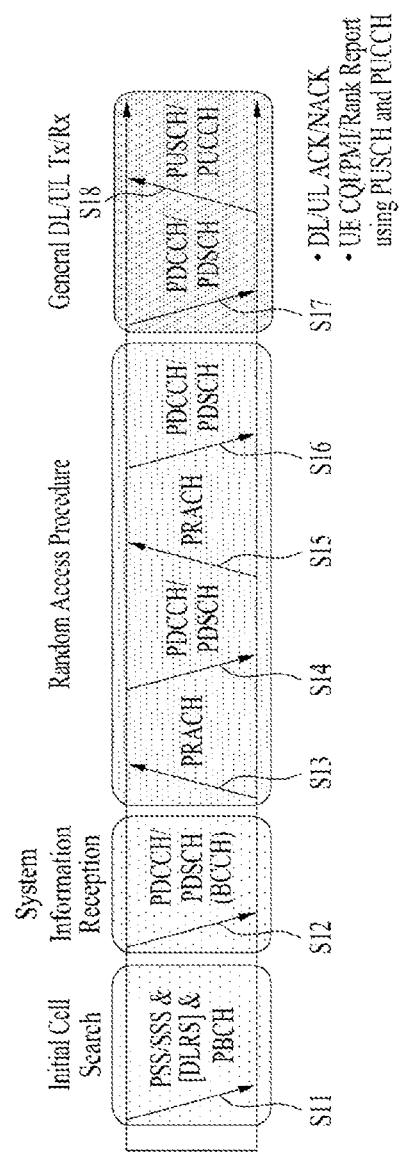
FIG. 1 illustrates physical channels used in a 3GPP system, which is an example of a wireless communication system, and a general signal transmission method using them.

FIG. 1 illustrates physical channels used in a 3GPP NR system, and a general signal transmission method using them.

When a terminal is turned on or newly enters a cell in a state in which the terminal was turned off, it performs an initial cell search by including synchronization with a base station or the like in step S101. For the initial cell search, a terminal receives a synchronization signal block (SSB) from a base station. SSB includes a primary synchronization signal (PSS), a secondary synchronization signal (SSS) and a physical broadcast channel (PBCH). A terminal synchronizes with a base station based on PSS/SSS, and obtains information such as cell identifier (ID), etc. In addition, a terminal may obtain broadcasting information in a cell based on a PBCH. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to a physical downlink control channel in step S102.

Thereafter, a terminal may perform a random access procedure such as steps S103 to S106 to complete access to a base station. For the random access procedure, a terminal may transmit a preamble through a physical random access channel (PRACH) (S103), and may receive a response message to a preamble through a physical downlink control channel and a corresponding physical downlink shared channel (S104). In a case of contention based random access, a contention resolution procedure may be performed such as transmission of an additional physical random access channel (S105) and reception of a physical downlink control channel and a corresponding physical downlink shared channel (S106).

A terminal which performed the above-described procedure subsequently may perform a physical downlink control channel/a physical downlink shared channel reception (S107) and a physical uplink shared channel (PUSCH)/a physical uplink control channel (PUCCH) transmission (S108) as a general uplink/downlink signal transmission procedure. Control information transmitted by a terminal to a base station is referred to as uplink control information (UCI). UCI includes a Hybrid Automatic Repeat and reQuest Acknowledgment/Negative-ACK (HARQ ACK/NACK), a Scheduling Request (SR), a Channel State Information (CSI), etc. CSI includes a Channel Quality Indicator (CQI), a Precoding Matrix Indicator (PMI), a Rank Indication (RI), etc. The UCI is generally transmitted through PUCCH, but may be transmitted through PUSCH when control information and traffic data are to be transmitted at the same time. In addition, the UCI may be transmitted aperiodically through PUSCH according to a request/indication of a network.

Figure 2:
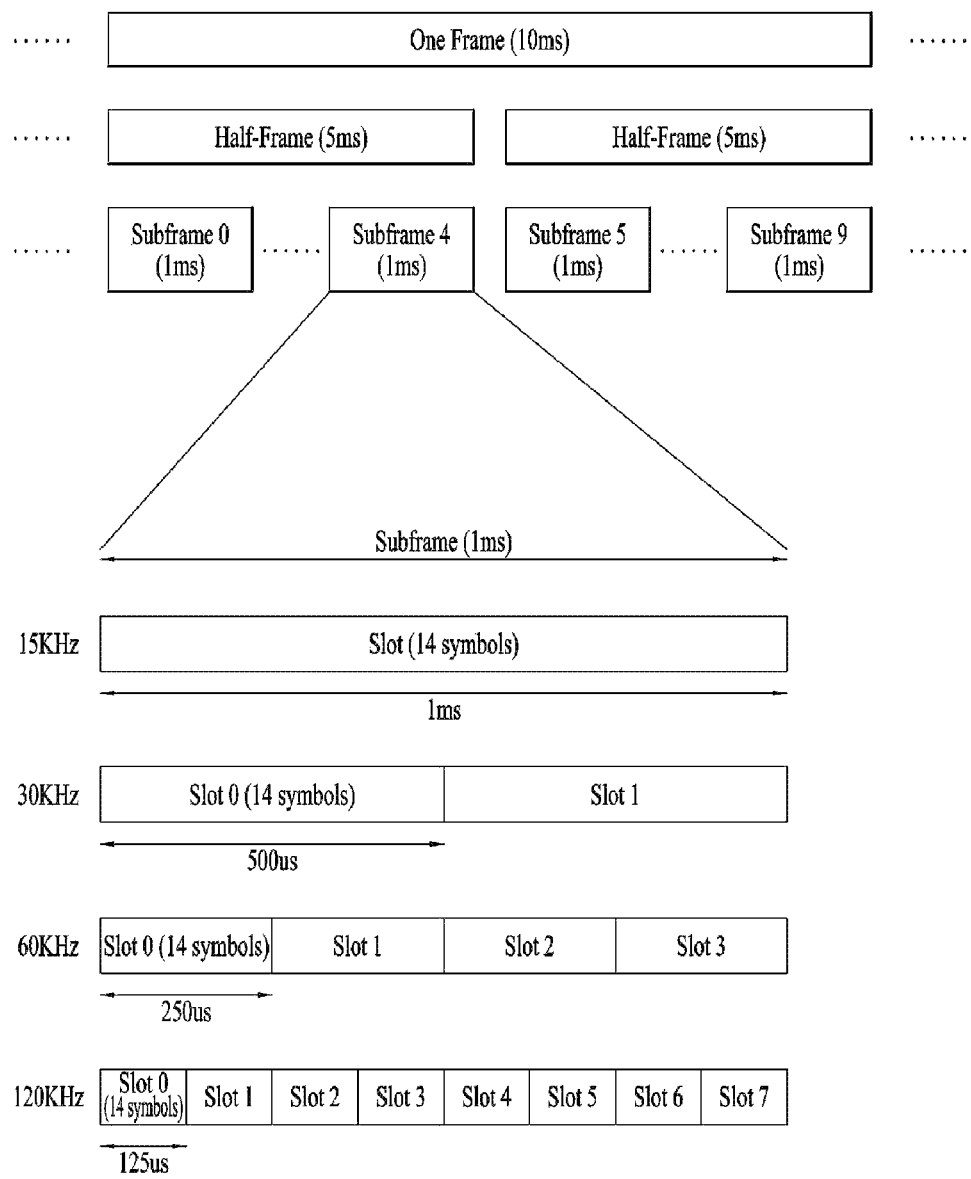
FIG. 2 illustrates a frame structure.

FIG. 2 illustrates a frame structure. In NR, uplink and downlink transmission is configured as frames. Each radio frame has a length of 10 ms and is divided into two 5 ms half-frames (HF). Each half-frame is divided into 5 1 ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 illustrates that the number of symbols per slot, the number of slots per frame, and the number of slots per subframe vary according to SCS when a normal CP is used.

TABLE 1

| SCS (15*2^u)   | $N^{slot}_{symb}$ | $N^{frame, u}_{slot}$ | $N^{subframe, u}_{slot}$ |
|----------------|-------------------|-----------------------|--------------------------|
| 15 KHz (u = 0) | 14                | 10                    | 1                        |
| 30 KHz (u = 1) | 14                | 20                    | 2                        |
| 60 KHz (u = 2) | 14                | 40                    | 4                        |

TABLE 1-continued

| SCS (15*2^u) | $N^{slot}_{symb}$ | $N^{frame, u}_{slot}$ | $N^{subframe, u}_{slot}$ |
|---|---|---|---|
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: the number of slots in a frame
* $N^{subframe, u}_{slot}$: the number of slots in a subframe Table 2 illustrates that the number of symbols per slot, the number of slots per frame, and the number of slots per subframe vary according to SCS, when an extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

A structure of a frame is merely an example, and the number of subframes, the number of slots, and the number of symbols in a frame may be variously changed.

In a NR system, OFDM numerology (e.g., SCS) may be configured differently between a plurality of cells aggregated into one UE. Accordingly, an (absolute time) duration of a time resource (e.g., SF, slot, or TTI) (referred to as TU (Time Unit) for convenience) composed of the same number of symbols may be configured differently between aggregated cells. Here, the symbol may include an OFDM symbol (or a CP-OFDM symbol) and an SC-FDMA symbol (or a Discrete Fourier Transform-spread-OFDM, DFT-s-OFDM symbol).

Figure 3:
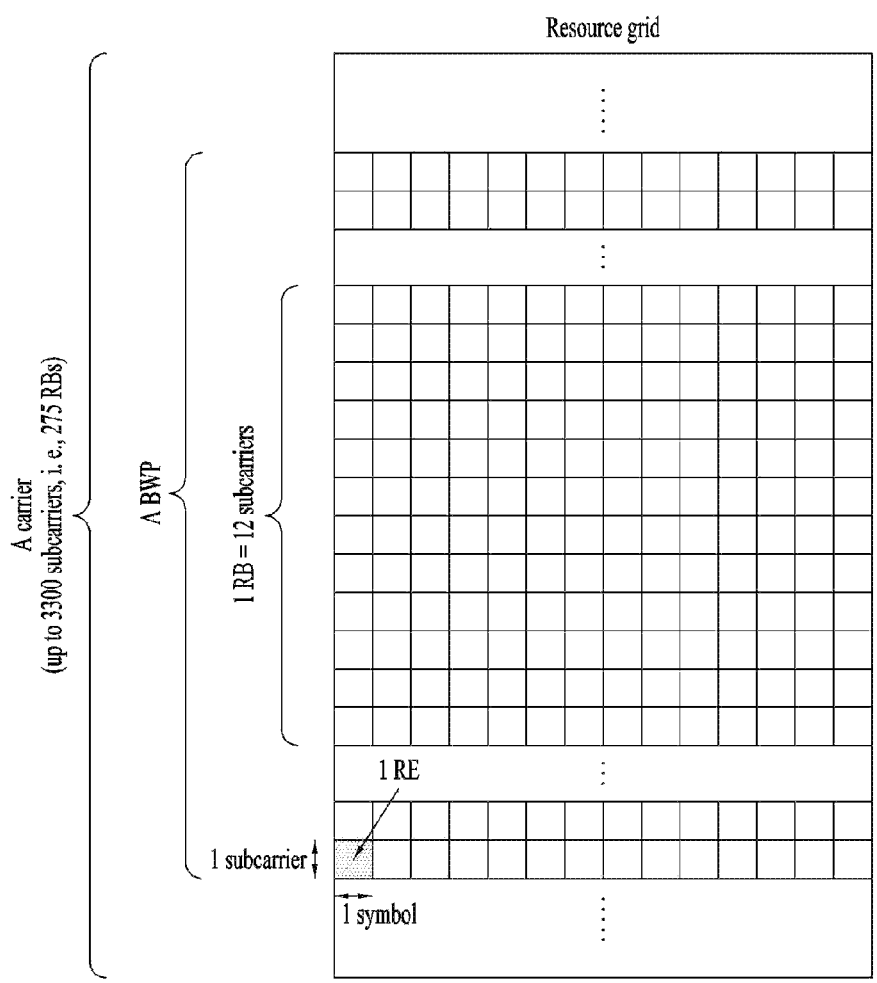
FIG. 3 illustrates a resource grid of a slot.

FIG. 3 illustrates a resource grid of a slot. A slot includes a plurality of symbols in a time domain. For example, in the case of a normal CP, one slot includes 14 symbols, but in the case of an extended CP, one slot includes 12 symbols. The carrier includes a plurality of subcarriers in a frequency domain. A resource block (RB) is defined as a plurality (e.g., 12) of consecutive subcarriers in a frequency domain. A bandwidth part (BWP) is defined as a plurality of consecutive physical RBs (PRBs) in a frequency domain, and may correspond to one numerology (e.g., SCS, CP length, etc.). A carrier may include a maximum of N (e.g., 5) BWPs. Data communication is performed through an activated BWP, and only one BWP can be activated for one UE. Each element in the resource grid is referred to as a resource element (RE), and one complex symbol may be mapped.

Figure 4:
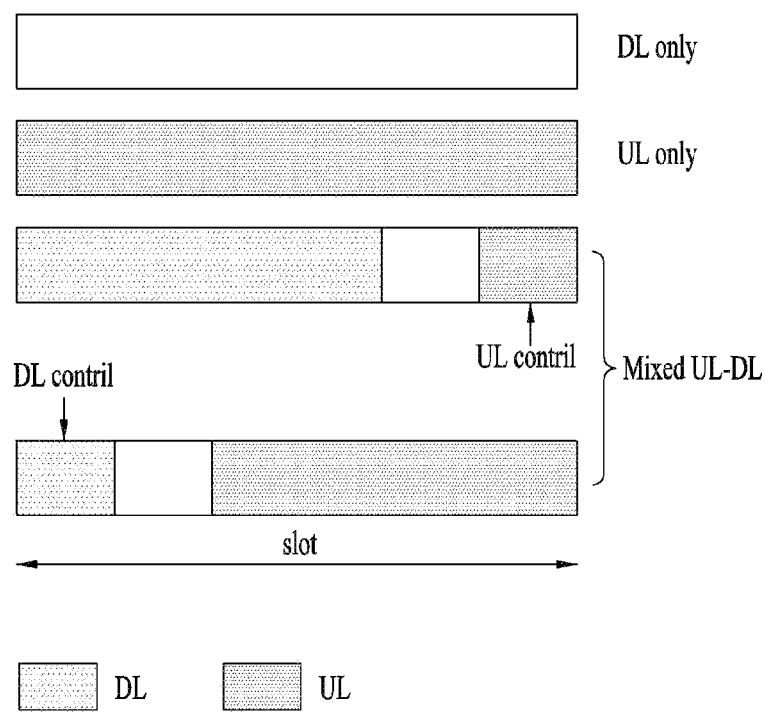
FIG. 4 illustrates a structure of a self-contained slot.

FIG. 4 illustrates a structure of a self-contained slot. In a NR system, a frame is characterized by a self-contained structure in which a DL control channel, DL or UL data, and a UL control channel can all be included in one slot. For example, the first N symbols in a slot may be used to transmit a DL control channel (hereinafter, DL control region), and the last M symbols in a slot may be used to transmit a UL control channel (hereinafter, UL control region). N and M are each an integer greater than or equal to 0. A resource region (hereinafter, referred to as a data region) between the DL control region and the UL control region may be used for DL data transmission or for UL data transmission. A time gap for DL-to-UL or UL-to-DL switching may exist between the control region and the data region.

Figure 5:
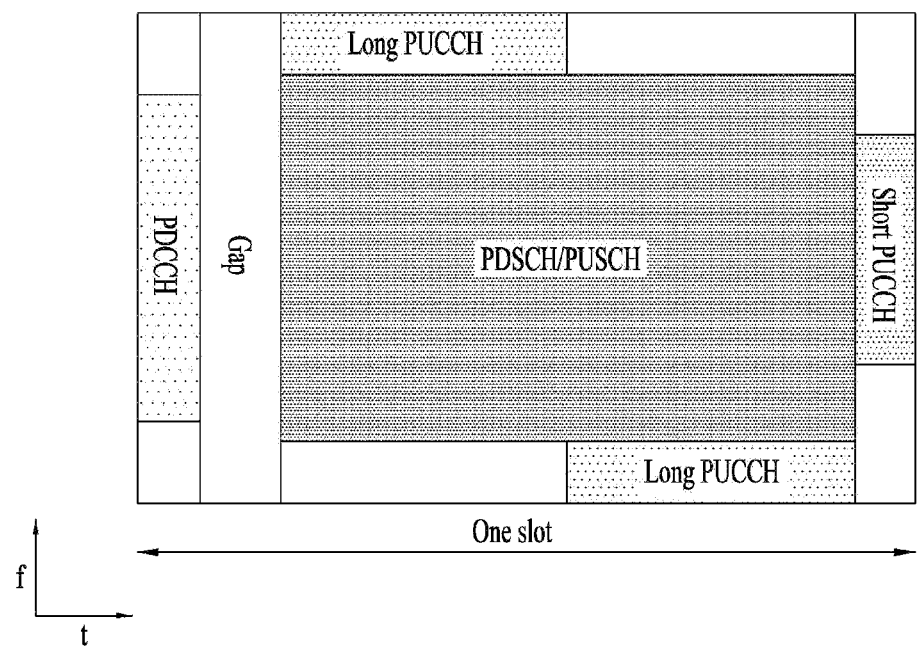
FIG. 5 illustrates an example in which a physical channel is mapped in a self-contained slot.

As an example, the following configuration may be considered. Each duration is listed in chronological order.
1. DL only configuration
2. UL only configuration
3. Mixed UL-DL configuration
   DL region+Guard Period (GP)+UL control region
   DL control region+GP+UL region
   DL region: (i) DL data region, (ii) DL control region+DL data region
   UL region: (i) UL data region, (ii) UL data region+UL control region FIG. 5 illustrates an example in which a physical channel is mapped in a self-contained slot. A PDCCH may be transmitted in a DL control region, and a PDSCH may be transmitted in a DL data region. A PUCCH may be transmitted in a UL control region, and a PUSCH may be transmitted in a UL data region. A GP provides a time gap in the process of a base station and a UE switching from a transmission mode to a reception mode or in the process of switching from a reception mode to a transmission mode. Some symbols of the time of switching from DL to UL in a subframe may be configured to GP.

Hereinafter, each physical channel will be described in more detail.

A PDCCH carries Downlink Control Information (DCI). For example, PCCCH (i.e., DCI) carries a transmission format and resource allocation of a downlink shared channel (DL-SCH), resource allocation information for an uplink shared channel (UL-SCH), paging information for a paging channel (PCH), system information on a DL-SCH, resource allocation information for a higher layer control message such as a random access response transmitted on a PDSCH, a transmission power control command, activation/deactivation of Configured Scheduling (CS), etc. DCI includes a cyclic redundancy check (CRC), and a CRC is masked/scrambled with various identifiers (e.g., Radio Network Temporary Identifier, RNTI) according to an owner or use purpose of a PDCCH. For example, if a PDCCH is for a specific UE, a CRC is masked with a UE identifier (e.g., Cell-RNTI, C-RNTI). If a PDCCH relates to paging, a CRC is masked with a Paging-RNTI (P-RNTI). If a PDCCH relates to system information (e.g., System Information Block, SIB), a CRC is masked with a System Information RNTI (SI-RNTI). If a PDCCH relates to a random access response, a CRC is masked with a random access-RNTI (RA-RNTI).

A PDCCH is configured as 1, 2, 4, 8, 16 CCEs (Control Channel Elements) according to an Aggregation Level (AL). A CCE is a logical allocation unit used to provide a PDCCH of a predetermined code rate according to a radio channel state. A CCE includes 6 REGs (Resource Element Groups). A REG is defined by one OFDM symbol and one (P)RB. A PDCCH is transmitted through a control resource set (CORESET). A CORESET is defined as a set of REGs with a given numerology (e.g., SCS, CP length, etc.). A plurality of CORESETs for one UE may overlap in a time/frequency domain. A CORESET may be configured by system information (e.g., Master Information Block, MIB) or UE-specific higher layer (e.g., Radio Resource Control, RRC, layer) signaling. Specifically, the number of RBs and the number of OFDM symbols (maximum 3) included CORESET may be configured by higher layer signaling.

For PDCCH reception/detection, a UE monitors PDCCH candidates. A PDCCH candidate represents CCE(s) that a UE is required to monitor for PDCCH detection. Each PDCCH candidate is defined as 1, 2, 4, 8, or 16 CCEs according to an AL. Monitoring includes (blind) decoding of PDCCH candidates. A set of PDCCH candidates monitored by a UE is defined as a PDCCH search space (SS). A search space includes a common search space (CSS) or a UE-specific search space (USS). A UE may acquire DCI by monitoring PDCCH candidates in one or more search spaces configured by MIB or higher layer signaling. Each CORESET is associated with one or more search spaces, and each search space is associated with one CORESET. A search space may be defined based on the following parameters.

controlResourceSetId: indicates a CORESET associated with a search space monitoringSlotPeriodicityAndOffset: indicates a PDCCH monitoring period (slot unit) and a PDCCH monitoring duration offset (slot unit)

monitoringSymbolsWithinSlot: indicates the PDCCH monitoring symbol in the slot (eg indicates the first symbol(s) of CORESET)

nrofCandidates: indicates the number of PDCCH candidates (one of 0, 1, 2, 3, 4, 5, 6, 8) for each AL={1, 2, 4, 8, 16}

An occasion (e.g., time/frequency resource) to monitor PDCCH candidates is defined as a PDCCH (monitoring) occasion. One or more PDCCH (monitoring) occasions may be configured within a slot.

Table 3 illustrates the features of each search space type

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 illustrates DCI formats transmitted on a PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used for scheduling a TB-based (or TB-level) PUSCH, and DCI format 0_1 may be used for scheduling a TB-based (or TB-level) PUSCH or a CBG (Code Block Group)-based (or CBG-level) PUSCH. DCI format 1_0 may be used for scheduling a TB-based (or TB-level) PDSCH, and DCI format 1_1 may be used for scheduling a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 is used for transmitting dynamic slot format information (e.g., dynamic SFI) to a UE, and DCI format 2_1 is used for transmitting downlink pre-emption information to a UE. DCI format 2_0 and/or DCI format 2_1 may be transmitted to user equipments in a corresponding group through a group common PDCCH, which is a PDCCH transmitted to UEs defined as one group.

DCI format 0_0 and DCI format 1_0 may be referred to as a fallback DCI format, and DCI format 0_1 and DCI format 1_1 may be referred to as a non-fallback DCI format. A fallback DCI format has the same DCI size/field configuration regardless of a UE configuration. On the other hand, a non-fallback DCI format has a different DCI size/field configuration according to a UE configuration.

A PDSCH carries downlink data (e.g., DL-SCH transport block, DL-SCH TB), and modulation methods such as QPSK (Quadrature Phase Shift Keying), 16 QAM (Quadrature Amplitude Modulation), 64 QAM, 256 QAM, etc. are applied to the PDSCH. A codeword is generated by encoding a TB. A PDSCH can carry up to two codewords. Scrambling and modulation mapping are performed for each codeword, and modulation symbols generated from each codeword may be mapped to one or more layers. Each layer is mapped to a resource together with a demodulation reference signal (DMRS), is generated as an OFDM symbol signal, and is transmitted through a corresponding antenna port.

A PUCCH carries Uplink Control Information (UCI). UCI includes:

SR (Scheduling Request): It is information used to request a UL-SCH resource.

Hybrid Automatic Repeat reQuest (HARQ)-ACK (Acknowledgment): It is a response to a downlink data packet (e.g., codeword) on the PDSCH. It indicates whether a downlink data packet has been successfully received. 1 bit of HARQ-ACK may be transmitted in response to a single codeword, and 2 bits of HARQ-ACK may be transmitted in response to two codewords. A HARQ-ACK response includes positive ACK (simply, ACK), negative ACK (NACK), DTX or NACK/DTX. Here, HARQ-ACK includes HARQ ACK/NACK and ACK/NACK.

CSI (Channel State Information): It is feedback information for a downlink channel. Multiple Input Multiple Output (MIMO)-related feedback information includes a Rank Indicator (RI) and a Precoding Matrix Indicator (PMI).

Table 5 illustrates PUCCH formats. According to the PUCCH transmission length, it can be divided into Short PUCCH (formats 0, 2) and Long PUCCH (formats 1, 3, 4).

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |

TABLE 5-continued

| PUCCH format | Length in OFDM symbols $N_{symb}^{PUCCH}$ | Number of bits | Usage | Etc |
|---|---|---|---|---|
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a maximum size of 2 bits, and is mapped based on a sequence and transmitted. Specifically, a UE transmits specific UCI to a base station by transmitting one of a plurality of sequences through a PUCCH with PUCCH format 0. A UE transmits a PUCCH with PUCCH format 0 in a PUCCH resource for configuring a corresponding SR only when transmitting a positive SR.

PUCCH format 1 carries UCI having a maximum size of 2 bits, and a modulation symbol is spread by an orthogonal cover code (OCC) (which is configured differently according to whether or not frequency hopping is performed) in a time domain. A DMRS is transmitted in a symbol in which a modulation symbol is not transmitted (that is, time division multiplexing (TDM) is performed and transmitted).

PUCCH format 2 carries UCI having a bit size greater than 2 bits, and a modulation symbol is transmitted by frequency division multiplexing (FDM) with a DMRS. A DM-RS is located at symbol indexes #1, #4, #7, and #10 in a given resource block with a density of ⅓. A Pseudo Noise (PN) sequence is used for a DM_RS sequence. For 2-symbol PUCCH format 2, frequency hopping may be activated.

In PUCCH format 3, UE multiplexing is not performed in the same physical resource blocks, and the PUCCH format 3 carrier UCI having a bit size greater than 2 bits. In other words, a PUCCH resource of PUCCH format 3 does not include an orthogonal cover code. A modulation symbol is transmitted by time division multiplexing (TDM) with a DMRS.

PUCCH format 4 supports multiplexing up to 4 UEs in the same physical resource blocks, and carries UCI having a bit size greater than 2 bits. In other words, a PUCCH resource of PUCCH format 3 includes an orthogonal cover code. The modulation symbol is transmitted by time division multiplexing (TDM) with a DMRS.

A PUSCH carries uplink data (e.g., UL-SCH transport block, UL-SCH TB) and/or uplink control information (UCI), and is transmitted based on a CP-OFDM (Cyclic Prefix-Orthogonal Frequency Division Multiplexing) waveform or a DFT-s-OFDM (Discrete Fourier Transform-spread-Orthogonal Frequency Division Multiplexing) waveform. When a PUSCH is transmitted based on a DFT-s-OFDM waveform, a UE transmits a PUSCH by applying transform precoding. For example, when transform precoding is not possible (e.g., transform precoding is disabled), a UE transmits a PUSCH based on a CP-OFDM waveform, and when transform precoding is possible (e.g., transform precoding is enabled), a UE transmits a PUSCH based on a CP-OFDM waveform or a DFT-s-OFDM waveform. PUSCH transmission may be dynamically scheduled by a UL grant in DCI, or scheduled based on higher layer (e.g., RRC) signaling (and/or Layer 1 (L1) signaling (e.g., PDCCH)) semi-statically (configured grant). PUSCH transmission may be performed on a codebook-based transmission or a non-codebook-based transmission.

Figure 6:
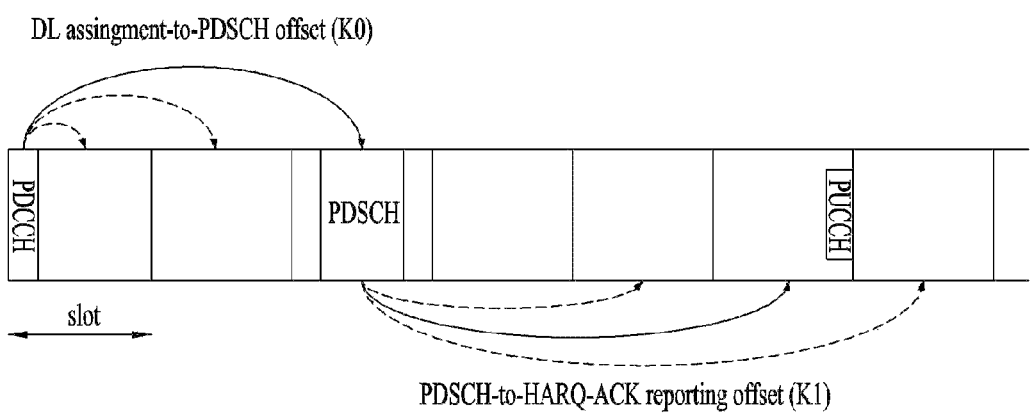
FIG. 6 illustrates the ACK/NACK transmission process.

FIG. 6 illustrates the ACK/NACK transmission process. Referring to FIG. 6, a UE may detect a PDCCH in slot #n. Here, a PDCCH includes downlink scheduling information (e.g., DCI formats 1_0 and 1_1), and the PDCCH indicates a DL assignment-to-PDSCH offset (K0) and a PDSCH-HARQ-ACK reporting offset (K1). For example, DCI formats 1_0 and 1_1 may include the following information.

Frequency domain resource assignment: indicates a RB set allocated to a PDSCH

Time domain resource assignment: K0, indicates a starting position (e.g., OFDM symbol index) and a length (e.g., number of OFDM symbols) of a PDSCH in a slot PDSCH-to-HARQ_feedback timing indicator: indicates K1

HARQ process number (4 bits): indicates a HARQ process ID (Identity) for data (e.g., PDSCH, TB)

Thereafter, a UE may receive a PDSCH in a slot #(n+K0) according to scheduling information of slot #n, and then transmit UCI through PUCCH in a slot #(n+K1). Here, UCI includes a HARQ-ACK response for a PDSCH. If a PDSCH is configured to transmit up to 1 TB, a HARQ-ACK response may be configured with 1-bit. When a PDSCH is configured to transmit up to 2 TBs, a HARQ-ACK response may be configured with 2-bits when spatial bundling is not configured, and may be configured with 1-bits when spatial bundling is configured. When the HARQ-ACK transmission time for a plurality of PDSCHs is designated as a slot #(n+K1), UCI transmitted in a slot #(n+K1) includes HARQ-ACK responses for the plurality of PDSCHs.

Table 6 exemplifies a PDSCH-to-HARQ_feedback timing indicator (K1). The PDSCH-to-HARQ_feedback timing indicator may be configured with 1 to 3 bits.

TABLE 6

| 1 bit | 2 bits | 3 bits | Number of slots k |
|---|---|---|---|
| 0 | 00 | 000 | 1st value provided dl-DataToUL-ACK |
| 1 | 01 | 001 | 2nd value provided dl-DataToUL-ACK |
| | 10 | 010 | 3rd value provided dl-DataToUL-ACK |
| | 11 | 011 | 4th value provided dl-DataToUL-ACK |
| | | 100 | 5th value provided dl-DataToUL-ACK |
| | | 101 | 6th value provided dl-DataToUL-ACK |
| | | 10 | 7th value provided dl-DataToUL-ACK |
| | | 11 | 8th value provided dl-DataToUL-ACK | dl-DataToUL-ACK is a value configured through a higher layer (e.g., RRC) signal. When dl-DataToUL-ACK is set to a value of 0 or more, it is applicable to indicate PDSCH-to-HARQ timing. Meanwhile, DataToUL-ACK may also be set to an inapplicable value (e.g., a negative number or a non-numeric value). In this case, dl-DataToUL-ACK cannot be used to indicate PDSCH-to-HARQ timing.

A plurality of parallel DL HARQ processes exist for DL transmission in a base station/UE. A plurality of parallel HARQ processes allow DL transmissions to be performed continuously while waiting for HARQ feedback on successful or unsuccessful reception of previous DL transmission. Each HARQ process is associated with a HARQ buffer of a MAC (Medium Access Control) layer. Each DL HARQ process manages state variables related to the number of transmissions of a MAC PDU (Physical Data Block) in a buffer, HARQ feedback for a MAC PDU in a buffer, and a current redundancy version, etc. Each HARQ process is identified by a HARQ process ID.

Figure 7:
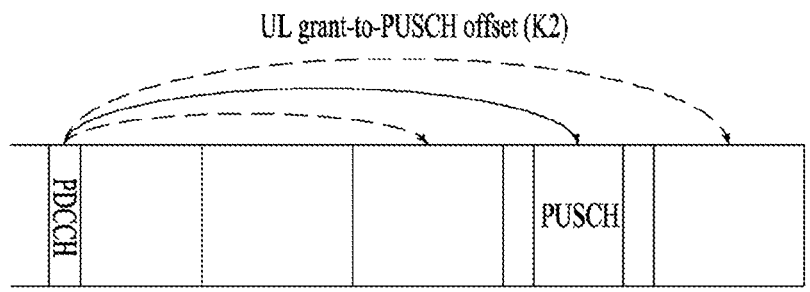
FIG. 7 illustrates a PUSCH (Physical Uplink Shared Channel) transmission process.

FIG. 7 illustrates a PUSCH (Physical Uplink Shared Channel) transmission process. Referring to FIG. 7, a UE may detect a PDCCH in a slot #n. Here, a PDCCH includes uplink scheduling information (e.g., DCI formats 0_0, 0_1). DCI formats 0_0 and 0_1 may include the following information.

Frequency domain resource assignment: indicates a set of RBs allocated to a PUSCH Time domain resource assignment: indicates a slot offset K2, a starting position (e.g., symbol index) and a length (e.g., number of OFDM symbols) of a PUSCH in a slot. A start symbol and a length may be indicated through a Start and Length Indicator Value (SLIV) or may be indicated respectively.

Thereafter, a UE may transmit a PUSCH in a slot #(n+K2) according to scheduling information of a slot #n. Here, PUSCH includes UL-SCH TB.

Figure 8:
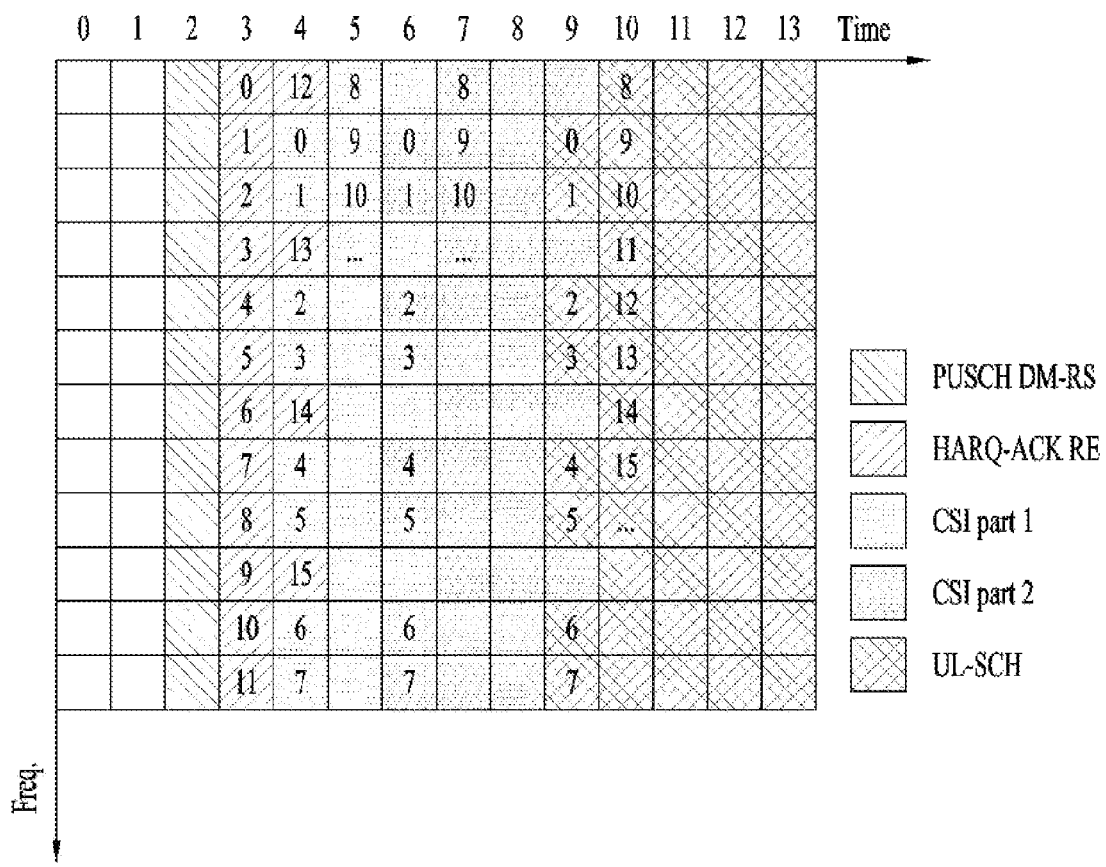
FIG. 8 illustrates an example of multiplexing control information to PUSCH.

FIG. 8 illustrates an example of multiplexing UCI to PUSCH. When a plurality of PUCCH resources and PUSCH resources overlap within a slot and simultaneous PUCCH-PUSCH transmission is not configured, UCI may be transmitted through PUSCH as shown (UCI piggyback or PUSCH piggyback). FIG. 8 illustrates a case in which HARQ-ACK and CSI are carried on a PUSCH resource.

Figure 9A:
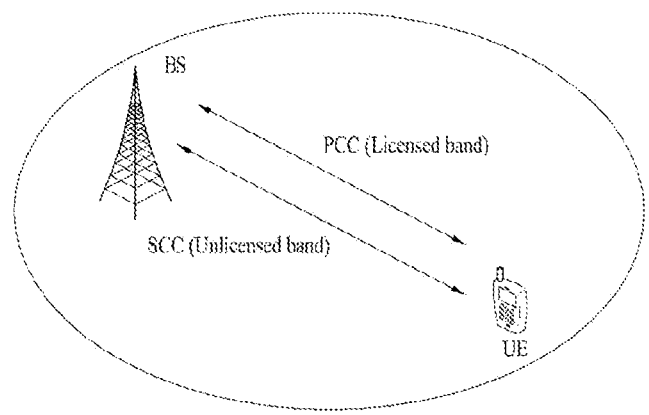
FIGS. 9A and 9B illustrate examples of a wireless communication system supporting an unlicensed band.
Figure 9B:
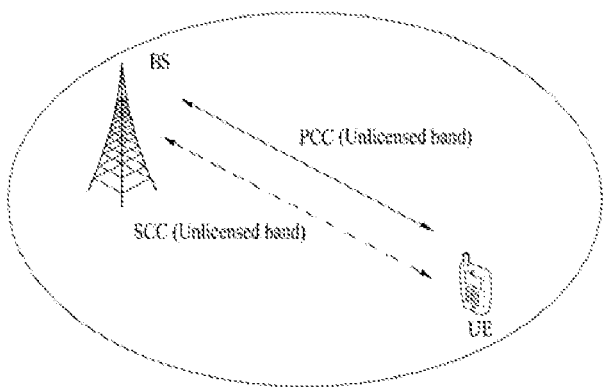

FIGS. 9A and 9B illustrate examples of a wireless communication system supporting an unlicensed band. For convenience, a cell operating in a licensed band (hereinafter, L-band) is defined as an LCell, and a carrier of the LCell is defined as a (DL/UL) Licensed Component Carrier (LCC). In addition, a cell operating in an unlicensed band (hereinafter, U-band) is defined as a UCell, and a carrier of the UCell is defined as an (DL/UL) Unlicensed Component Carrier (UCC). A carrier of a cell may mean an operating frequency (e.g., a center frequency) of the cell. A cell/carrier (e.g., Component Carrier, CC) may be referred to as a cell.

When carrier aggregation (CA) is supported, one UE may transmit/receive a signal to/from a base station through a plurality of aggregated cells/carriers. When a plurality of CCs are configured for one UE, one CC may be configured as a PCC (Primary CC), and the remaining CCs may be configured as SCCs (Secondary CC). Specific control information/channel (e.g., CSS PDCCH, PUCCH) may be configured to be transmitted/received only through a PCC. Data may be transmitted and received through a PCC/SCC. FIG. 9A illustrates a case in which a UE and a base station transmit and receive signals through an LCC and a UCC (non-standalone (NSA) mode). In this case, an LCC may be configured to a PCC and a UCC may be configured to a SCC. When a plurality of LCCs are configured in a UE, one specific LCC may be configured as a PCC and the remaining LCCs may be configured as SCCs. FIG. 9A corresponds to LAA of a 3GPP LTE system. FIG. 9B illustrates a case in which a UE and a base station transmit and receive signals through one or more UCCs without any LCC (standalone mode (SA)). In this case, one of the UCCs may be configured as a PCC and the other UCCs may be configured as SCCs. Accordingly, PUCCH, PUSCH, PRACH transmission, etc. may be supported in a NR UCell. In an unlicensed band of a 3GPP NR system, both an NSA mode and an SA mode may be supported.

Figure 10:
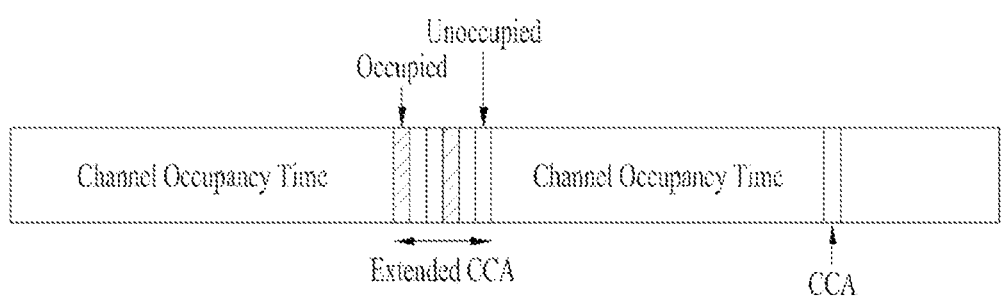
FIG. 10 illustrates a method for occupying a resource in an unlicensed band.

FIG. 10 illustrates a method for occupying a resource in an unlicensed band. According to regional regulations on unlicensed bands, communication nodes in unlicensed bands should determine whether other communication node(s) use channels before signal transmission. Specifically, a communication node may first perform CS (Carrier Sensing) before transmitting a signal to check whether other communication node(s) are transmitting a signal. A case in which it is determined that other communication node(s) does not transmit a signal is defined as CCA (Clear Channel Assessment) has been confirmed. If there is a pre-defined CCA threshold or a CCA threshold configured by higher layer (e.g., RRC) signaling, a communication node determines channel state as busy if energy higher than the CCA threshold is detected in a channel, otherwise channel state may be considered as idle. For reference, in the Wi-Fi standard (802.11ac), a CCA threshold is defined as −62 dBm for a non-Wi-Fi signal and −82 dBm for a Wi-Fi signal. If it is determined that channel state is idle, a communication node may start transmitting a signal in a UCell. The above-described series of procedures may be referred to as a Listen-Before-Talk (LBT) or a Channel Access Procedure (CAP). A LBT and a CAP may be equivalent.

In Europe, two LBT operations are exemplified as FBE (Frame Based Equipment) and LBE (Load Based Equipment). In FBE, a channel occupancy time (e.g., 1-10 ms), which means the time during which a communication node can continue to transmit when the communication node succeeds in accessing a channel, and an idle period corresponding to at least 5% of the channel occupancy time are included in one fixed frame, and CCA is defined as an operation of observing a channel during a CCA slot (at least 20 μs) at the end of the idle period. A communication node periodically performs CCA in units of fixed frames, and when a channel is unoccupied, it transmits data during a channel occupied time, and when a channel is occupied, it waits until a CCA slot of a next cycle.

On the other hand, in the case of LBE, a communication node first configures a value of q∈{4, 5, . . . , 32}, and then performs CCA for one CCA slot. When a channel is unoccupied in a first CCA slot, data can be transmitted by securing time of maximum (13/32)q ms length. If a channel is occupied in a first CCA slot, a communication node randomly selects a value of N∈{1, 2, . . . , q} and stores it as an initial value of a counter, and then while sensing channel state in units of CCA slots, when a channel is unoccupied in units of CCA slots, the value stored in the counter is decremented by one. When the counter value becomes 0, a communication node may transmit data by securing a time of maximum (13/32)q ms length.

Specifically, a plurality of CAP Type (i.e., LBT Type) for uplink transmission in an unlicensed band may be defined. For example, a Type 1 or Type 2 CAP may be defined for uplink transmission. A UE may perform a CAP (e.g., Type 1 or Type 2) configured/indicated by a base station for uplink signal transmission.

(1) Type 1 Uplink CAP Method

Figure 11:
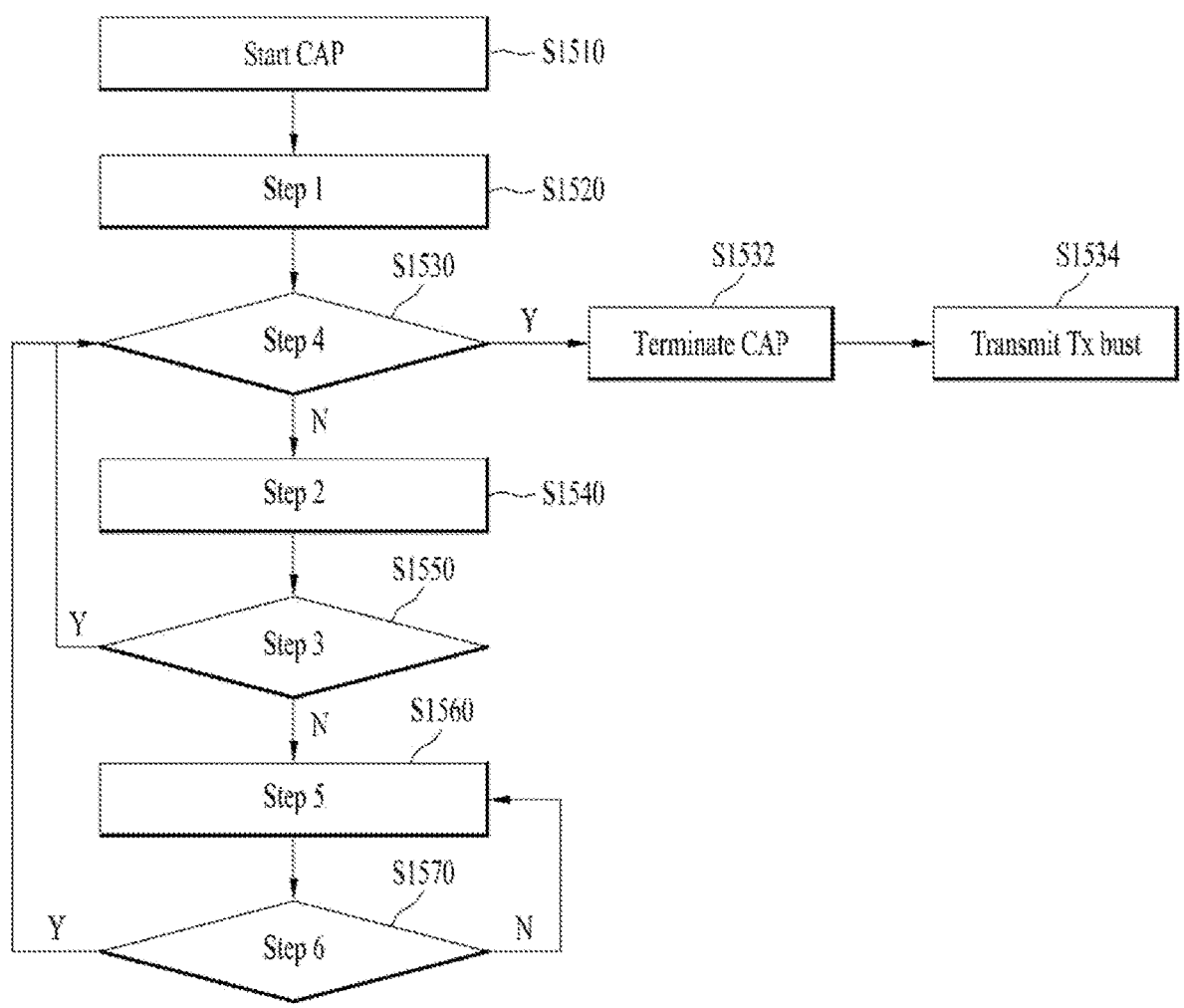
FIG. 11 illustrates a flow chart of Type 1 CAP operation of a user equipment for uplink signal transmission.

FIG. 11 illustrates a flow chart of Type 1 CAP operation of a UE for uplink signal transmission.

A UE may initiate a CAP for signal transmission through an unlicensed band (S1510). A UE may arbitrarily select a backoff counter N within a contention window (CW) according to step 1. Here, a value of N is configured to an initial value $N_{init}$ (S1520). $N_{init}$ is selected to be any value between 0 and $CW_p$. Then, according to step 4, if a backoff counter value (N) is 0 (S1530; Y), a UE ends a CAP process (S1532). Thereafter, a UE may perform Tx burst transmission (S1534). On the other hand, if a backoff counter value is not 0 (S1530; N), a UE decreases backoff counter value by 1 according to step 2 (S1540). Thereafter, a UE checks whether a channel of a UCell(s) is in an idle state (S1550), and if a channel is in an idle state (S1550; Y), checks whether a backoff counter value is 0 (S1530). On the other hand, if a channel is not in an idle state in step S1550, that is, if a channel is in a busy state (S1550; N), a UE checks whether a corresponding channel is in an idle state for a delay period (defer duration Td; 25 usec or more) longer than a slot time (e.g., 9 us) according to step 5 (S1560). If a channel is in an idle state during a delay period (S1570; Y), a UE may resume a CAP process again. Here, a delay period may include a 16 usec period and $m_p$ consecutive slot times (e.g., 9 us) immediately following it. On the other hand, if a channel is in a busy state during a delay period (S1570; N), a UE re-performs step S1560 to check again whether a channel is in an idle state during a new delay period.

Table 7 shows $m_p$, minimum CW ($CW_{min,p}$), maximum CW ($CW_{max,p}$), maximum channel occupancy time (MCOT, $T_{ulmcot,p}$) applied to a CAP according to a channel access priority class (p).

TABLE 7

| Channel Access Priority Class (p) | $m_p$ | $CW_{min, p}$ | $CW_{max, p}$ | $T_{ulmcot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

A CW size (CWS) applied to a Type 1 CAP may be determined based on various methods. As an example, a CWS may be adjusted based on whether to toggle a New Data Indicator (NDI) value for at least one HARQ processor related to HARQ_ID_ref, which is a HARQ process ID of a UL-SCH within a predetermined time duration (e.g., reference TU). When a UE performs signal transmission using a Type 1 CAP related to a channel access priority class p on a carrier, if an NDI value for at least one HARQ process related to HARQ_ID_ref is toggled, the UE sets $CW_p = CW_{min,p}$ in all priority classes p∈{1,2,3,4}, and if not, the UE increases $CW_p$ to the next higher allowed value in all priority classes p∈{1,2,3,4}.

The reference subframe $n_{ref}$ (or reference slot $n_{ref}$) is determined as follows.

When a UE receives a UL grant in a subframe (or slot) $n_g$ and performs transmission including a UL-SCH without a gap starting from a subframe (or slot) $n_0$ in subframes (or slots) $n_0, n_1, \ldots, n_w$, a reference subframe (or slot) $n_{ref}$ is a subframe (or slot) $n_0$.

(2) Type 2 Uplink CAP Method

If it is sensed that a channel is idle for at least a sensing period $T_{short\_ul} = 25$ us, a UE may perform uplink transmission (e.g., PUSCH) in an unlicensed band immediately after the sensing is terminated. $T_{short\_ul}$ may include $T_{sl}$ (=9 us)+$T_f$(=16 us).

Embodiment: HARQ-ACK Feedback in U-Band

In order to support stand-alone operation in a U-band, for DL data (e.g., PDSCH) reception, HARQ-ACK feedback operation based on U-band PUCCH/PUSCH transmission of a UE may be essential (Hereinafter, HARQ-ACK is referred to as A/N for convenience). A PUCCH/PUSCH indicates a PUCCH or a PUSCH. For example, a process in which a base station schedules DL data transmission to a UE through a channel occupancy time (COT) duration secured by performing an LBT (CCA) operation and the base station indicates to transmit HARQ-ACK feedback for the corresponding DL data reception from the corresponding UE through the same COT duration may be considered (hereinafter, an LBT or a CCA is referred to as an LBT for convenience). As another example, due to a UE processing time involved in decoding of a DL data signal and encoding of a corresponding HARQ-ACK signal, for a reception of scheduled/transmitted DL data through a specific COT duration, a process of indicating to transmit HARQ-ACK feedback through another COT duration after the corresponding COT duration may be considered.

Hereinafter, in the present disclosure, a HARQ-ACK feedback (hereinafter, A/N) configuration/transmission method in a U-band is proposed. Here, the A/N configuration/transmission method may be performed in consideration of an LBT operation, a COT configuration, etc. The methods proposed in the present disclosure are not limited to the HARQ-ACK feedback transmission method through a PUCCH/PUSCH, and may be similarly applied to other UCI (e.g., CSI, SR) transmission methods through a PUCCH/PUSCH. In addition, the methods proposed in the present disclosure are not limited to LBT-based U-band operation, and may be similarly applied to L-band (or U-band) operation not accompanied by LBT. In addition, in the following description, a plurality of CCs (indexes) are replaced with a plurality of BWPs (indexes) configured in one (or more) CC/(serving) cells, or a plurality of CCs/(serving) cells including a plurality of BWPs (that is, a combination of CC (index) and BWP (index)).

First, terms are defined as follows.

UCI: means control information transmitted by a UE in UL. UCI includes several types of control information (i.e., UCI type). For example, UCI includes HARQ-ACK, SR, and CSI.

HARQ-ACK: indicates whether DL data (e.g., transport block (TB), codeword (CW)) on a PDSCH has been successfully received. 1 bit of HARQ-ACK may be transmitted in response to single DL data, and 2 bits of HARQ-ACK may be transmitted in response to two DL data. A HARQ-ACK response/result includes a positive ACK (ACK), a negative ACK (NACK), a DTX or a NACK/DTX. Here, a HARQ-ACK is equivalent to am ACK/NACK, an A/N, and an AN.

HARQ process number/ID: indicates the number or identifier of a HARQ process. A HARQ process manages state variables related to the number of transmissions of a MAC PDU in a buffer, HARQ feedback for a MAC PDU in a buffer, and a current redundancy version, etc.

PUCCH: means a physical layer UL channel for UCI transmission. For convenience, for A/N, SR, and CSI transmission, PUCCH resources configured and/or indicated for transmission by a base station are referred to as a A/N PUCCH resource, a SR PUCCH resource, and a CSI PUCCH resource, respectively.

PUSCH: means a physical layer UL channel for UL data transmission.

Slot: means a basic time unit (TU) (or time interval) for data scheduling. A slot includes a plurality of symbols. Here, a symbol includes an OFDM-based symbol (e.g., a CP-OFDM symbol, a DFT-s-OFDM symbol). In the present disclosure, a symbol, an OFDM-based symbol, an OFDM symbol, a CP-OFDM symbol, and a DFT-s-OFDM symbol may be substituted for each other.

Each of the proposed methods described below may be combined and applied together as long as they do not contradict each other.

(1) Basic Operation Method

Basic operation methods for the A/N feedback configuration/transmission method proposed in the present disclosure will be described as follows. In the present disclosure, A/N triggering DCI includes at least DL grant DCI, and (in addition to the DL grant DCI) may further include UL grant DCI and/or specific DCI that does not schedule PDSCH/PUSCH transmission.

Figure 12A:
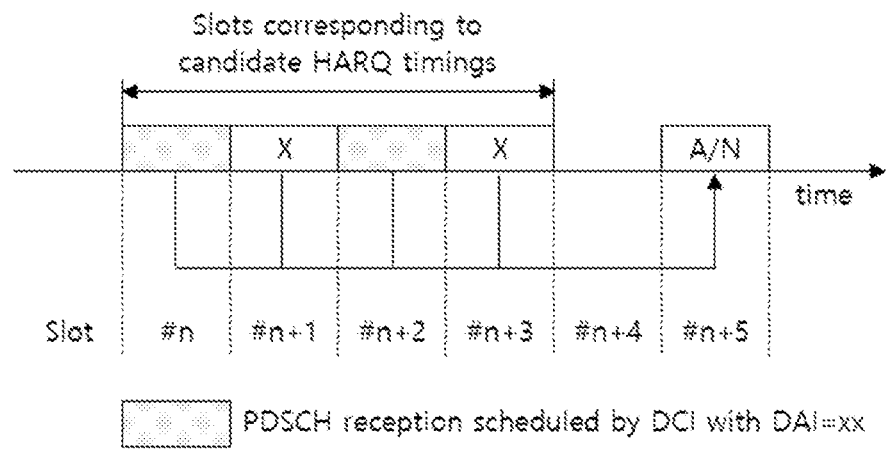
FIGS. 12A to 14 illustrate A/N transmission according to an embodiment of the present disclosure.
Figure 12B:
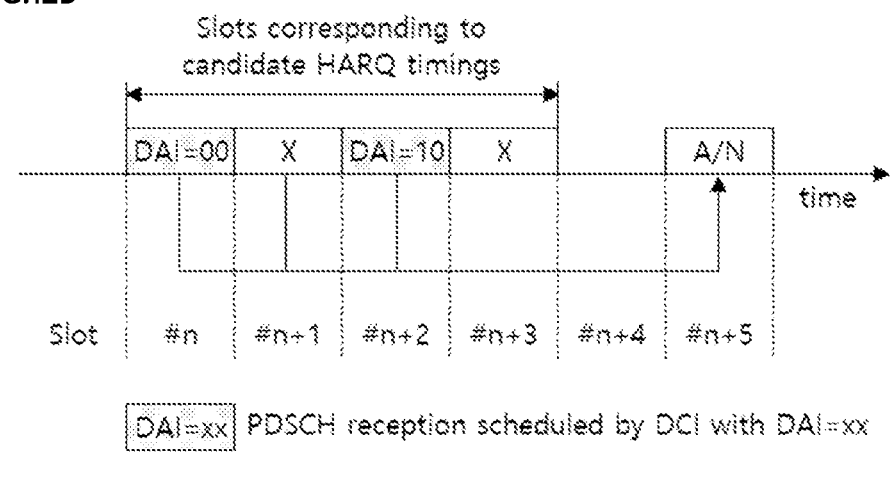

1) Timing-Based A/N Feedback Method (Hereinafter, t-A/N Method) (FIGS. 12A and 12B)

A. After configuring a plurality of candidate HARQ timings through RRC signaling in advance, a base station may indicate to a UE one of the plurality of candidate HARQ timings through (DL grant) DCI. In this case, a UE may operate to transmit A/N feedback for (a plurality of) PDSCH reception through indicated the HARQ timing in a plurality of slots (or a slot set; for convenience, a bundling window) corresponding to an entire candidate HARQ timing set. Here, A HARQ timing means a PDSCH-to-A/N timing/interval. A HARQ timing may be expressed in units of slots.

For example, when A/N transmission is indicated in a slot #m, A/N information may include response information for PDSCH reception in a slot #(m−i). Here, a slot #(m−i) corresponds to a slot corresponding to candidate HARQ timings. FIG. 12A illustrates a case where candidate HARQ timings are configured to i={2, 3, 4, 5}. In this case, when the A/N transmission time is indicated as #(n+5)(=m), a UE may generate and transmit A/N information for PDSCH reception of slots #n~#(n+3)(=m−i) (i.e., A/N feedback for all 4 slots). Here, A/N responses to PDSCH reception of slots #n+1/#n+3 may be treated as NACKs.

For convenience, this A/N feedback configuration/transmission method is referred to as "Type-1 A/N codebook".

B. In addition to a HARQ timing indication, a counter Downlink Assignment Index (c-DAI) and/or a total-DAI (t-DAI) may be signaled together through (DL grant) DCI. A c-DAI may inform in which order a PDSCH corresponding to (DL grant) DCI is scheduled. A t-DAI may inform of the total number of PDSCHs (or the total number of slots in which PDSCHs exist) scheduled up to the present (slot). Accordingly, a UE may operate to transmit A/N for PDSCHs corresponding to a c-DAI values from an initial c-DAI value to (received) last t-DAI value through an indicated HARQ timing. When the number of serving cells configured for a UE is one, a c-DAI and a t-DAI may have the same meaning. Accordingly, a t-DAI may be included in (DL grant) DCI only when the number of serving cells is plural. When a plurality of serving cells are configured in a UE, a c-DAI is first counted in the cell-domain, and then the c-DAI may inform of a scheduling order of a PDSCH counted in a time-domain (or an order (of a serving cell, a slot) in which a PDSCH exists). Similarly, a t-DAI may inform of the total number of PDSCHs scheduled up to the present (slot) (or the total number of serving cells, slots in which PDSCHs exist). Here, a c-DAI/t-DAI may be defined based on a PDCCH. In this case, in the above description, the PDSCH may be replaced with a PDCCH, and the slot in which the PDCCH exists may be replaced with a PDCCH monitoring opportunity in which a PDCCH (or DCI) related to the PDCCH exists.

Each c-DAI/t-DAI may be indicated using a 2-bit value. A number greater than 4 can be indicated as follows using a modulo operation.

When a DAI bit is 00 (e.g., DAI value=1): indicates 4n+1 (i.e., 1, 5, 9, . . . )
When a DAI bit is 01 (e.g., DAI value=2): indicates 4n+2 (i.e., 2, 6, 10, . . . )
When a DAI bit is 10 (e.g., DAI value=3): indicates 4n+3 (i.e., 3, 7, 11, . . . )
When a DAI bit is 11 (e.g., DAI value=4): indicates 4n+4 (i.e., 4, 8, 12, . . . )

n represents an integer greater than or equal to 0.

FIG. 12B illustrates a case in which a DAI is signaled through (DL grant) DCI in the same situation as FIG. 12A. Referring to FIG. 12B, a PDSCH scheduled by DCI having DAI=00 in a slot #n may be received, and a PDSCH scheduled by DCI having DAI=10 in a slot #(n+2) may be received. In this case, a UE may generate/transmit A/N information only for reception of three PDSCHs corresponding to consecutive DAI values (i.e., DAI=00/01/11) (hereinafter, a DAI sequence). Here, an A/N response for reception of a PDSCH corresponding to DAI=01 may be processed as a NACK.

Figure 13:
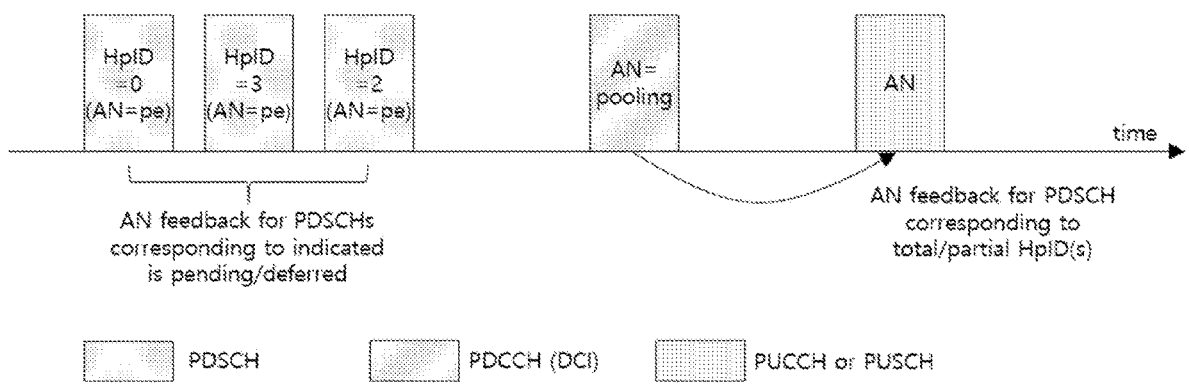

2) Pooling-Based A/N Feedback Method (Hereinafter, p-A/N Method) (FIG. 13)

A. An operation of delaying (pending/deferring) A/N feedback transmission for a corresponding PDSCH may be indicated through DL grant DCI. Thereafter, through DCI, transmission of A/N feedback for PDSCH(s) corresponding to (i) all DL HARQ process IDs, or (ii) specific partial DL HARQ process ID(s) may be indicated (pooling). A/N feedback may be transmitted through a timing configured/indicated based on a specific signal (e.g., RRC or DCI signaling). A/N pooling may be indicated through a DL grant (e.g., DCI format 1_0/1_1), a UL grant (e.g., DCI format 0_0/0_1) or other DCI (e.g., UE (group) common DCI). For convenience, DCI indicating A/N pooling is referred to as pooling DCI. A HARQ process ID to be pooled may be preconfigured/predefined or may be indicated through pooling DCI. A/N pooling may be indicated in units of whole/group/individual HARQ process IDs.

For example, referring to FIG. 13, a UE may receive three PDSCHs from a base station, and HARQ process IDs (HpIDs) assigned to each PDSCH may be 0, 3, and 2. In addition, A/N pending (AN=pe) may be indicated for three PDSCHs through each DL grant DCI. In this case, a UE delays A/N transmission for PDSCHs reception corresponding to HpID=0/3/2. Thereafter, upon receiving a pooling DCI (AN=pooling) from a base station, a UE may transmit A/N for PDSCHs reception corresponding to all or some HpIDs at a time.

B. When c-/t-DAI signaling is configured in t-A/N method (e.g., when a DAI is signaled through DL grant DCI), A/N pooling corresponds to a HARQ process ID (indicated through pooling DCI) may be defined as pulling A/N transmission for a PDSCH corresponding to a HARQ process ID or pulling A/N transmission for a PDSCH corresponding to a t-DAI value (indicated through pooling DCI). In the latter case, a UE may transmit A/N information for PDSCHs reception corresponding to a c-DAI initial value to a t-DAI value at a time.

(2) Proposed Method 1

In the case of proposed method 1, through A/N triggering DCI, 1) timing-A indicating an actual A/N transmission timing, and 2) timing-D indicating a reference A/N timing corresponding to a (DL PDSCH) slot group that is an A/N feedback target may be signaled.

Based on this, a UE may operate to transmit A/N feedback for a slot group (PDSCH reception through the slot group) corresponding to timing-D through the time indicated by timing-A. In this case, a A/N payload may be mapped (e.g., ordered) in a slot index order belonging to a corresponding slot group.

For example, A/N triggering DCI (or, if A/N triggering DCI is a DL grant DCI, a corresponding PDSCH) is transmitted/detected through a slot #n, and timing-A=K and timing-D=L through a corresponding DCI may be indicated. In this case, a UE may operate to transmit A/N feedback for a slot group (i.e., PDSCH reception through the slot group) corresponding to a slot #(n+K−L) through a slot #(n+K). Here, a slot group may be defined as a timing set including a plurality (e.g., M) of candidate timing values D_m (m=0, 1, . . . , M−1). For example, a slot group corresponding to a slot #n may be configured/defined as M slots corresponding to slots #(n−D_m) or slots #(n+D_m) (m=0, 1, . . . , M−1). In this case, a slot group corresponding to a slot #(n+K−L) may be configured/defined as slots #(n+K−L−Dm) or slots #(n+K−L+D_m) (m=0, 1, . . . , M−1).

On the other hand, a timing set defining a slot group may be configured to be the same as a set of candidate timing-A values (e.g., K_m; m=0, 1, . . . , M−1) that can be indicated by timing-A, or may be configured independently (differently). For example, a bundling window corresponding to a slot #n may be configured as slots #(n−K_m), and a slot group corresponding to a slot #n may be also defined by a timing set configured with K_m (m=0, 1, . . . , M−1). For example, A/N triggering DCI (or, when A/N triggering DCI is DL grant DCI, a corresponding PDSCH) may be transmitted/detected through a slot #n, and timing-A=K and timing-D=L may be indicated through the corresponding DCI. In this case, a UE may operate to transmit A/N feedback for a slot group (PDSCH reception through the slot group) corresponding to a slot #(n+K−L) through a slot #(n+K). Here, a slot group corresponding to a slot #(n+K−L) may be configured with slots #(n+K−(K_m+L)) (m=0, 1, . . . , M−1).

On the other hand, when A/N triggering DCI is the same as DL grant DCI (that is, both timing-A and timing-D are signaled through DL grant DCI), a UE may operate to transmit (at the same time, for example, through one PUCCH/PUSCH) by combining 1) A/N feedback for a bundling window (PDSCH reception through the bundling window) corresponding to timing-A and 2) A/N feedback for a slot group (PDSCH reception through the slot group) corresponding to timing-D, through the time indicated by timing-A.

For example, when DL grant DCI or a corresponding PDSCH is transmitted/detected through a slot #n and timing-A=K and timing-D=L are indicated through a corresponding DCI, a UE may operate to transmit by combining 1) A/N feedback for a bundling window (PDSCH reception through the bundling window) corresponding to a slot #(n+K) and 2) A/N feedback for a slot group (PDSCH reception through the slot group) corresponding to a slot #(n+K−L), through a slot #(n+K). Here, a slot group corresponding to a slot #(n+K−L) may be configured/defined as (i) slots #(n+K−L−Dm) or slots #(n+K−L+D_m) (m=0, 1, . . . , M−1), or (ii) slots #(n+K−(K_m+L)) (m=0, 1, . . . , M−1).

Additionally, (e.g., when A/N triggering DCI is the same as DL grant DCI) it may be indicated through DCI that there is no timing-D and/or a slot group corresponding thereto (A/N feedback request for this). For example, when timing-D=a specific value (e.g., 0) is configured, it may indicate that there is no corresponding slot group (A/N feedback request for this).

Additionally, (e.g., when A/N triggering DCI is the same as DL grant DCI) it may be indicated through DCI (e.g., through a timing-D indication field) that A/N feedback is transmitted only for a specific part (e.g., first or last slot) among slots belonging to a bundling window (or a slot group corresponding to timing-D) corresponding to timing-A.

As another method, a method of signaling A/N feedback transmission triggering for timing-A/timing-D and a corresponding slot group (e.g., bundling window) corresponding thereto, through UE (group)-common DCI may also be considered.

Meanwhile, due to a limited DCI field size/number of bits, a reference A/N timing (corresponding A/N feedback target slot group) that can be indicated by timing-D may be limited. In consideration of this, it may be indicated that A/N feedback for PDSCH reception corresponding to all (not a specific slot group) or some (pre-specified) specific HARQ process IDs is transmitted, through a specific state of a timing-D indication field.

Meanwhile, A/N transmission PUCCH/PUSCH resources (sets) may be configured differently for each timing-D value. For example, A/N transmission PUCCH/PUSCH resources (sets) may be configured differently for each slot group corresponding to each timing-D value. In addition, a corresponding timing-D value (for example, corresponding to a A/N feedback target slot group to a corresponding PUCCH/PUSCH resource (set)) for each A/N transmission PUCCH/PUSCH resource (set) may be configured differently. For example, a slot group corresponding to each PUCCH/PUSCH resource (set) may be configured differently, and accordingly, a timing-D value may be configured differently.

(3) Proposed Method 2

In the case of proposed method 2, in a situation where one slot group size (e.g., the number N of slots in a single slot group or the maximum number N of schedulable PDSCHs in a single slot group) is preconfigured in advance, 1) a current-ID (c-ID) indicating a slot group ID to which a slot in which a corresponding DCI or a corresponding PDSCH is transmitted belongs may be signaled through DL grant DCI, and 2) a feedback-ID (f-ID) indicating a slot group ID to be an A/N feedback target (DL PDSCH) may be signaled through A/N triggering DCI.

Based on this, a UE may transmit A/N feedback for a slot group (PDSCH reception through the slot group) corresponding to a feedback-ID through the time (e.g., slot) indicated as a A/N transmission timing. Here, a slot group corresponding to a feedback-ID includes a slot in which a current-ID of the same value as a previous feedback-ID is signaled/received, that is, a slot in which a current-ID having the same value as a feedback-ID is signaled/received through DL grant DCI.

Here, for an A/N payload for a slot group corresponding to a feedback-ID (in a situation where a counter-DAI is configured to be signaled through DL grant DCI), it may be mapped (ordered) in an order of counter-DAI values (e.g., from 1 to N) received through DL grant DCI.

Figure 14:
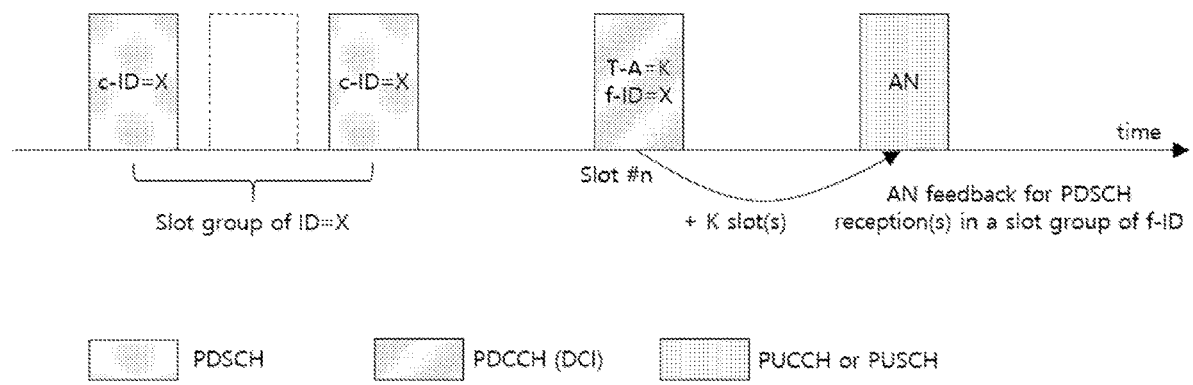

For example, referring to FIG. 14, A/N triggering DCI (or, when A/N triggering DCI is DL grant DCI, a corresponding PDSCH) may be transmitted/detected through a slot #n, timing-A (T-A)=K and feedback-ID (f-ID)=X may be indicated through a corresponding DCI. In this case, a UE may transmit A/N feedback for PDSCH reception in a slot group (i.e. received as current-ID (c-ID)=X through DL grant DCI) corresponding to slot group ID=X in a slot #(n+K).

Meanwhile, a counter-DAI may be determined/signaled to have a continuous value (starting from an initial value (e.g., 1)) in one slot group (ID) as shown in FIG. 12B. That is, a counter-DAI value may be independently determined/signaled between different slot groups. In addition, a slot group (indicated through DCI) may be defined in a form of a DAI sequence including counter-DAI values from 1 to N corresponding to the same slot group ID value. In this case, a slot group may be configured as discontinuous slots based on a received/detected counter-DAI. In the present disclosure, a slot group ID and a DAI sequence ID may be replaced/compatible with each other.

On the other hand, when A/N triggering DCI is the same as DL grant DCI (that is, both a current-ID and a feedback-ID are signaled through DL grant DCI), a UE may operate to transmit (simultaneously, for example, through one PUCCH/PUSCH) by combining (e.g., concatenate) 1) A/N feedback for a bundling window corresponding to timing-A or a slot group (PDSCH reception through the slot group) corresponding to a current-ID and 2) A/N feedback for a slot group (PDSCH reception through the slot group) corresponding to a feedback-ID, through the time indicated by timing-A.

Meanwhile, in the present disclosure, that a feedback-ID is signaled/indicated through A/N triggering DCI (e.g., DL grant DCI, UL grant DCI) may mean that a total-ID indicating the total number of (PDSCH) slot groups (IDs) targeted for A/N feedback transmission/request is signaled through a corresponding DCI, and a specific slot group ID determined from a total-ID and a current-ID is applied as a feedback-ID. For example, in a situation where up to two (PDSCH) slot group IDs (e.g., ID=0 or ID=1) are set/configured, when a current-ID is indicated as X and a total-ID is indicated as 1, a feedback-ID may be determined/applied to X (which is the same value as a current-ID). As another example, in a situation where up to two (PDSCH) slot group IDs (e.g., ID=0 or ID=1) are set/configured, a current-ID is indicated as X and a total-ID is indicated as 2, a feedback-ID may be determined/applied to Y (which is a different value from a current-ID). In this case, X and Y may be determined to be different values (e.g., Y=1 if X=0, or Y=0 if X=1). This method of determining a feedback-ID is referred to as "Method 1" for convenience.

For example, DL grant DCI or a corresponding PDSCH is transmitted/detected through a slot #n, and timing-A=K, current-ID=X, and feedback-ID=Y (or total-ID=2) may be indicated. In this case, a UE may transmit by combining 1) A/N feedback for a bundling window corresponding to a slot #(n+K) or a slot group (PDSCH reception through the slot group) corresponding to ID=X and 2) A/N feedback for a slot group (PDSCH reception through the slot group) corresponding to ID=Y, through a slot #(n+K).

On the other hand, in the present disclosure, a total-DAI and/or a NFI (New Feedback Indicator) for a feedback-ID (corresponding (PDSCH) slot group thereto) signaled/indicated through A/N triggering DCI (e.g., DL grant DCI, UL grant DCI) may means a total-DAI and/or a NFI for a feedback-ID determined according to Method 1, or a total-DAI and/or a NFI for an other-ID (a slot group corresponding thereto) having a value different from a current-ID (regardless of a value indicated as a total-ID). As an example of the latter, in a situation where up to two (PDSCH) slot group IDs (e.g., ID=0 or ID=1) are set/configured, when current-ID=X is indicated, "total-DAI and/or NFI for feedback-ID" may mean a total-DAI and/or a NFI for a slot group corresponding to other-ID=Y. In this case, X and Y may be determined to be different values (e.g., Y=1 if X=0, or Y=0 if X=1). This method of determining an other-ID and applying total-DAI/NFI is referred to as "Method 2" for convenience.

Here, a NFI is 1-bit information, for A/N feedback (hereinafter, previous A/N feedback) transmitted at the previous (e.g., recent) time, (a) whether a base station has properly detected/received it, (b) whether a base station has failed to detect/receive it may be signaled. In the case of (a), a UE may process the remaining parts except for A/N corresponding to a PDSCH scheduled after previous A/N transmission as NACK or DTX (feedback configuration/transmission omitted) to configure/transmit the updated A/N feedback. In the case of (b), a UE may configure/transmit A/N feedback by maintaining the remaining parts except for A/N corresponding to a PDSCH scheduled after previous A/N transmission. In case of (a), an NFI value toggled from an NFI value received through previous DCI is indicated through current DCI. In case (b), an NFI value that is not toggled from an NFI value received through previous DCI may be indicated through current DCI.

For example, DL grant DCI or a corresponding PDSCH is transmitted/detected through a slot #n, and timing-A=K, current-ID=X and feedback-ID=Y (or, total-ID value=2) respectively indicated through a corresponding DCI, a UE may operate to transmit by combining 1) A/N feedback for a bundling window corresponding to a slot #(n+K) or a slot group (PDSCH reception through the slot group) corresponding to ID=X and 2) A/N feedback for a slot group (PDSCH reception through the slot group) corresponding to ID=Y, through a slot #(n+K).

Additionally, (e.g., when A/N triggering DCI is the same as DL grant DCI) it may be indicated (through a feedback-ID (or a total-ID) indication field) through DCI that there is no feedback-ID (or other-ID) and/or slot group (A/N feedback request on the slot group) corresponding thereto. For example, when a feedback-ID is indicated with the same value as a current-ID (or a total-ID value is 1), a UE may operate to configure/transmit A/N feedback only for (one) slot group corresponding to the current-ID.

Additionally, (e.g., when A/N triggering DCI is the same as DL grant DCI) A/N feedback is transmitted only for a specific part (e.g., the first or last slot) among slots belonging to a bundling window corresponding to a timing-A or a slot group (or a slot group corresponding to a feedback-ID (or an other-ID)) corresponding to a current-ID may be indicated through DCI (e.g., through a feedback-ID (or total-ID) indication field).

As another method, a method of signaling a current-ID through UE (group)-common DCI #1 and/or signaling A/N feedback transmission triggering for a feedback-ID and a slot group corresponding thereto through a UE (group)-common DCI #2 may be considered. In this case, UE (group)-common DCI #1 and #2 may be separate DCIs or may be configured as the same DCI.

In another method, a total-DAI is signaled through A/N triggering DCI, a UE may operate to configure/transmit A/N feedback only for counter-DAI value(s) from (1 to) to a total-DAI value for a slot group (or a bundling window corresponding to a timing-A or a slot group corresponding to a current-ID) corresponding to a feedback-ID. That is, A/N feedback may be configured/transmitted only for slot(s) (PDSCHs scheduled through this) corresponding to counter-DAI value(s) from 1 to a total-DAI value. Alternatively, total-DAIs for a slot group corresponding to a feedback-ID (or an other-ID) and for a slot group corresponding to a current-ID (or a bundling window corresponding to a timing-A) may be signaled through DCI, respectively. In this case, a UE may operate to configure/transmit A/N feedback based on a total-DAI for each slot group.

As an example, A/N feedback configuration related information indicated through DL grant DCI may include (i) a current-ID, (ii) a counter/total-DAI for a slot group corresponding to a current-ID (PDSCHs scheduled through this), and (iii) a feedback-ID (or a total-ID). In addition, a total-DAI for a slot group (PDSCHs scheduled through this) corresponding to a feedback-ID (or an other-ID) may be further included in DL grant DCI (i.e., A/N feedback configuration related information).

On the other hand, (i) a current-ID, (ii) a total-DAI for a slot group (PDSCHs scheduled through this) corresponding to a current-ID, (iii) a feedback-ID (or a total-ID), (iv) a total-DAI for a slot group corresponding to the feedback-ID (or an other-ID) may be indicated through UL grant DCI. Here, a current-ID and a feedback-ID may be defined/generalized as two feedback-IDs #1 and #2. Accordingly, a UE may operate to transmit A/N feedback for a slot group corresponding to feedback-IDs #1 and #2 through (PUCCH or) PUSCH (e.g., in a form of UCI piggyback).

Alternatively, a current-ID (and/or a feedback-ID (or a total-ID)) may not be included in UL grant DCI. That is, signaling through UL grant DCI may be omitted for a current-ID (and/or a feedback-ID (or a total-ID)). In this case, a UE may operate to configure/transmit A/N feedback (on PUSCH) based on current-ID (and/or feedback-ID (or total-ID)) information received through DL grant DCI. Additionally, it may be indicated through a specific field that there is no A/N feedback transmission request (e.g., a slot group targeted for A/N feedback) through UL grant DCI. Here, a specific field may include, for example, a feedback-ID (or a total-ID) and/or a current-ID (and/or a feedback-ID (or an other-ID) and/or a total-DAI corresponding to a current-ID) indication fields.

As another method, a current-ID and a starting-ID may be indicated through A/N triggering DCI (e.g., DL grant DCI, UL grant DCI). In this case, a UE may operate to configure/transmit A/N feedback for a slot group set A (PDSCH reception through it) corresponding to (plural) consecutive slot group ID(s) from a starting-ID to a current-ID. When a starting-ID is indicated with the same value as a current-ID, a UE may operate to configure/transmit A/N feedback only for (one) slot group corresponding to a current-ID. Here, a current-ID may be defined/generalized as an ending-ID.

As an example, A/N feedback configuration related information indicated through DL grant DCI may include at least (i) a current-ID, (ii) a slot group (PDSCHs scheduled through this) corresponding to a current-ID, (iii) a starting-ID. In addition, a (single) total-DAI commonly applied to each (plural) slot group(s) belonging to a slot group set A (excluding a slot group corresponding to a current-ID) may be further included in DL grant DCI (i.e., A/N Feedback configuration related information).

As another example, through UL grant DCI, (i) a current-ID, (ii) a total-DAI for a slot group (PDSCHs scheduled through this) corresponding to a current-ID, (iii) a starting-ID, (iv) a (single) total-DAI commonly applied to each (plural) slot group(s) belonging to a slot group set A (excluding a slot group corresponding to a current-ID) may be indicated. Accordingly, a UE may operate to transmit A/N feedback for a slot group set corresponding to a starting-ID to a current-ID through (PUCCH or) PUSCH (e.g., in a form of UCI piggyback).

As another example, a current-ID (and/or a starting-ID) may not be included in UL grant DCI. That is, signaling for a current-ID (and/or a starting-ID) through UL grant DCI may be omitted. In this case, a UE may operate to configure/transmit A/N feedback (on PUSCH) based on current-ID (and/or starting-ID) information received through DL grant DCI. Additionally, it may be indicated through a specific field that there is no A/N feedback transmission request (e.g., a slot group targeted for A/N feedback) through UL grant DCI. Here, a specific field may include, for example, a starting-ID and/or a current-ID (and/or a corresponding total-DAI) indication fields.

On the other hand, when the above-described method or other methods are applied, the number of simultaneously transmitted (single) A/N feedback configuration target slot groups may be dynamically changed (e.g., 2 including a current-ID, or 3 or more including a current-ID). In this case, through A/N triggering DCI (e.g., DL grant DCI) and/or UL grant DCI, a (single) total-DAI that is commonly applied to each of a plurality of slot groups (excluding a slot group corresponding to a current-ID) targeted for A/N feedback configuration may be indicated.

On the other hand, due to a limited DCI field size/number of bits, there may be a limit to a slot group ID (corresponding A/N feedback target slot group) that can be indicated by a current-ID/feedback-ID (or total-ID). In consideration of this, through a specific state of a current-ID/feedback-ID (or total-ID) indication field, it is indicated to transmit A/N feedback for PDSCH reception corresponding to all (not a specific slot group) or some (pre-specified) specific HARQ process IDs.

On the other hand, for each slot group ID value (for a slot group corresponding to a corresponding ID), a A/N transmission PUCCH/PUSCH resource (set) may be configured differently, or a slot group ID value corresponding to each A/N transmission PUCCH/PUSCH resource (set) (e.g., A/N feedback target to a corresponding PUCCH/PUSCH resource (set)) may be configured differently. For example, with respect to A/N feedback for slot group ID=X, a UE may operate to transmit by selecting/using a PUCCH/PUSCH resource (set) configured in slot group ID=X.

Additionally, in a situation in which a plurality of carriers are aggregated/configured to one UE (i.e., CA situation), for a slot group ID, Opt 1-1) the same slot group ID may be indicated/specified in common for all multiple carriers at the same time (e.g., slot timing) or time duration, or Opt 1-2) a slot group ID may be individually indicated/specified for each carrier in an order of frequency (carrier)-first time (slot group)-second (second).

Additionally, in a situation where a slot group ID is indicated/specified in a CA situation, for a counter-DAI, 1) (in a situation in which Opt 1-1 is applied) a PDSCH scheduling counter value may be determined/indicated in an order of frequency (carrier)-first time (slot)-second in one slot group (ID), or 2) (in a situation in which Opt 1-2 is applied) a PDSCH scheduling counter value may be independently determined/indicated in one slot group (ID) for each carrier.

(4) Proposed Method 3

Prior to the description of the proposed method, A/N feedback configuration/transmission and related basic operation methods will be described as follows. The tA/N method and the pA/N method are substantially the same as those described with reference to FIGS. 12-13, and are described again below to classify the A/N feedback configuration/transmission methods (or A/N codebook method).

1) Timing-Based A/N Feedback Method (t-A/N Method)

A. After configuring a plurality of candidate HARQ timings through RRC signaling in advance, a base station may indicate to a UE one of a plurality of candidate HARQ timings through (DL grant) DCI. In this case, a UE may operate to transmit A/N feedback for (plural) PDSCH reception in a plurality of slots (or a slot set; a bundling window) corresponding to an entire candidate HARQ timing set through an indicated HARQ timing. Here, HARQ timing means PDSCH-to-A/N timing/interval. HARQ timing may be expressed in units of slots. Hereinafter, the above-described method is referred to as a Type-1 A/N codebook.

B. In addition to a HARQ timing indication, a counter Downlink Assignment Index (c-DAI) and/or a total-DAI (t-DAI) may be signaled together through (DL grant) DCI. A c-DAI may inform in which order a PDSCH corresponding to (DL grant) DCI is scheduled. A t-DAI may inform of the total number of PDSCHs (or the total number of slots in which PDSCHs exist) scheduled up to the present (slot). Accordingly, a UE may operate to transmit A/N for PDSCHs corresponding to a c-DAI values from an initial c-DAI value to (received) last t-DAI value through an indicated HARQ timing. Hereinafter, the above-described method is referred to as a Type-2 A/N codebook.

C. PDSCH (Slot) Group ID-Based A/N Feedback Method (Hereinafter, Type-2a A/N Codebook)

i. A Current-ID may be signaled through DL grant DCI, and a feedback-ID may be signaled through A/N triggering DCI. Here, a current-ID is used to indicate a slot group ID to which a slot in which DL grant DCI or a corresponding PDSCH is transmitted belongs. In addition, a feedback-ID is used to indicate a (DL PDSCH) slot group ID to be a target of A/N feedback. Here, a total-ID is signaled through DCI, and a feedback-ID can be inferred from a total-ID based on the Method 1.

ii. A UE may transmit A/N feedback for a slot group (PDSCH reception through the slot group) corresponding to a feedback-ID through the time indicated by an A/N transmission timing.

iii. When A/N triggering DCI is the same as the DL grant DCI (i.e., both a current-ID and a feedback-ID (or a total-ID) are signaled through DL grant DCI), a UE may operate to transmit by combining (at the same time, for example, through one PUCCH/PUSCH) 1) A/N feedback for a bundling window corresponding to a timing-A or a slot group (PDSCH reception through the slot group) corresponding to a current-ID and 2) A/N feedback for a slot group (PDSCH reception through the slot group) corresponding to a feedback-ID, through the time indicated by a timing-A.

2) Pooling-Based A/N Feedback Method (p-A/N Method)

A. An operation of delaying (pending/deferring) A/N feedback transmission for a corresponding PDSCH may be indicated through DL grant DCI. Thereafter, through DCI, transmission of A/N feedback for PDSCH(s) corresponding to (i) all DL HARQ process IDs or (ii) specific partial DL HARQ process ID(s) may be indicated (pooling). A/N feedback may be transmitted through timing configured/indicated based on a specific signal (e.g., RRC or DCI signaling). Hereinafter, the above-described method is referred to as a Type-3 A/N codebook.

B. When c-/t-DAI signaling is configured in the t-A/N method (e.g., when a DAI is signaled through DL grant DCI), A/N pooling may be defined as pooling A/N transmission for a PDSCH corresponding to a HARQ process ID (indicated through pooling DCI), or pooling A/N transmission for a PDSCH corresponding to a t-DAI value (indicated through pooling DCI). In the latter case, a UE may transmit A/N information for PDSCH reception corresponding to a c-DAI initial value to a t-DAI value at a time.

3) Dynamic Switching Operation Method Between the t-A/N Method and the p-A/N Method A. As an example, switching between the t-A/N method and the p-A/N method may be indicated through DL grant DCI. That is, it may be indicated whether to configure/transmit A/N feedback by applying either the t-A/N method or the p-A/N method through DL grant DCI. Additionally, both A/N pending and A/N pooling for the p-A/N method may be indicated through the same DL grant DCI. For example, when DL grant DCI indicates the p-A/N method, the DL grant DCI may further indicate whether to indicate pending A/N feedback transmission or pooling.

B. As another example, switching between A/N pending operations for applying the t-A/N method and the p-A/N method may be indicated through DL grant DCI. That is, it may be indicated whether the t-A/N method is applied or A/N feedback transmission is pending for the p-A/N method through DL grant DCI. Here, an A/N pooling operation for the p-A/N method may be indicated through UL grant DCI or (UE (group)) common DCI.

C. As another example, switching between the t-A/N method and A/N pending for the p-A/N may be indicated through DL grant DCI including PDSCH scheduling. That is, it may be indicated whether to apply the t-A/N or to pending A/N transmission for the p-A/N method through DL grant DCI. In this case, A/N pooling for the p-A/N method may be indicated through DL grant DCI that does not include PDSCH scheduling.

4) NFI (New Feedback Indicator) Information Signaling

A. Due to A/N feedback transmission drop of a UE due to LBT failure and/or A/N feedback detection failure in a base station, etc., for the purpose of preventing inconsistency in an A/N codebook (payload) configuration between a UE and a base station (and a CWS (Contention Window Size) update for an LBT operation accompanying an A/N PUCCH (including UL transmission such as a PUSCH, etc.)), a 1-bit NFI may be signaled through (e.g., DL grant or UL grant) DCI triggering A/N feedback transmission. An NFI may indicate the following information in a toggling form.

i. For A/N feedback (hereinafter, previous A/N feedback) transmitted at the previous (recent) time, whether (a) it was properly detected/received by a base station, (b) a base station failed to detect/receive it may be signaled. In the case of (a), a UE processes the remaining parts except for A/N corresponding to a PDSCH scheduled after previous A/N transmission as NACK or DTX (feedback configuration/transmission omitted) to configure/transmit updated A/N feedback. In the case of (b), a UE may configure/transmit A/N feedback by maintaining the remaining parts except for A/N corresponding to a PDSCH scheduled after previous A/N transmission.

ii. In the case of (a), an NFI value toggled from an NFI value received through previous DCI is indicated through current DCI. In the case of (b), an NFI value that is not toggled from an NFI value received through previous DCI may be indicated through current DCI. When a UE receives a toggled NFI, a UE may operate to reset a CWS for an A/N PUCCH (and/or a PUSCH) transmission to the minimum value, but on the other hand, when a UE receives a non-toggle NFI, a UE may operate to increase a CWS value (in a certain unit).

Hereinafter, a DL/UL grant DCI configuration method and signaling information when configuring Type-2a and Type-1/2 A/N codebooks are proposed. Meanwhile, in this disclosure, DCI (format) in which a field configuration and each field size, etc. in a DCI format are configurable (that is, changeable) is referred to as a non-fallback DCI, and DCI (format) in which a DCI field configuration and respective sizes are not configurable (i.e., fixed) is referred to as fallback DCI. DCI, which is not separately specified as fallback DCI in this disclosure, may mean non-fallback DCI.

(a) DCI Configuration and Signaling Information when Configuring a Type-2a A/N Codebook 1) Information Signaled Through DL Grant DCI A. Basically, it may include the following information (for convenience, basic information).

i. current-ID information ii. Counter-DAI and total-DAI information related to a (PDSCH) slot group corresponding to a current-ID iii. feedback-ID information 1. Alternatively, a total-ID may be signaled through DCI, and feedback-ID information may be determined based on Method 1.

iv. NFI information for A/N feedback corresponding to a current-ID (i.e., NFI for current-ID)

v. NFI information for A/N feedback corresponding to a feedback-ID (i.e., NFI for feedback-ID)

1. Based on Method 2 (regardless of a value indicated by a total-ID), it can be replaced with NFI information for A/N feedback corresponding to an other-ID having a value different from a current-ID (that is, NFI for other-ID).

B. In addition, it may further include the following information.

i. Total-DAI information related to a (PDSCH) slot group corresponding to a feedback-ID 1. Based on Method 2 (regardless of a value indicated by a total-ID), it can be replaced with total-DAI information for A/N feedback corresponding to an other-ID having a value different from a current-ID (that is, total-DAI for other-ID).

C. In addition, it may further include the following information.

i. Whether to configure/transmit A/N feedback based on a Type-3 codebook (e.g., CTI (Codebook Type Indicator) signaling indicating which A/N codebook to configure/transmit among Type-2a and Type-3)

ii. Notes

1. If Type-3 is indicated through DCI (at the specific time), NFI information for Type-3 codebook-based A/N feedback (i.e., NFI for Type-3) may be additionally signaled through DCI.

2. CTI information may be explicitly signaled using a dedicated 1-bit, or implicitly signaled in the following way.

3. In a first method, when A/N feedback transmission is indicated for only one (PDSCH) slot group corresponding to a current-ID through DCI, CTI information may be signaled through a NFI for feedback-ID (or NFI for other-ID) bit/field. When Type-3 is indicated through CTI, through a counter-DAI, a total-DAI bit/field, and/or a NFI for current-ID bit/field, a HARQ process ID group for A/N feedback and/or (in CA situation) CC/cell group may be indicated and/or NFI for Type-3 information may be signaled.

4. In a second method, when A/N feedback transmission is indicated for only one (PDSCH) slot group corresponding to a current-ID through DCI, CTI information may be signaled through a total-DAI for feedback-ID (or total-DAI for other-ID) bit/field. When Type-3 is indicated through CTI, through a counter-DAI, a total-DAI (for current-ID) bit/field, a NFI for current-ID, and/or a NFI for feedback-ID (or NFI for other-ID) bit/field, a HARQ process ID group and/or (in CA situation) CC/cell group to be A/N feedback target may be indicated and/or NFI information for Type-3 may be signaled.

Meanwhile, in order to prevent mismatch (A/N error caused by this) between a UE and a base station on whether to toggle an NFI related to Type-2a codebook-based A/N (for each of a plurality of (PDSCH) slot groups), and to ensure A/N feedback reliability, when transmitting A/N feedback based on Type-3 codebook, it may be operated to transmit the most recently received an NFI bit (e.g., through DCI indicating Type-2a codebook-based A/N feedback) for each of a plurality of (PDSCH) slot groups together through the same single PUCCH/PUSCH resource.

D. In relation to Fallback DCI-based DL scheduling i. Basically, a fallback DCI format may include/signal only current-ID information and/or counter-DAI information (related to a (PDSCH) slot group corresponding to a corresponding ID) among the basic information described above (for convenience, Case 1).

ii. As another method, all of the basic information except a total-DAI for current-ID may be included/signaled in a fallback DCI format.

iii. As another method, a fallback DCI format may be a form in which all of a slot group ID/index, a total-DAI, and an NFI are not included/signaled (for convenience, Case 2). Instead, a PDSCH scheduled from fallback DCI may be configured/defined as belonging to a slot group with a specific (e.g., lowest) ID/index.

iv. In this case, for information not included/signaled in fallback DCI, a UE may A/N codebook (payload) based on the most recently detected/received information through non-fallback DL DCI (e.g., feedback-ID (or total-ID), current-ID, NFI, total-DAI, CTI). Here, non-fallback DL DCI related to the recently detected/received information may be limited to only DCI indicating the HARQ-ACK (PUCCH) transmission time (slot) indicated through fallback DL DCI for the HARQ-ACK (PUCCH) transmission time.

1. If there is no non-fallback DCI indicating the same HARQ-ACK (PUCCH) transmission time as fallback DCI, according to Case 1, a UE may configure/transmit A/N feedback only for a slot group corresponding to a current-ID or a slot group corresponding to the lowest ID (in case of Case 2), and, for NFI for current-ID or the lowest ID, a UE may operate to assume/apply a toggled form (or a non-toggled form) (compared to previous A/N feedback or compared to previously (i.e., recently) received a NFI bit). In addition, a UE may operate by assuming/applying that CTI is indicated by a Type-2a codebook.

2. In addition, considering that NFI information is not included/signaled in DL fallback DCI as in Case 2 (therefore, A/N error may occur due to inconsistency on whether to toggle NFI between a UE and a base station), for a slot group with a specific (e.g., lowest) ID/index corresponding to DL fallback DCI (PDSCH scheduled therefrom), it may operate to transmit the most recently received an NFI bit (e.g., through DL non-fallback DCI) along with A/N feedback through the same single PUCCH/PUSCH resource.

In addition, additionally (for A/N feedback reliability) for other slot groups other than a slot group with a specific (e.g., lowest) ID/index, that is, for each slot group in which A/N feedback transmission is indicated, it can operate to transmit the most recently received an NFI bit (e.g., through DL non-fallback DCI) and A/N feedback through the same single PUCCH/PUSCH resource.

v. Meanwhile, in order to prevent in advance A/N feedback mismatch between a UE and a base station due to a UE's DL DCI detection failure, etc., (in case of Case 1) a plurality of fallback DL DCIs indicating the same HARQ-ACK (PUCCH) transmission time (e.g., slot) may be configured to indicate the same current-ID. Accordingly, a UE may operate by assuming that that all of a plurality of fallback DL DCIs indicating the same HARQ-ACK (PUCCH) transmission time indicate the same current-ID, and if other DCI is detected, a UE may ignore the DCI (discard). For example, a UE may not perform an operation indicated by the corresponding DCI.

E. In relation to CB group (CBG) based DL transmission operation i. For a CC/cell in which CBG based DL transmission is configured, total-DAI for feedback-ID (or total-DAI for other-ID) information may be individually signaled for an A/N sub-codebook corresponding to TB based transmission and an A/N sub-codebook corresponding to CBG based transmission.

2) Information signaled through UL grant DCI

A. Basically, it may include the following information (for convenience, basic information).

i. Total-DAI information for a first (PDSCH) slot group ID (hereinafter, first-ID)

ii. Total-DAI information for a second (PDSCH) slot group ID (hereinafter, second-ID)

iii. Notes

1. For example, when up to two (PDSCH) slot groups (index=0, 1) are defined/configured, a first-ID and a second-ID may correspond to slot group indexes 0 and 1, respectively.

2. As another example, a first-ID and a second-ID may be configured/replaced with a current-ID and a feedback-ID (or other-ID), respectively. In this case, current-ID information and feedback-ID (or total-ID) information may be further signaled through DCI.

A. In a case of feedback-ID, a total-ID is signaled through DCI, and feedback-ID information may be determined based on Method 1.

B. An other-ID may be determined as a slot group ID having a different value from a current-ID based on Method 2.

3. As another example, bitmap information for an entire slot group ID/index set (e.g., ID/index=0, 1) may be signaled through DCI. Whether a slot group corresponding to a corresponding ID is an A/N feedback request/transmission target for each slot group ID may be indicated through a corresponding group ID-bitmap.

4. Meanwhile, UL grant DCI may not include slot group ID/index-related information/signaling. In this case, a UE may operate to configure/transmit an A/N codebook (payload) based on the most recently detected/received slot group ID/index information through DL grant DCI. Here, DL grant DCI related to a slot group ID/index may be limited to only DCI indicating the PUSCH transmission time (slot) scheduled through UL grant DCI for the HARQ-ACK transmission time.

iv. As another method, UL grant DCI may be configured in a form including only single total-DAI information for one specific (PDSCH) slot group (ID/index). In the present disclosure, a (PDSCH) slot group is used equivalently with a PDSCH group, a slot group, and a PDSCH slot group. FIG. 14 illustrates an A/N codebook method based on a total-DAI. FIG. 14 is basically the same as FIG. 12B, except that the PUSCH transmission time scheduled by UL grant DCI overlaps the A/N transmission time, so that A/N information is piggybacked on a PUSCH. Here, a UL grant DCI may include only single total-DAI (UL t-DAI) information for one specific (PDSCH) slot group (ID/index). For convenience, it is assumed that UL t-DAI=3 is signaled. In Reference to FIG. 14, a UE may receive a PDSCH scheduled by DL grant DCI having c-DAI=00 in slot #n and receive a PDSCH scheduled by DL grant DCI having c-DAI=10 in slot #(n+2). Here, when UL t-DAI=3 is applied to a (PDSCH) slot group, a UE may generate/transmit A/N information only for 3 PDSCH receptions corresponding to consecutive DAI values (i.e., DAI=00/01/10) (hereinafter, DAI sequence). Here, an A/N response to PDSCH reception corresponding to DAI=01 is processed as a NACK. In addition, when UL t-DAI=3 is not applied to a (PDSCH) slot group, a UE may generate/transmit A/N information for PDSCH reception in all slots corresponding to a candidate HARQ timing, or generate/transmit A/N information based on a total-DAI (DL t-DAI) in DL grant DCI. The figure illustrates a case in which only c-DAI is included in DL grant DCI and t-DAI (DL t-DAI) is not included.

1. In this case, the PUSCH transmission time (e.g., PUSCH timing) corresponding to UL grant DCI for a specific (PDSCH) slot group (ID/index), among DL grant DCIs (or PDSCHs corresponding to the corresponding DL grant DCIs) indicated as the A/N feedback transmission time for a PDSCH (e.g., the corresponding A/N timing in a form of a valid or numeric value), may be determined as a (PDSCH) slot group (ID/index) to which a PDSCH (or a PDSCH received at the nearest time) scheduled through DL grant DCI received at the nearest time from the corresponding UL grant DCI reception time (or the corresponding PUSCH timing) belongs (hereinafter, method 1).

2. Alternatively, a specific (PDSCH) slot group may be (pre) configured/defined as a (PDSCH) slot group with a specific (e.g., lowest) ID/index (hereinafter, Method 2). When an ID/index is defined as an integer greater than or equal to 0, the lowest ID/index may be 0.

3. Alternatively, an ID/index (a field indicating this) of a specific (PDSCH) slot group may be signaled/included through UL grant DCI. In addition, whether or not A/N feedback transmission (a field indicating this) for other (PDSCH) slot group other than a specific (PDSCH) slot group may be signaled/included through the UL grant DCI.

Figure 15:
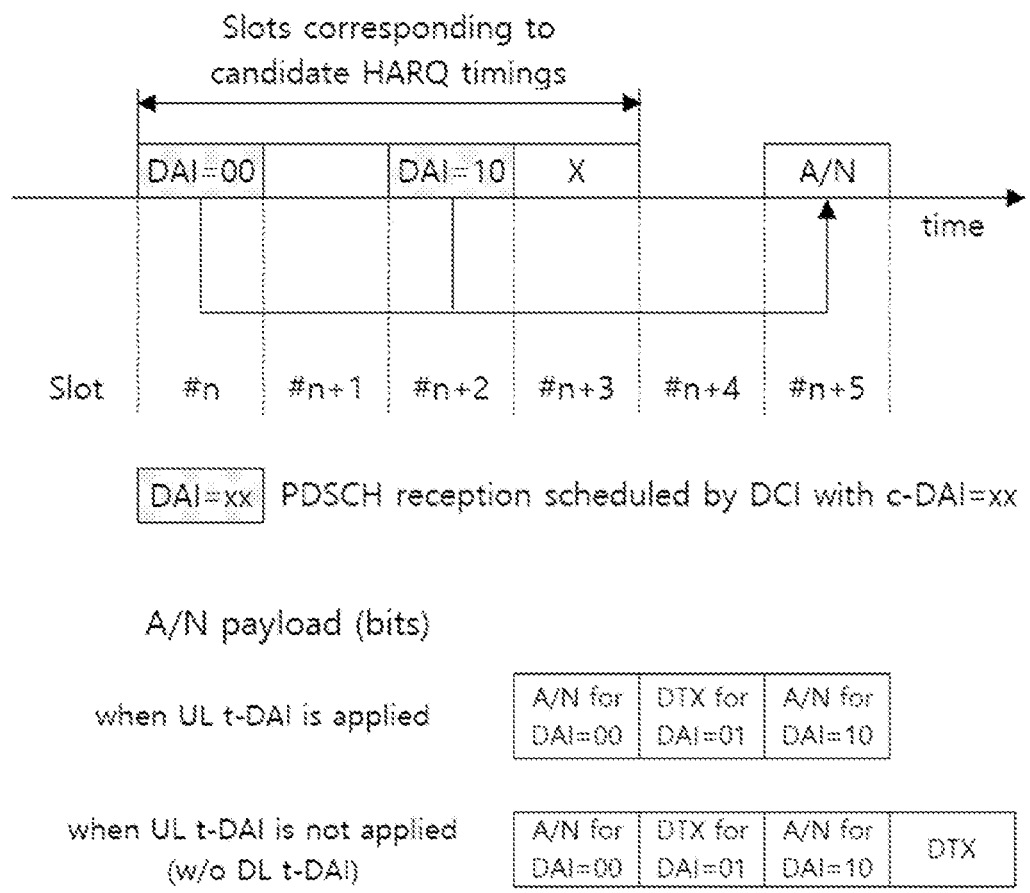
FIGS. 15 to 19 illustrates A/N transmission according to an embodiment of the present disclosure.

4. Meanwhile, for other (PDSCH) slot group, it may be operated to configure/transmit a corresponding A/N codebook (payload) based on the most recently detected/received information (e.g., total-DAI, NFI) through DL grant DCI. (refer to FIG. 15).

5. As another method, single total-DAI information signaled through UL grant DCI may be commonly applied to a plurality (e.g., two) of slot groups (hereinafter, method 3).

A. As an example, total-DAI (e.g., UL DAI; UL t-DAI) information indicated by UL grant DCI, for each of a plurality of (PDSCH) slot groups, may be indicated as the maximum value among the last counter-DAI or total-DAI (e.g., DL DAI; DL t-DAI) values indicated through DL grant DCI.

B. Accordingly, a UE may operate to separately interpret a UL DAI value based on a DL DAI value received for each (PDSCH) slot group and configure/transmit a corresponding A/N codebook (payload).

C. For example, when DL DAIS of (PDSCH) slot groups 0 and 1 are 2 and 7, respectively, a UL DAI (modulo-4 operation applied) may be indicated as 3 (corresponding to the maximum value of 7). In this case, based on a DL DAI received for each (PDSCH) slot group, a UE may operate to interpret UL t-DAI values of (PDSCH) slot groups 0 and 1 as 3 and 7, respectively, and configure/transmit an A/N codebook (payload).

D. As another example, when DL DAIS of (PDSCH) slot groups 0 and 1 are 3 and 5, respectively, a UL DAI (modulo-4 operation is applied) may be indicated as 1 (corresponding to the maximum value of 5), and upon receiving this, a UE may operate to interpret UL t-DAI values of slot groups 0 and 1 as 5 and 5, respectively, and configure/transmit an A/N codebook (payload).

6. Meanwhile, the proposed methods, from a UE point of view, may be applied, Case 1) when PDSCH scheduling and/or A/N feedback is indicated from a base station for all of a plurality (e.g., two) of (PDSCH) slot groups (therefore, a UE feeds back all A/N codebooks for a plurality of (e.g., two) (PDSCH) slot groups), Case 2) when PDSCH scheduling and/or A/N feedback is indicated from a base station only for a single (PDSCH) slot group (e.g., current (PDSCH) slot group) (therefore, a terminal feeds back an A/N codebook only for a single (PDSCH) slot group), or Case 3) when PDSCH scheduling (e.g., DL grant DCI) and/or A/N feedback is not indicated from a base station for all of a plurality (e.g., two) (PDSCH) of slot groups (in this case, whether to piggyback A/N information to a PUSCH may be determined based on a total-DAI (UL DAI) value in UL grant DCI; A UL DAI is related to the presence/amount of A/N feedback requested by a base station. Therefore, if there is no PDSCH scheduling received and a UL-DAI is 0, a UE may determine that a base station has not actually scheduled a PDSCH to itself and may not perform A/N feedback. On the other hand, from the UE's point of view, if there is no PDSCH scheduling received, but UL-DAI is not 0, a UE may determine that a PDSCH scheduled by a base station (and DCI scheduling a PDSCH) is missed and may transmit A/N feedback corresponding to a UL DAI; For example, a UE may not piggyback A/N information to a PUSCH when a UL DAI is 0, and may piggyback A/N information to a PUSCH if a UL DAI is not 0). A/N feedback may be indicated through DCI with PDSCH scheduling, or may be indicated through DCI defined only for A/N feedback indication without PDSCH scheduling (e.g., A/N triggering DCI).

A. For example, in Case 1/3, Method 2 (or method 3) may be applied, and in Case 2, method 1 (or Method 2) may be applied. When method 2 is applied to Case 3, a UL DAI may be applied only to a (PDSCH) slot group with the lowest ID/index, and accordingly, a UE may transmit A/N feedback for a (PDSCH) slot group with the lowest ID/index through a PUSCH.

Figure 16:
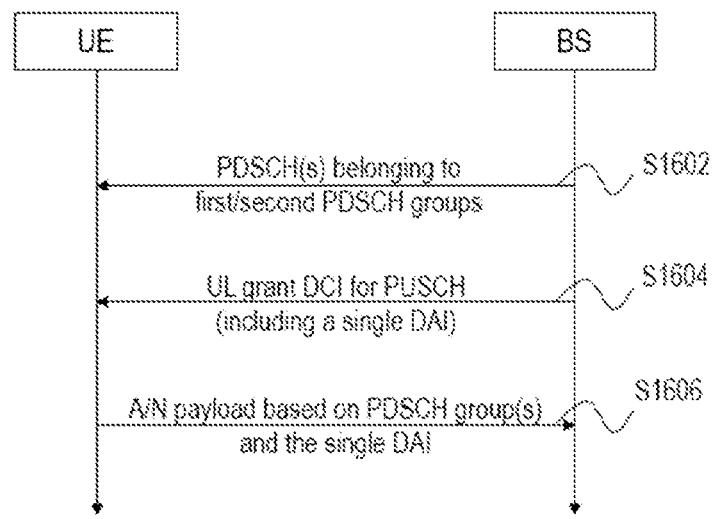
Figure 17:
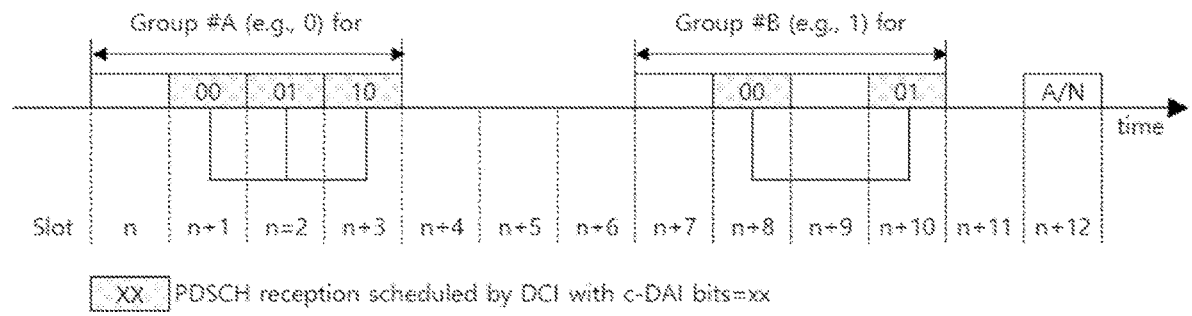

FIGS. 16-17 illustrate an A/N transmission process according to the present disclosure. The Figure illustrates a case in which method 2 is applied to Case 1/3, and method 1 is applied to Case 2. In the figure, a (PDSCH) group corresponds to a (PDSCH) slot group. In reference to the figure, a UE may receive at least one PDSCH from a base station (S1602), and each PDSCH may belong to one of a plurality (e.g., 2) of PDSCH groups. A PDSCH group to which a PDSCH belongs may be determined based on the current PDSCH group ID/index in DCI scheduling the corresponding PDSCH. In addition, a UE may receive DCI for scheduling a PUSCH from a base station (S1604). Here, DCI may include a single DAI associated with only one of a plurality of PDSCH groups. In this case, when the PUSCH transmission time overlaps the A/N transmission time, a UE may transmit control information including at least one of the following through a PUSCH (S1606): a first A/N codebook for a first PDSCH group and a second A/N codebook for a second PDSCH group. Here, in case for Case 2 (e.g., when PDSCH scheduling and/or A/N feedback is indicated from a base station only for a single (PDSCH) slot group (e.g., current (PDSCH) slot group)), based on control information including only an A/N codebook related to one PDSCH group (i.e., the current PDSCH group) among first and second A/N codebooks (e.g., when A/N feedback is indicated only for a single PDSCH group), a DAI is used to generate an A/N codebook included in control information (e.g., determine a size of an A/N codebook). That is, a PDSCH group to which a DAI is applied may vary according to which PDSCH group that an A/N codebook included in control information corresponds to. Here, a single PDSCH group may mean the most recently scheduled PDSCH group (refer to method 1). In this case, a PDSCH group to which a DAI is applied varies according to which PDSCH group is the most recently scheduled PDSCH group. Meanwhile, in Case 1 (e.g., when PDSCH scheduling and/or A/N feedback is indicated from a base station for all of a plurality (e.g., two) of (PDSCH) slot groups), based on control information including both first and second A/N codebooks (e.g., when A/N feedback is indicated for all of a plurality of PDSCH groups), a DAI may be used to generate an A/N codebook for a PDSCH group having the smallest index (e.g., 0) among a plurality of PDSCH groups (e.g., determine a size of an A/N codebook). That is, regardless of the current PDSCH group (e.g., group #B), a DAI is applied only to a PDSCH group of the smallest index (e.g., 0). For the remaining PDSCH group, a corresponding A/N codebook (payload) may be configured based on the most recently detected/received information (e.g., total-DAI, NFI) through DL grant DCI. In addition, in Case 3 (e.g., when PDSCH scheduling (e.g., DL grant DCI) is not detected for any PDSCH group), if A/N feedback is not indicated for any PDSCH group (except for UL grant DCI), control information may include only an A/N codebook for a PDSCH group of the smallest index (e.g., 0) among a plurality of PDSCH groups, a DAI may be used to generate a corresponding A/N codebook (e.g., determine a size of an A/N codebook). For the remaining PDSCH group, an A/N codebook (payload) may be configured based on FIG. 14. Here, control information may be transmitted in an unlicensed band (e.g., a shared spectrum).

7. Meanwhile, the DL (non-fallback) DCI may also be configured to include only single total-DAI (and/or NFI) information for a specific one (e.g., corresponding to the current-ID) slot group, accordingly, in configuring information/signaling included in DL/UL DCI, 1) both DL/UL DCI may be configured to include individual total-DAI (and/or NFI) information for each of a plurality (e.g., two) slot groups, or 2) both DL/UL DCI may be configured to include only total-DAI (and/or NFI) information for one specific slot group.

B. In addition, it may further include the following information.

i. NFI information for A/N feedback corresponding to a first-ID ii. NFI information for A/N feedback corresponding to a second-ID iii. Notes 1. In this case, A/N feedback transmission (through PUSCH) may be indicated to a UE without additional DL (PDSCH) scheduling/transmission from a base station.

2. Otherwise, UL grant DCI may not include NFI information for A/N feedback. In this case, a UE may operate to configure/transmit an A/N codebook (payload) based on the most recently detected/received NFI information through DL grant DCI (for each (PDSCH) slot group). Here, DL grant DCI related to NFI information may be limited to only DCI indicating the PUSCH transmission time (slot) scheduled through UL grant DCI for the HARQ-ACK transmission time for a PDSCH.

3. As another method, whether to include/configure NFI information/signaling (field for this) in UL grant DCI (for each slot group) may be configured to a UE (e.g., through a higher layer signal (e.g., RRC signaling)).

iv. As another method, a UL grant DCI may be configured to include only single NFI information for one specific (PDSCH) slot group (ID/index).

1. In this case, the PUSCH transmission time (e.g., PUSCH timing) corresponding to UL grant DCI for a specific (PDSCH) slot group (ID/index), among DL grant DCIs (or PDSCHs corresponding to DL grant DCIs) indicated (e.g., in a form of valid or a numeric value for the corresponding A/N timing) as the A/N feedback transmission time for a PDSCH, may be determined as a slot group (ID/index) to which a PDSCH scheduled through DL grant DCI received at the nearest time from the corresponding UL grant DCI reception time (or the corresponding PUSCH timing) (or a PDSCH received at the nearest time) belongs (hereinafter, method 1).

2. Alternatively, a specific (PDSCH) slot group may be (pre) configured/defined as a slot group with a specific (e.g., lowest) ID/index (hereinafter, method 2).

3. Alternatively, an ID/index (or a field indicating this) of a specific (PDSCH) slot group may be signaled/included through UL grant DCI. In addition, whether or not A/N feedback transmission (or a field indicating this) for other (PDSCH) slot group other than a specific (PDSCH) slot group may be signaled/included through the UL grant DCI.

4. Meanwhile, for other (PDSCH) slot group, it may be operated to configure/transmit a corresponding A/N codebook (payload) based on the most recently detected/received information (e.g., total-DAI, NFI) through DL DCI.

5. As another method, single total-NFI information signaled through UL grant DCI may be commonly applied to a plurality (e.g., two) of (PDSCH) slot groups (hereinafter, method 3).

6. Meanwhile, the above methods, from a UE point of view, may be applied, Case 1) when PDSCH scheduling and/or A/N feedback is indicated from a base station for all of a plurality (e.g., two) of (PDSCH) slot groups, Case 2) when PDSCH scheduling and/or A/N feedback is indicated from a base station only for a specific single (PDSCH) slot group, or Case 3) when PDSCH scheduling and/or A/N feedback is not indicated from a base station for all of a plurality (e.g., two) of (PDSCH) slot groups.

A. For example, in Case 1/3, Method 2 (or method 3) may be applied, and in Case 2, method 1 (or Method 2) may be applied.

7. Additionally, whether to include/configure (single) NFI information/signaling (a field for this) in UL grant DCI may configured to a UE (e.g., through a higher layer signal (e.g., RRC signaling))

C. In addition, it may further include the following information.

i. Whether to configure/transmit A/N feedback based on a Type-3 codebook (e.g., indicate which A/N codebook to configure/transmit among Type-2a and Type-3)

ii. Notes

1. If Type-3 is indicated through DCI (at the specific time), NFI information for Type-3 codebook-based A/N feedback may be additionally signaled through a corresponding DCI.

D. In relation to Fallback DCI-based UL Scheduling i. Basically, a fallback DCI format may be a (omitted) form in which all basic information is not included/signaled.

ii. Alternatively, a fallback DCI format may be a form in which all basic information (e.g., total-DAI and/or group ID-bitmap information for each of a first-ID and a second-ID) is included/signaled.

iii. Alternatively, a fallback DCI format may be a form in which {a total-DAI for a first-ID, a total-DAI for a second-ID, NFI for a first-ID, NFI for a second-ID} is included/signaled.

iv. Alternatively, a fallback DCI format may be a form in which {NFI for a first-ID, NFI for a second-ID} (and/or group ID-bitmap information) is included/signaled.

v. In this case, with respect to information not included/signaled in UL grant DCI, a UE may operate to configure/transmit an A/N codebook (payload) based on the most recently detected/received information (e.g., a slot group ID/index, a total-DAI, NFI, a CTI) through DL grant DCI. Here, DL grant DCI related to the recently detected/received information may be limited to only DCI indicating the PUSCH transmission time (slot) scheduled through UL grant DCI for the HARQ-ACK transmission time for a PDSCH.

vi. Meanwhile, when an A/N is piggybacked and transmitted through a CG-PUSCH transmitted without DCI in a configured (Configured Grant, CG) form rather than scheduling accompanying dynamic grant DCI transmission, a UE may operate to configure/transmit an A/N codebook (payload) based on the most recently detected/received information (e.g., a slot group ID/index, a total-DAI, NFI, a CTI) through DL grant DCI. Here, DL grant DCI related to the recently detected/received information may be limited to only DCI indicating the CG-PUSCH transmission time (slot) for the HARQ-ACK transmission time for a PDSCH.

E. In relation to CB group (CBG) based DL transmission operation i. For a CC/cell in which CBG based DL transmission is configured, total-DAI (e.g., a total-DAI for a first-ID and a total-DAI for a second-ID) information may be individually signaled for an A/N sub-codebook corresponding to TB based transmission and an A/N sub-codebook corresponding to CBG based transmission.

Meanwhile, when a UE configures/transmits A/N feedback on a PUCCH/PUSCH based on a Type-2a codebook, a method for a base station to indicate/recognize that "there is no A/N feedback to be piggybacked and transmitted on a PUSCH" to a UE may be needed. For this, the following DCI signaling and operation may be considered.

1) Method 1

A. When a total-DAI bit in UL grant DCI is indicated as '11' (or a total-DAI value is 4) and when there is no DL grant DCI detected during a bundling window duration (or an interval from the previous (e.g., recent) A/N feedback transmission time (or the time indicated by the corresponding transmission time) to a PUSCH transmission timing) corresponding to the PUSCH transmission time and when a NFI bit indicated through UL grant DCI is toggled (compared to the previous A/N feedback or compared to the previous (e.g., recent) received NFI bit), a UE may operate not to piggyback any A/N on a PUSCH. This method may be applied to a method for signaling NFI information through UL grant DCI. Here, a check for DCI information check and a corresponding UE's operation may be performed independently/individually for each (PDSCH) slot group (ID).

B. In another method, for detected/received UL grant DCI (in the absence of separate NFI information signaling through UL grant DCI), the check for DCI/UE's operation is applied/performed, and a NFI bit may be assumed to be non-toggled (or toggled) (compared to the previous A/N feedback or compared to the previous (recently) received NFI bit). This method may be applied to the case of UL grant DCI (format) without separate NFI information signaling (e.g., fallback).

2) Method 2

A. One of states signaled by a total-DAI field in UL grant DCI may be defined as indicating "no A/N feedback" (to be piggybacked on PUSCH). When a corresponding state is indicated through DCI, a UE may operate not to piggyback on any A/N on a PUSCH. This method may be applied to a method without NFI information signaling through UL grant DCI. Here, a check for DCI information and a corresponding UE's operation may be performed independently/individually for each (PDSCH) slot group (ID).

3) Method 3

A. Only one (PDSCH) slot group (e.g., first-ID) may be indicated through first-ID and second-ID (or current-ID and feedback-ID (or total-ID)) bits/fields in UL grant. In this case, through a specific total-DAI field (e.g., a total-DAI field for a second-ID), 1) A/N feedback for only one indicated slot group (e.g., first-ID) (piggyback on a PUSCH)) may be indicated to configure/transmit, or 2) it may be indicated that there is no A/N feedback to be piggybacked on a PUSCH even for an indicated slot group (e.g., first-ID) (i.e., for all slot groups (first-ID and second-ID)). This method may be applied to a method for signaling (PDSCH) slot group ID information through UL grant DCI (there is no NFI information signaling through UL grant DCI). For example, slot group ID information includes a first-ID and a second-ID (or current-ID and feedback-ID (or total-ID)) information).

Meanwhile, it may be assumed that A/N feedback is configured/transmitted on a PUCCH/PUSCH based on the Type-2a codebook (and there is no separate NFI information signaling through UL grant DCI). In this case, during a bundling window period corresponding to the PUSCH transmission time (or a period from the previous (recent) A/N feedback transmission time (or the time indicated by the corresponding transmission timing) to the PUSCH transmission time), (DL grant) DCI scheduling a PDSCH belonging to a specific (PDSCH) slot group (ID) or indicating A/N feedback for a corresponding (PDSCH) slot group may not be detected/received. In this case, in a state where it is assumed/considered that an NFI bit corresponding to a corresponding (PDSCH) slot group (ID) is toggled (or non-toggled) (compared to the previous A/N feedback or compared to the previous (recently) received NFI bit), a UE may or may not configure an A/N payload corresponding to a corresponding (PDSCH) slot group (ID) on a PUSCH based on a total-DAI value indicated through UL grant DCI. For example, when a total-DAI value is 4, a UE may not configure an A/N payload corresponding to a corresponding (PDSCH) slot group (ID) (i.e., 0-bit A/N). On the other hand, when a total-DAI value is not 4, a UE may configure an A/N payload (i.e., 1-bit or more A/N) corresponding to a corresponding (PDSCH) slot group (ID).

Prior to the description of another method, in a situation where it is operated to configure/transmit A/N feedback on a PUCCH/PUSCH based on a Type-2a codebook (and there is no separate NFI information signaling through UL grant DCI), during a bundling window period corresponding to the PUSCH transmission time, a case in which (DL grant) DCI scheduling belonging to a specific (PDSCH) slot group (ID) is not detected/received, a case in which (DL grant) DCI indicating A/N feedback for a corresponding (PDSCH) slot group is not detected/received, or a case in which (DL grant) DCI indicating NFI information for a corresponding (PDSCH) slot group is not detected/received is referred to as "no PDSCH case" for convenience.

If "no PDSCH case", in a state where it is assumed/considered that an NFI bit value corresponding to a corresponding (PDSCH) slot group (ID) is not toggled (or toggled) (compared to the previous (recent) received NFI value), a UE may operate to configure or not to configure an A/N payload corresponding to a corresponding (PDSCH) slot group (ID) on a PUSCH based on a corresponding NFI value and a total-DAI value indicated through UL grant DCI. For example, when a total-DAI value N is 4 (e.g., N=4), a UE may not configure an A/N payload (i.e., 0-bit A/N). On the other hand, when a total-DAI value N is not 4 (e.g., N<4), a UE may configure an A/N payload (i.e., 1-bit or more A/N) to piggyback on a PUSCH. Here, a UE may configure an A/N payload for {N+4M} (M is an integer greater than or equal to 0) PDSCHs (or N PDSCHs) based on non-toggle NFI assumption (or toggled NFI assumption).

As an example, in a situation in which a T-DAI is configured to be indicated for each (PDSCH) slot group through UL grant DCI, If "no PDSCH case" for a specific (PDSCH) slot group, the proposed operation may be applied to a corresponding (PDSCH) slot group. As another example, in a situation in which only one T-DAI is configured to be indicated through UL grant DCI, if "no PDSCH case" for all (PDSCH) slot groups, the proposed operation may be applied to a specific (e.g., having the lowest group ID/index) (PDSCH) slot group.

In another way, if "no PDSCH case", a UE may assume that an NFI bit value corresponding to a corresponding (PDSCH) slot group (ID) remains the same as the previous (recently) received NFI value (e.g., it is not toggled from the previous (recently) received NFI value), and without considering a corresponding NFI value, a UE may operate to configure or not to configure an A/N payload corresponding to a corresponding (PDSCH) slot group (ID) on a PUSCH based only on a total-DAI value indicated through UL grant DCI. For example, when a total-DAI value N is 4 (e.g., N=4), a UE may not configure an A/N payload (i.e., 0-bit A/N). On the other hand, when a total-DAI value N is not 4 (e.g., N<4), a UE may configure an A/N payload (i.e., 1-bit or more A/N) to piggyback on a PUSCH. In this case, a UE may configure A/N payloads for N PDSCHs (corresponding to counter-DAI values from 1 to N).

As an example, in a situation in which a T-DAI is configured to be indicated for each (PDSCH) slot group through UL grant DCI, if "no PDSCH case" for a specific (PDSCH) slot group, the proposed operation may be applied to a corresponding (PDSCH) slot group. As another example, in a situation in which only one T-DAI is configured to be indicated through UL grant DCI, if "no PDSCH case" for all (PDSCH) slot groups, the proposed operation may be applied to a specific (e.g., having the lowest group ID/index) (PDSCH) slot group.

In another way, if "no PDSCH case", a UE may assume that an NFI bit value corresponding to a corresponding (PDSCH) slot group (ID) remains the same as the previous (recently) received NFI value (e.g., it is not toggled from the previous (recently) received NFI value), and in a state where a UE considers that a PDSCH(s) corresponding to a total-DAI value indicated through UL grant DCI does not belong to any (PDSCH) slot group (ID), a UE may operate to configure or not to configure an A/N payload only for a corresponding PDSCH(s). For example, when a total-DAI value N is 4 (e.g., N=4), a UE may not configure an A/N payload (i.e., 0-bit A/N). On the other hand, when a total-DAI value N is not 4 (e.g., N<4), a UE may configure an A/N payload (i.e., 1-bit or more A/N) to piggyback on a PUSCH. In this case, a UE may configure A/N payloads for N PDSCHs (corresponding to counter-DAI values from 1 to N) to piggyback on a PUSCH.

As an example, in a situation in which a T-DAI is configured to be indicated for each (PDSCH) slot group through UL grant DCI, if "no PDSCH case" for a specific PDSCH group, the proposed operation may be applied in a state that a PDSCH(s) corresponding to a T-DAI configured in a corresponding (PDSCH) slot group does not belong to any PDSCH group. As another example, in a situation in which only one T-DAI is indicated through UL grant DCI, if "no PDSCH case" for all PDSCH groups, the proposed operation may be applied in a state in which it is considered that a PDSCH(s) corresponding to a corresponding T-DAI does not belong to any (PDSCH) slot group.

Meanwhile, in the case of scheduling/indicating (multi-slot scheduling) a plurality of PUSCH resources transmitted over a plurality of slots through single UL grant DCI, an operation of applying total-DAI, NFI, and/or CTI information may be required. The corresponding information may be applied only to, among a plurality of slots or PUSCH resources scheduled through DCI, 1) (a) a PUSCH resource in a first slot (i.e., first-slot PUSCH), (b) a first PUSCH resource (i.e., first PUSCH), (c) an initial PUSCH resource composed of more than a specific number of symbols (or the number of non-DMRS symbols) and/or a specific number of RBs (or the number of REs or the number of non-DMRS REs), (d) a PUSCH resource allocated in a slot immediately following a first slot in which PUSCH transmission is indicated, or (e) a first PUSCH resource (i.e., first full-PUSCH) having the same symbol duration as a slot duration (for example, a specific one resource of the plurality of resources or specific combinations of resources), alternatively, may be applied only to 2) (a) a first successful first-slot PUSCH in LBT (CCA through it), or (b) a first full-PUSCH, alternatively, may be applied only to 3) (a) a first-slot PUSCH in which A/N feedback is transmitted in a piggybacked form, (b) a first PUSCH, or (c) a first full-PUSCH. For the remaining slots or PUSCH resources other than the above, a) an A/N codebook (payload) may be configured/transmitted based on the most recently detected/received information (e.g., a slot group ID/index, a total-DAI, NFI, a CTI, and/or information indicating whether to fallback A/N, information indicating the presence or absence of pended A/N to be described later) through DL grant DCI, and/or b) b) a specific (e.g., default) value may be assumed/applied for the information.

In the of case a), DL grant DCI related to the recently detected/received information may be limited to only DCI indicating the PUSCH transmission time (slot) for the HARQ-ACK transmission time for a PDSCH. Meanwhile, in the case of b), it can be assumed/applied as follows for at least one.

1) For a total-DAI, a total-DAI bit may be assumed/applied as '11' (or a total-DAI value is 4), 2) it may be assumed/applied to be toggled (or non-toggle) (compared to the previous A/N feedback or compared to the previous (e.g., recent) received NFI bit) for NFI, 3) it may be assumed/applied that a Type-2a (or Type-1/2 in the following case) codebook is indicated as the CTI, 4) in the following, it may be assumed/applied that there is no corresponding field/signaling for "information indicating whether A/N feedback based on a Type-1 codebook", 5) in the following, it may be assumed/applied that there is no corresponding pended A/N feedback for "information indicating the presence or absence of Pended A/N".

(b) DCI Configuration and Signaling Information when Configuring Type-1/2 A/N Codebook 1) Information signaled through DL grant DCI
A. Basically, it may include the following information (for convenience, basic information).
  i. Information indicating whether to fallback A/N (for Type-1 codebook)
  ii. Notes
    1. The information may indicate whether only one fallback DCI scheduling PCell (PDSCH transmission through the PCell) is transmitted during one bundling window period. The information can be configured/signaled with only 1-bit.
  iii. Counter-DAI and total-DAI indication information (for Type-2 codebook)
B. It may additionally include the following information.
  i. Whether to configure/transmit A/N feedback based on a Type-3 codebook (e.g., CTI signaling indicating which A/N codebook to configure/transmit among Type-1 or 2 and Type-3)
  ii. Notes
    1. If Type-3 is indicated through DCI (at the specific time), NFI information for Type-3 codebook-based A/N feedback may be additionally signaled through a corresponding DCI.
C. It may additionally include the following information.
  i. Information indicating the presence or absence of Pended A/N
  ii. Notes
    1. The information may indicate whether the final A/N feedback is configured by further including A/N with a pending indication (at the previous time) (i.e., pended A/N) in an A/N payload configured based on a Type-1 or Type-2 codebook.
D. In relation to Fallback DCI-based DL Scheduling
  i. For Type-1 codebook
    1. Basically, a corresponding DCI format (at least corresponding to a PCell/PSCell) may have a form in which the basic information is included/signaled.
    2. Additionally, a fallback DCI format corresponding to a SCell (except for a PCell/PSCell) may have a form in which the basic information is not included/signaled.
  ii. For Type-2 codebook
    1. Basically, a fallback DCI format may have a form in which only counter-DAI from the basic information is included/signaled.
E. In relation to CB group (CBG) based DL transmission operation
  i. When CC/cell in which CBG based DL transmission is configured or when CA including a CC/cell in which CBG based DL transmission is configured, a pended A/N payload may be determined based on the maximum number of (transmissible) CBGs configured for all cells/CCs, that is, the maximum value among the number of (transmissible) CBGs configured for each cell/CC. When a CC/cell in which TB based transmission is configured, or when only CCs/cells in which TB based transmission is configured are aggregated, a pended A/N payload may be determined based on the maximum number of (transmissible) TBs configured for all cells/CCs, that is, the maximum value among the number of (transmissible) TBs configured for each cell/CC.

2) Information signaled through UL grant DCI
A. Basically, it may include the following information (for convenience, basic information).
  i. Information indicating whether A/N feedback based on a Type-1 codebook (For Type-1 codebook)
  ii. Notes
    1. The information may indicate whether to transmit be piggyback an A/N payload configured based on a type-1 codebook to a PUSCH (or whether to piggyback O-bit (i.e., omit piggyback) or just fallback A/N) and transmit it.
  iii. Total-DAI indication information (for Type-2 codebook)
B. It may further include the following information.
  i. Whether to configure/transmit A/N feedback based on a Type-3 codebook (e.g., indicate which A/N codebook to configure/transmit among Type-1 or 2 and Type-3)
  ii. Notes
    1. If Type-3 is indicated through DCI (at the specific time), NFI information for Type-3 codebook-based A/N feedback may be further signaled through the DCI.

C. It may further include the following information.

i. Information indicating the presence or absence of Pended A/N ii. Notes

1. The information may indicate whether the final A/N feedback is configured by further including A/N with a pending indication (at the previous time) (i.e., pended A/N) in an A/N payload configured based on a Type-1 or Type-2 codebook.

D. In relation to Fallback DCI-based UL Scheduling i. Basically, a fallback DCI format may have a form in which the basic information is not included/signaled.

ii. For information not included/signaled in UL grant DCI, a UE may operate to configure/transmit an A/N codebook (payload) based on the most recently detected/received information (e.g., information indicating whether fallback A/N (for Type-1 codebook), counter-DAI/total-DAI information (for Type-2 codebook), a CTI, information indicating the presence or absence of pended A/N) through DL grant DCI. Here, DL grant DCI related to the recently detected/received information may be limited to only DCI indicating the PUSCH transmission time (slot) scheduled through UL grant DCI for the HARQ-ACK transmission time for a PDSCH.

iii. Meanwhile, an A/N may be piggybacked and transmitted through a CG-PUSCH transmitted without DCI in a CG (Configured Grant) form rather than scheduling accompanying dynamic grant DCI transmission. In this case, a UE may configure/transmit an A/N codebook (payload) based on the most recently detected/received information (e.g., information indicating whether fallback A/N (for Type-1 codebook), counter-DAI/total-DAI information (for Type-2 codebook), a CTI, information indicating the presence or absence of pended A/N) through DL grant DCI. Here, DL grant DCI related to the recently detected/received information may be limited to only DCI indicating the CG-PUSCH transmission time (slot) for the HARQ-ACK transmission time for a PDSCH.

E. In relation to CB group (CBG) based DL transmission operation i. Similar to the case of the DL grant DCI above, a pended A/N payload may be determined based on the maximum number of (transmittable) CBGs or TBs configured in all cells/CCs.

Meanwhile, (Type-2a or Type-1 or Type-2 A/N codebook configuration and according to this) an DL/UL grant DCI information configuration and signaling operation may be limited to a case in which a PUCCH cell/CC (e.g., PCell or PSCell) configured to perform PUCCH transmission in a CA situation is a cell/CC operating on a U-band. In this case, DL/UL grant DCI corresponding to all cells/CCs in CA may be configured according to the method proposed in the present disclosure. Meanwhile, when a PUCCH cell/CC is a cell/CC operating on an L-band (in the state in which the existing Type-1 or Type-2 A/N codebook is configured), the same DL/UL grant DCI information configuration and signaling operation as existing one may be applied. In this case, DL/UL grant DCI corresponding to all aggregated cells/CCs may be configured the same as existing one.

As another method, Type-2a or Type-1 or Type-2 A/N codebook configuration and configuration/signaling of DL/UL grant DCI information according to this may be limited to a case in which a cell/CC operating on a U-band is included in a multi-carrier, that is, a set of a plurality of cells/CCs configured as CA to a UE. In this case, DL/UL grant DCI corresponding to all aggregated cells/CCs may be configured as in the above-described proposed method.

Meanwhile, when multi-carrier includes only a cell/CC operating on a L-band, the existing Type-1 or Type-2 A/N codebook configuration and configuration/signaling of the existing DL/UL grant DCI information according to this may be applied. In this case, DL/UL grant DCI corresponding to all aggregated cells/CCs may be configured the same as existing one.

(5) Proposed Method 4

(a) A/N feedback update for a specific PDSCH

For a specific PDSCH or HARQ process ID, a processing time (required for PDSCH decoding and A/N preparation operation) may be insufficiently scheduled/indicated from a base station (compared to the minimum processing time that a UE can support). In this case, a UE may operate to feeds back a NACK (or DTX) for a corresponding PDSCH (or HARQ process ID) through the (first) A/N (PUCCH) transmission time indicated by DCI (corresponding to a corresponding PDSCH).

Thereafter, (in a situation where there is no separate retransmission scheduling from a base station for the PDSCH (or HARQ process ID)) (Type-2a codebook-based) A/N feedback transmission for a slot group ID including the PDSCH or (Type-3 codebook-based) A/N feedback transmission for a HARQ process group including the HARQ process ID may be (again) indicated from a base station. In this case, a UE may update A/N feedback for a corresponding PDSCH (or HARQ process ID) by reflecting the actual/final decoding result of a corresponding PDSCH (or HARQ process ID). For example, when a decoding result is an ACK, an ACK for a corresponding PDSCH (or HARQ process ID) may be fed back through the A/N (PUCCH) transmission time indicated (again) from a base station.

Meanwhile, the above operation may be applied regardless of whether or not NFI toggling corresponding to a PDSCH (or HARQ process ID), or applied only in one case among a case in which corresponding NFI is non-toggled and a case in which corresponding NFI is toggled. In this case, in another case, the feedback update as described above may be omitted (e.g., the previous feedback is maintained).

Additionally, when a processing time for a HARQ process ID is insufficiently scheduled/indicated from a base station, an update (hereinafter, updated feedback) of HARQ-ACK feedback transmitted by a UE through the corresponding HARQ-ACK transmission time may vary according to an NDI value indicated for the corresponding HARQ process ID. For example, in a situation in which an NDI value is not toggled (compared to the previous value), when a UE previously fed back an ACK for a corresponding HARQ process ID and/or an actual/final PDSCH decoding result was an ACK, a UE may update/report HARQ-ACK feedback (e.g., updated feedback) with an ACK. As another example, in a situation in which an NDI value is not toggled (relative to the previous value), when a UE previously fed back a NACK for a corresponding HARQ process ID and/or an actual/final PDSCH decoding result was aNACK, a UE may report HARQ-ACK feedback (e.g., updated feedback) with aNACK. As another example, when a NDI is indicated in a toggled state (compared to the previous value) and a new TB or PDSCH is scheduled/transmitted, due to a lack of processing time for a corresponding TB or PDSCH, a UE may report HARQ-ACK feedback (e.g., updated feedback) with an invalid value (e.g., NACK).

(b) CBG Retransmission Set CC Related A/N Feedback

When A/N feedback transmission based on a Type-3 codebook is indicated by a base station, a method of configuring an A/N payload on a PUCCH (or PUSCH) may be required. Specifically, with respect to a CC index set configured for a UE, a HARQ process ID/index set configured for each CC, the (maximum) TB index set or CBG index set configured for each CC, it may need to be determined in which order to map A/N bits corresponding to each {CC, HARQ ID, TB, or CBG} combination.

In consideration of this, a method of mapping A/N bits in a "TB/CBG index first→HARQ process index second→CC index third" method may be considered. For example, "1) for the lowest CC index/lowest HARQ process index, the A/N corresponding to from the lowest TB/CBG index (up to the highest TB/CBG index) is sequentially mapped, 2) for the lowest CC index/2nd lowest HARQ process index, the A/N corresponding to from the lowest TB/CBG index, is sequentially mapped, . . . 3) for the lowest CC index/highest HARQ process index, the A/N corresponding to from the lowest TB/CBG index is sequentially mapped, 4) for the 2nd lowest CC index/lowest HARQ process index, the A/N corresponding to from the lowest TB/CBG index is sequentially mapped, . . . ", the A/N may be mapped in the above order.

Meanwhile, when A/N feedback transmission based on a Type-3 codebook is indicated from a base station, a size of an A/N payload transmitted through a PUCCH (or PUSCH) may increase in proportion to the number of CCs configured for a UE, the number of HARQ processes configured for each CC, the maximum number of TBs or the maximum number of CBGs configured for each CC. Among them, in particular, the number of CBGs may be a factor in rapidly increasing a size of an A/N payload compared to other parameters, which may cause a lot of PUCCH resource overhead.

Considering the problem of increasing UL (PUCCH) resource overhead as above, when A/N feedback transmission based on a Type-3 codebook is indicated, for a CC in which CBG based (re)transmission is configured, it may be operated to generate/map/transmit a TB-level A/N for each HARQ process ID. Although not limited thereto, for a CC in which CBG based (re)transmission is configured, TB-level A/N may be generated by bundling A/N between CBs or between CBGs corresponding to the same single HARQ process ID. For example, TB-level A/N may be generated by applying a logical AND operation between CB-level A/Ns for each of the plurality of CBs or between CBG-level A/Ns for each of the plurality of CBGs. Through this, an A/N payload size and PUCCH resource overhead may be reduced. Meanwhile, in a case of not A/N feedback transmission based on a Type-3 codebook (e.g., Type-1/2 codebook), for a CC in which CBG based (re)transmission is configured, it may be operated to generate/map/transmit CBG-level A/N for a corresponding PDSCH (or HARQ process ID).

Alternatively, when Type-3 codebook-based A/N feedback transmission is indicated, for a CC configured for CBG based (re)transmission, whether to generate/transmit TB-level A/N, or to generate/transmit CBG-level A/N may be configured through a higher layer signal (e.g., RRC signaling).

(c) Handling for A/N Feedback Misalignment

In a situation in which A/N feedback transmission based on a Type-1 (or Type-2, Type-2a) codebook is configured, a UE may feedback/transmit an ACK for HARQ process ID=X at the specific time (e.g., slot #n). Thereafter, A/N feedback transmission based on a type-3 codebook at another specific time (e.g., slot #(n+K)) may be indicated from a base station to a UE. Meanwhile, when specific DCI schedules a PDSCH corresponding to HARQ process ID=X, the specific DCI may indicate the same time as the time (e.g., slot #(n+K)) at which type-3 codebook-based A/N transmission is indicated for A/N transmission timing for the PDSCH. If a UE fails to detect the corresponding DCI, A/N feedback misalignment (e.g., DTX-to-ACK error) may occur between a UE and a base station for HARQ process ID=X in a type-3 codebook. This may unnecessarily result in inefficient (RLC level) retransmissions.

To solve the above problem, if the specific time (e.g., slot Y) is indicated as the type-3 codebook-based A/N transmission time, a UE does not expect DCI (reception) indicating slot Y as A/N transmission timing while scheduling PDSCH transmission (and/or scheduling an initial transmission of a new TB (or indicating a toggled NDI value)), and may operate under the assumption that there is no such DCI. Accordingly, when receiving/receiving the DCI as described above, a UE may ignore the DCI. For example, a UE may not perform an operation indicated by the corresponding DCI.

In other words, with respect to a PDSCH corresponding to a specific HARQ process ID=X based on an arbitrary codebook size (e.g., type-1/2/2a/3 codebook), the time when a UE reports (transmits) an ACK may be slot Y, and thereafter, the time indicated as a HARQ-ACK feedback transmission timing (as an initial HARQ-ACK feedback time for HARQ process ID=X) based on a specific codebook type (e.g., type-3 codebook) may be slot Z. In this case, for an interval from slot Y (or a specific (e.g., next slot) time after slot Y) to slot Z (or a time before the minimum PDSCH processing time of the a UE from a PUCCH start symbol indicated in slot Z), it may be operated under the assumption that DCI (reception) scheduling a PDSCH corresponding to HARQ process ID=X (and/or scheduling an initial transmission of a new TB (or indicating a toggled NDI value)) is not expected, and there is no such DCI (For example, when receiving the DCI as described above, a UE may ignore the DCI).

Additionally, when a Type-3 codebook is configured, based on an arbitrary codebook type (e.g., Type-1/2/2a/3 codebook), a UE may operate to report (transmit) an ACK for PDSCH #1 corresponding to a specific HARQ process ID=X in the first A/N feedback time only once (and then reset the A/N state for HARQ process ID=X to DTX or NACK). Accordingly, if there is no additional PDSCH scheduling for HARQ process ID=X from the initial A/N feedback time to the next A/N feedback time, the corresponding A/N may be reported as DTX/NACK. On the other hand, if there is scheduling of additional PDSCH #2 for HARQ process ID=X from the initial A/N feedback time to the next A/N feedback time, 1) if PDSCH #2 is transmission for new data (TB) (scheduled by DCI with toggled NDI), an ACK or NACK corresponding to the decoding result for PDSCH #2 is reported, or 2) if PDSCH #2 is a retransmission for the previous data transmission (e.g., TB transmitted through PDSCH #1) (scheduled by DCI with non-toggle NDI), an ACK (corresponding to the previous A/N state) may be reported (i.e., exceptionally without resetting the previous A/N state). Meanwhile, a criterion/whether to reset an A/N state (to DTX/NACK) may be determined according to whether a UE actually transmits A/N feedback (e.g., ACK). As an example, when a UE fails to LBT and drops A/N (PUCCH/PUSCH) transmission, the UE may maintain the corresponding A/N state without resetting (e.g., with ACK).

As another method, when a UE feedbacks/transmits an A/N for a specific HARQ process ID=X based on a Type-3 codebook, an A/N state (e.g., ACK) reported (transmitted) at the previous A/N feedback time (based on a random (e.g., Type-1/2/2a/3) codebook) for HARQ process ID=X may be reset (to DTX or NACK). Accordingly, if there is no additional PDSCH scheduling for HARQ process ID=X from the previous A/N feedback time to the Type-3 codebook-based feedback time, the corresponding A/N may be reported as DTX/NACK. If there is additional PDSCH scheduling for HARQ process ID=X from the previous A/N feedback time to the Type-3 codebook-based feedback time, 1) if the PDSCH is transmission for new data (scheduled by DCI with toggled NDI), an ACK or NACK corresponding to the decoding result for the PDSCH is reported, or 2) if the PDSCH is a retransmission for the previous data transmission (scheduled by DCI with non-toggle NDI), an ACK may be reported (corresponding to the previous A/N state) (i.e., exceptionally without resetting the previous A/N state). Meanwhile, a criterion/whether to reset an A/N state (to DTX/NACK) may be determined according to whether a UE actually transmits A/N feedback (e.g., ACK). As an example, when a UE fails to LBT and drops A/N (PUCCH/PUSCH) transmission, the UE may maintain the corresponding A/N state without resetting (e.g., with ACK).

Meanwhile, for the DCI that a UE does not expect and ignore, DCI that schedules PDSCH transmission and at the same time indicates type-3 codebook-based A/N transmission may be excluded. That is, the UE may perform a corresponding operation without ignoring the corresponding DCI. For example, a UE may configure/transmit type-3 codebook-based A/N feedback including an A/N for PDSCH scheduled by the corresponding DCI.

As another method, a method of feeding back an NDI bit (most recently) received through DL grant DCI and an A/N bit for the corresponding PDSCH together for each HARQ process ID may be considered. As another method, a method of feeding back a calculated bit by performing an XOR (exclusive OR) operation on an NDI bit (most recently) received through DL grant DCI and an A/N bit (e.g., NACK to bit '0', ACK to bit '1') for the corresponding PDSCH for each HARQ process ID may be considered.

Meanwhile, in consideration of an application of the above methods, for a CC in which (re)transmission/feedback is configured in units of CBG and/or a CC in which spatial bundling (according to logical AND operation) between A/Ns for each TB is configured, the following A/N feedback method may be considered.

1) In case of CC in which CBG unit transmission is configured
  A. Base
    i. Assume the maximum number of CBGs (per TB) configured for the corresponding CC is N.
  B. Opt 1
    ii. For each HARQ process ID, N bits calculated by performing an XOR operation on an NDI bit (for each TB) and each of N A/N bits corresponding to N CBGs are fed back.
  C. Opt 2
    i. For each HARQ process ID, a single A/N bit is generated by first applying bundling (according to logical AND operation) between A/Ns corresponding to N CBGs (for each TB), and a single bit calculated by performing an XOR operation on the corresponding A/N bit and an NDI bit is fed back.
  D. Opt 3
    i. For each HARQ process ID, a single A/N bit is generated by bundling (according to logical AND operation) between A/Ns corresponding to N CBGs (for each TB), and the corresponding A/N bit and an NDI bit (for the corresponding TB) are fed back together. (e.g., feedback 1-bit A/N and 1-bit NDI for each HARQ process ID (each TB of the corresponding HARQ process ID))
  E. Opt 4
    i. When CBG unit transmission is not configured (in any CC), (1-bit) A/N information and (1-bit) NDI information are fed back together for each TB of each HARQ process ID (for all CCs). When CBG unit transmission is configured (in at least one CC), only A/N bit for each TB/CBG (according to the maximum number of TB/CBGs configured in the corresponding CC) is fed back for each HARQ process ID (for all CCs).
  F. Note
    i. If an overall decoding result of a TB is ACK in Opt 1/2/3 (even if the number of CBGs included in the corresponding TB is less than N), an ACK bit is mapped to all N CBGs.

2) In case of CC in which spatial bundling is configured
  A. Base
    i. Assume that the maximum number of TBs configured for the corresponding CC is at least 2.
  B. Opt 1
    i. A single A/N bit is generated by applying spatial bundling between A/Ns corresponding to a plurality of TBs for each HARQ process ID, and a single bit calculated by performing an XOR operation on the corresponding A/N bit and an NDI bit corresponding to a specific one TB (among a plurality of TBs) is fed back.
  C. Opt 2
    i. A single A/N bit generated by applying spatial bundling between A/Ns corresponding to a plurality of TBs for each HARQ process ID and an NDI bit corresponding to a specific TB (among a plurality of TBs) are fed back together (e.g., each 1-bit A/N and 1-bit NDI feedback per HARQ process ID).
  D. Opt 3
    i. A single A/N bit generated by applying spatial bundling between A/Ns corresponding to a plurality of TBs for each HARQ process ID and a plurality of NDI bits corresponding to each of the plurality (e.g., L) of TBs are fed back together (e.g., 1-bit A/N and L-bit NDI feedback per HARQ process ID).
  E. Opt 4
    i. In case of Type-3 codebook-based A/N feedback, as an exception, the configured spatial bundling may not be applied. Accordingly, a single bit calculated by performing an XOR operation on an A/N bit and an NDI bit for each TB of each HARQ process ID is fed back.
  F. Opt 5
    i. In case of Type-3 codebook-based A/N feedback, as an exception, the configured spatial bundling may not be applied. Accordingly, an A/N bit and an NDI bit are fed back together for each TB of each HARQ process ID (e.g., 1-bit A/N and 1-bit NDI are fed back for each TB of each HARQ process ID).
  G. Opt 6
    i. If spatial bundling is not configured, (for all CCs) whether to feedback (1-bit) A/N information and (1-bit) NDI information together for each TB of each HARQ process ID, or only (1-bit) A/N information for each TB of ID each HARQ process is configured by a base station, a UE feeds back according to the corresponding configuration. In addition, when spatial bundling is configured, (for all CCs) only a single (bundled) A/N bit for a single TB or multiple TBs is fed back for each HARQ process ID (according to the maximum number of TBs configured for the corresponding CC).

H. Note i. In Opt 1/2, a specific TB (corresponding to the fed back NDI bit) may be applied as a TB with the lowest/highest index.

Meanwhile, when applying the method of feeding back an NDI bit and an A/N bit together (for each TB) for each HARQ process ID, when determining a PUCCH resource based on a corresponding UCI payload size and PRI indication through DCI, even if all frequency/time resources configured for the PUCCH are used, a case in which the maximum UCI coding rate (configured in the corresponding PUCCH) is exceeded may occur due to the large UCI payload size. In this case, transmission of an NDI bit (all or a specific part) in the proposed feedback may be omitted (dropped).

Additionally, in a situation in which the Type-1/2/2a codebook-based A/N feedback operation is configured, it may be dynamically indicated to transmit the Type-3 codebook-based A/N feedback through DCI. In this case, through a counter-DAI field and/or a total-DAI field and/or a current-ID (and feedback-ID or total-ID) field and/or an NFI field (configured for Type-1/2/2a codebook) in the corresponding DCI, a method of indicating a UE to transmit A/N feedback for which CC/HARQ group (among a plurality of pre-defined/configured CC groups and/or a plurality of HARQ (process ID) groups) may be considered.

And/or, in a situation in the Type-1/2/2a codebook-based A/N feedback operation is configured, when it is dynamically indicated to transmit the Type-3 codebook-based A/N feedback through DCI, through the corresponding DCI (e.g., a separate field or a counter-DAI field, a total-DAI field, a current-ID (and feedback-ID or total-ID) field and/or an NFI field (configured for Type-1/2/2a codebook)), it may be indicated whether to transmit only A/N feedback for each HARQ process ID for the entire (or specific indicated as above) CC/HARQ group or whether to transmit A/N feedback and a corresponding NDI together.

Meanwhile, in case of a candidate A/N timing set that may be indicated by DCI indicating A/N feedback based on Type-3 codebook (for the same CC or BWP), the same as a candidate A/N timing set that may be indicated by DCI indicating the Type-1/2/2a codebook-based A/N feedback may be configured, or they may be configured independently of each other (e.g., sets configured with different A/N timing values)).

(d) PDSCH Processing in which A/N Pending is Indicated

First, in a state in which a Type-1 A/N codebook method is configured to a UE, when a PDSCH in which A/N pending is indicated through specific DL grant DCI (e.g., in a form in which an A/N timing for a PDSCH is indicated as invalid or non-numeric value), for A/N feedback (hereinafter, pended A/N) for the corresponding PDSCH, 1) a form of transmitting (by a UE) the corresponding pended A/N in a form of a Type-3 A/N codebook by indicating a separate A/N pooling through DCI, or 2) an operation of appending the corresponding pended A/N to a Type-1 A/N codebook transmitted through an A/N timing indicated (e.g., indicated in a form in which an A/N timing for a PDSCH is indicated as valid or a numeric value) by another DL grant DCI without a separate A/N pooling may be considered. Meanwhile, when considering the operation of configuring and transmitting an A/N payload in a form of appending pended A/N to a Type-1 A/N codebook as described above, it is essential to configure/perform mapping so that 1) the total number of pended A/N information/bits to be appended, and 2) a mapping order of the corresponding pended A/N information/bit on the A/N payload match between a UE and a base station. If there is a mismatch between a UE and a base station with respect to the number/mapping of the pended A/N on the A/N payload, since UCI decoding performance is deteriorated and serious ACK/NACK errors (e.g., NACK-to-ACK) are generated, unnecessary PDSCH retransmission overhead and large latency may occur.

In consideration of the above problem, (maximum) pended A/N information/the number of bits (e.g., P bits) that can be appended to a Type-1 A/N codebook may be configured to a UE (by a base station) through RRC signaling. A UE may configure a final A/N payload by always appending the corresponding P bits to a Type-1 A/N codebook regardless of the presence or absence of an actual pended A/N. As another method, whether there is a pended A/N (or whether to appending the P bits) may be indicated to a UE (by a base station) through a specific (e.g., 1-bit) field in DCI (e.g., DL grant). According to information indicated by the corresponding field, a UE may configure a final A/N payload in a form that appends or does not append a pended A/N bit(s) (or the corresponding P bits) to a Type-1 A/N codebook. As another method, a plurality of candidates (having different values including 0) for the appended number of pended A/N bits P may be configured to a UE (through RRC), and a value of one of the candidates may be indicated through a specific field in DCI (e.g., DL grant). A terminal may configure a final A/N payload by appending the number of bits corresponding to the indicated value to a Type-1 A/N codebook.

Meanwhile, a final A/N payload may be configured in a form in which a Type-1 A/N codebook is preferentially mapped to a lower bit index part starting with a most significant bit (MSB) (e.g., configured as a form of a first A/N sub-codebook), and then pended A/N information is mapped (to a higher bit index part) after it (e.g., configured as a form of a second A/N sub-codebook). Additionally, in order to match a mapping order between pended A/N information/bits on an A/N payload, through a specific field in DCI (e.g., DL grant) indicating an A/N pending operation, an order value (e.g., counter-DAI) of the number of times a PDCCH/PDSCH corresponding to A/N pending indicated to a UE is scheduled/transmitted (among all PDCCH/PDSCHs for which A/N pending is indicated) may be indicated (by a base station). A UE may configure a final A/N payload in a form of appending the configured/mapped pended A/N bit(s) (payload) according to an order of the corresponding order value (in a Type-1 A/N codebook). In this case, a field indicating the order value in DCI (e.g., DL grant) may be applied as a field used for counter-DAI signaling, or may be determined/considered as a field for allocating a PUCCH resource (to be used for A/N feedback transmission) (e.g., PUCCH Resource Indicator, PRI).

Meanwhile, in a state in which an A/N pending operation is indicated for a corresponding PDSCH through DCI (e.g., DL grant) at a specific time, (pended) A/N feedback for the corresponding PDSCH may be transmitted through an A/N timing indicated (as a Type-1 codebook-based A/N feedback time) from another DCI at a specific time later. In this case, it may be necessary to determine the corresponding A/N timing (to which pended A/N is to be transmitted). For this purpose, through each DCI, whether to transmit (additionally) pended A/N (for a PDSCH in which A/N pending was indicated at the previous time) may be directly indicated at the A/N timing indicated by the corresponding DCI. Here, DCI may include, for example, DCI triggering A/N feedback based on a Type-1 codebook. As another method, the corresponding pended A/N may be transmitted (by adding) through the earliest among the A/N timings indicated from DCIs (e.g., A/N timing for a PDSCH is indicated as valid or a numeric value) transmitted after the (DCI or PDSCH transmission) time at which A/N pending is indicated (or, the earliest after the minimum PDSCH processing time of a UE from the PDSCH transmission time at which A/N pending is indicated among the indicated A/N timings, or the time indicated as the first A/N timing after the minimum PDSCH processing of a UE from the PDSCH transmission time at which A/N pending is indicated). As another method, the corresponding pended A/N may be transmitted (by adding) through the A/N timing indicated from the initial DCI (e.g., triggering Type-1 codebook-based A/N feedback and indicating A/N timing as valid or a numeric value) transmitted at (same slot) or after the PDSCH transmission time at which A/N pending is indicated. As another method, the corresponding pended A/N may be transmitted (by adding) through the A/N timing indicated by DCI (e.g., triggering Type-1 codebook-based A/N feedback and indicating A/N timing as valid or a numeric value) for scheduling the first PDSCH transmitted at (same slot) or after the PDSCH transmission time at which A/N pending is indicated.

Additionally, in order to prevent mismatch between a UE and a base station for A/N payload, a method of configuring/designating the time at which pended A/N transmission is allowable may be considered, as described above (transmitted through the same UL time by being appended to a Type-1 A/N codebook). Specifically, when an A/N pending operation is indicated for a PDSCH transmitted in slot #n or through DCI (e.g., DL grant) transmitted in slot #n, it may be configured/designated so that the corresponding pended A/N transmission is allowable only through a PUCCH (PUSCH) (carrying a Type-1 A/N codebook) transmitted through the time (and/or the time including/before slot #(n+T+F)) including/after slot #(n+T). In addition, when a PDSCH reception slot corresponding to pended A/N coincides with slot X included in a bundling window corresponding to an A/N transmission timing indicated through DCI (e.g., DL grant), a UE may configure a Type-1 A/N codebook for the bundling window in a form of mapping pended A/N information/bit to an A/N bit corresponding to slot X.

Meanwhile, when DL fallback DCI scheduling a Pcell and including counter-DAI=1 (the corresponding A/N is defined as "fallback A/N" for convenience) indicates a specific A/N timing and there is no other DL grant DCI indicating the corresponding A/N timing, according to the above scheme (or other schemes), the corresponding A/N timing may be determined as a timing of (additionally) transmitting a pended A/N (for a PDSCH in which A/N pending was indicated at the previous time). In this case, a UE may Opt 1) feedback/transmit a fallback A/N and the corresponding pended A/N together through the A/N timing, or Opt 2) operate to feedback/transmit only fallback A/N (same as before) through the A/N timing (therefore, in this case, as an exception, it operates not to add/feedback the pended A/N through a A/N timing indicated for fallback A/N transmission), or Opt 3) feedback/transmit by adding the corresponding pended A/N to the entire Type-1 codebook through the A/N timing (therefore, in this case, fallback A/N transmission is performed only through A/N timing that is not determined as the pended A/N feedback/transmission time).

In addition, in a state in which a Type-2 A/N codebook method is configured to a UE, in case of a PDSCH in which A/N pending is indicated through specific DL grant DCI (e.g., in a form in which an A/N timing for a PDSCH is indicated as invalid or non-numeric value), for (pended) A/N feedback for the corresponding PDSCH, 1) an operation of transmitting (by a UE) the corresponding pended A/N in a form of a Type-3 A/N codebook by indicating a separate A/N pooling through specific DCI, or 2) an operation of appending the corresponding pended A/N to a Type-2 A/N codebook transmitted through an A/N timing indicated (e.g., indicated in a form in which an A/N timing for a PDSCH is indicated as valid or a numeric value) by another DL grant DCI without a separate A/N pooling may be considered. Meanwhile, similarly, when considering the operation of configuring and transmitting an A/N payload in a form of appending pended A/N to a Type-2 A/N codebook as described above, it is essential to configure/perform mapping so that 1) the total number of pended A/N information/bits to be appended, and 2) a mapping order of the corresponding pended A/N information/bit on the A/N payload match between a UE and a base station (in terms of UCI decoding performance and PDSCH retransmission overhead/latency).

In consideration of this, in order to match (between a UE and a base station) the total number of pended A/N information/bits on an A/N payload and a mapping order between pended A/N information/bits, through a specific field in DCI (e.g., DL grant) indicating an A/N pending operation, information on an order value (e.g., counter-DAI) of the number of times a PDCCH/PDSCH corresponding to A/N pending indicated through the DCI is scheduled/transmitted (among all PDCCHs/PDSCHs for which A/N pending is indicated) and/or a total value (e.g., total-DAI) of the total number of PDCCHs/PDSCHs for which A/N pending is indicated to a UE until the current time may be informed (by a base station). Accordingly, a UE may configure a final A/N payload in a form of appending the pended A/N bit(s) (payload) (to a Type-2 A/N codebook) configured/mapped based on the corresponding total value and/or according to an order of the corresponding order value. Meanwhile, a final A/N payload may be configured in a form in which a Type-2 A/N codebook is preferentially mapped to a lower bit index part starting with a MSB (e.g., configured as a form of a first A/N sub-codebook), and then pended A/N information is mapped (to a higher bit index part) after it (e.g., configured as a form of a second A/N sub-codebook).

Meanwhile, in a state in which an A/N pending operation is indicated for a corresponding PDSCH through DCI (e.g., DL grant) at a specific time, (pended) A/N feedback for the corresponding PDSCH may be transmitted through an A/N timing indicated (as a Type-2 codebook-based A/N feedback time) from another DCI at a specific time later. In this case, it may be necessary to determine the corresponding A/N timing (to which pended A/N is to be transmitted). For this purpose, through each DCI, whether to transmit (additionally) pended A/N (for a PDSCH in which A/N pending was indicated at the previous time) may be directly indicated at the A/N timing indicated by the corresponding DCI. Here, DCI may include, for example, DCI triggering A/N feedback based on a Type-2 codebook. As another method, the corresponding pended A/N may be transmitted (by adding) through the earliest among the A/N timings indicated from DCIs (e.g., A/N timing for a PDSCH is indicated as valid or a numeric value) transmitted after the (DCI or PDSCH transmission) time at which A/N pending is indicated (or, the earliest after the minimum PDSCH processing time of a UE from the PDSCH transmission time at which A/N pending is indicated among the indicated A/N timings, or the time indicated as the first A/N timing after the minimum PDSCH processing of a UE from the PDSCH transmission time at which the A/N pending is indicated). As another method, the corresponding pended A/N may be transmitted (by adding)

through the A/N timing indicated from the initial DCI (e.g., triggering Type-2 codebook-based A/N feedback and indicating A/N timing as valid or a numeric value) transmitted at (same slot) or after the PDSCH transmission time at which A/N pending is indicated. As another method, the corresponding pended A/N may be transmitted (by adding) through the A/N timing indicated by DCI (e.g., triggering Type-2 codebook-based A/N feedback and indicating A/N timing as valid or a numeric value) for scheduling the first PDSCH transmitted at (same slot) or after the PDSCH transmission time at which A/N pending is indicated.

In order to support an operation of adding A/N feedback for a PDSCH in which A/N pending is indicated to a Type-1/2 A/N codebook and transmitting it, by combining the above methods (or in addition to the above methods), the following methods may be considered.

1) A/N payload size for PDSCH in which A/N pending is indicated

A. Opt 1 i. For each CC or BWP (configurable for single A/N feedback), the maximum number Np of PDSCHs to which A/N pending can be indicated is configured by RRC.

B. Opt 2 i. For each CC or BWP (configurable for single A/N feedback), the maximum number Np of PDSCHs to which A/N pending can be indicated is predefined.

1. As an example, when the minimum value among valid or numeric-value A/N timing configured in a CC/BWP is defined as Tm, Np=Tm−a (a=1 (or 0, 2)) may be determined.

A. Alternatively, it may be determined that Np=b×(Tm−a). b may be an integer greater than 1 depending on UE capability on whether multiple PDSCH reception is possible in a single slot.

2) A/N ordering method for PDSCH in which A/N pending is indicated

A. Opt 1 i. A counter-DAI only for PDSCHs for which A/N pending is indicated (within the corresponding CC) individually/independently for each CC is signaled/applied.

1. In this case, a pended A/N payload may be configured by mapping the A/N corresponding to counter-DAI values from 1 to Np for each CC.

2. In this case, the number of A/N bits corresponding to one counter-DAI value for each CC may be determined to be the same as the maximum number of TB or CBG configured for the corresponding CC.

B. Opt 2 i. A counter-DAI (and total-DAI) only for PDSCHs for which A/N pending is indicated over an entire CC (in the CC first-time second method) is signaled/applied.

1. In this case, a counter-DAI value may be signaled/applied to have a continuous value starting from a PDSCH for which A/N pending is indicated to DCI requesting A/N feedback for the corresponding PDSCH (transmitted later).

A. For example, if the last counter-DAI value corresponding to a PDSCH for which A/N pending is indicated is X, thereafter, a counter-DAI value corresponding to (first) DCI requesting A/N feedback for the corresponding PDSCH may be signaled/applied as (X+1).

2. In this case, an entire A/N payload is configured by mapping sequentially the A/N corresponding to starting from the counter-DAI value corresponding to a PDSCH in which A/N pending is indicated to the last received counter-DAI (or total-DAI) value.

3) A/N feedback time for PDSCH in which A/N pending is indicated

A. Opt 1 i. Through an A/N timing indicated from DCI through the DCI (e.g., DL grant), whether to add and transmit (e.g., request) or not (e.g., no request) (pended) A/N feedback for a PDSCH indicated by A/N pending (at the previous time) (to Type-1/2 A/N codebook) is indicated.

1. When indicated as "request", (pended) A/N feedback is added to a Type-1/2 A/N codebook and transmitted, whereas when indicated as "no request", only Type-1/2 A/N codebook is transmitted without adding (pended) A/N feedback.

2. In this case, an A/N state at every (pended) A/N feedback time may always be reset after feedback transmission. For example, an A/N state at a specific A/N feedback time resets the A/N state fed back at the previous (recent) time, and then is determined to update according to the presence or absence of a PDSCH in which A/N pending is additionally indicated.

B. Opt 2 i. NFI information for (pended) A/N feedback corresponding to a PDSCH for which A/N pending is indicated is indicated through DCI (e.g., DL grant), and (pended) A/N feedback (in addition to a Type-1/2 codebook) by reflecting the corresponding NFI information is transmitted through the A/N timing indicated by the DCI. As an example, based on NFI information, whether to reset the previous (recent) fed-back A/N state and update (according to the presence or absence of a PDSCH for which A/N pending is additionally indicated) or to keep the previous (recently) fed-back A/N state is determined.

1. In this case, a pended A/N feedback is always added to a Type-1/2 codebook at all times and transmitted, or when an NFI is non-toggle (or indicates maintenance of the previous A/N state), the pended A/N feedback may be always added to a Type-1/2 codebook at all times and transmitted. On the other hand, when an NFI is toggled (or indicating reset of the previous A/N state), the pended A/N feedback is added/transmitted if there is a PDSCH in which A/N pending is additionally indicated (after the previous feedback time), but the pended A/N feedback is not added/transmitted if there is none.

2. An NFI is signaled through a separate bit/field in DCI, or in a state of dividing an entire PUCCH resource set into a resource group corresponding to a non-toggle NFI (or, to maintain the previous A/N state) and a resource group corresponding to a toggled NFI (or to reset the previous A/N state), a corresponding NFI value may be determined according to a PUCCH resource indicated through DCI.

In addition, in a state in which a Type-2a A/N codebook method is configured to a UE, in case of a PDSCH in which A/N pending is indicated (and designated with specified (PDSCH) slot group ID=X) through specific DL grant DCI, for (pended) A/N feedback for the corresponding PDSCH, 1) pended A/N may be transmitted (by a UE) in a form of a Type-3 A/N codebook by indicating a separate A/N pooling through specific DCI, or 2) pended A/N may be included in a Type-2a A/N codebook transmitted through an A/N timing indicated by another DL grant DCI (e.g. requesting A/N feedback for slot group ID=X) without a separate A/N pooling may be considered. Meanwhile, in the latter case, it may be necessary to determine an A/N timing at which pended A/N feedback is transmitted. As a method for this, pended A/N is transmitted (by appending) through the earliest among the A/N timings indicated from specific DCIs (e.g., requesting A/N feedback for slot group ID=X (while triggering Type-2a codebook-based A/N feedback)) (e.g., in which an A/N timing for a PDSCH is indicated as valid or a numeric value) (e.g., A/N timing for a PDSCH is indicated as valid or a numeric value) transmitted after the time (for DCI or PDSCH transmission) at which A/N pending is indicated.

Meanwhile, an A/N feedback transmission time for a PDSCH for which A/N pending is indicated may be determined as an A/N timing indicated through DCI detected/received after the corresponding PDSCH reception time. In this case, PUCCH or PUSCH transmission carrying specific A/N information (e.g., A/N information corresponding to SPS PDSCH reception) through a specific time before an A/N timing time or DCI reception time may be configured/indicated/performed. In this case, there is a possibility that an out-of-order (OOO) that causes signal processing complexity in a UE implementation may be occurred a HARQ operation, for example, A/N feedback for PDSCH #2 of another (or the same) HARQ process ID received after a PDSCH #1 reception time of a specific HARQ process ID is transmitted before an A/N feedback time for PDSCH #1.

Therefore, in order to avoid an OOO operation situation, an A/N feedback transmission time for a PDSCH for which A/N pending is indicated may be determined as the earliest A/N PUCCH (or PUSCH) transmission (the corresponding transmission is configured/indicated/performed) (after the minimum PDSCH processing time of a UE) from the corresponding PDSCH reception time. In this case, if an A/N PUCCH is an A/N feedback-dedicated PUCCH resource corresponding to a SPS PDSCH, by using a PUCCH resource indicated by a PRI included in DCI indicating A/N pending, an A/N for a PDSCH in which A/N pending is indicated and an A/N for a SPS PDSCH may be fed back/transmitted together.

Meanwhile, in a state in which a Type-1 A/N codebook method is configured for a UE, when an A/N PUCCH is an A/N dedicated PUCCH resource corresponding to a SPS PDSCH, 1) an A/N for a PDSCH for which A/N pending is indicated and an A/N for a SPS PDSCH may be configured/transmitted together on the same single PUCCH (or PUSCH), or 2) only an A/N for a SPS PDSCH may be transmitted. In this case, A/N transmission for a PDSCH for which A/N pending is indicated may be omitted (for all subsequent A/N timings including an A/N timing corresponding to a SPS PDSCH). In addition, when an A/N PUCCH is an A/N dedicated PUCCH resource corresponding to a SPS PDSCH in a state in which a Type-2 A/N codebook method is configured for a UE, 1) an A/N corresponding to a PDSCH (including a PDSCH for which A/N pending is not indicated) from an initial counter-DAI value to a total-DAI (or counter-DAI) value included in DCI indicating A/N pending and an A/N for a SPS PDSCH may be configured/transmitted on the same single PUCCH (or PUSCH), or 2) (except for a PDSCH where A/N pending is not indicated) an A/N for a PDSCH for which A/N pending is indicated and an A/N for a SPS PDSCH may be configured/transmitted together on the same single PUCCH (or PUSCH). In addition, in a state in which a Type-2a A/N codebook method is configured for a UE, when an A/N PUCCH is an A/N dedicated PUCCH resource or an A/N PUCCH (or PUSCH) is a PUCCH (or PUSCH) for which an A/N feedback for group ID=Y is indicated, different from (PDSCH) slot group ID=X corresponding to a PDSCH for which A/N pending is indicated, 1) an A/N corresponding to a PDSCH (including a PDSCH for which A/N pending is not indicated) from an initial counter-DAI value to a total-DAI (or counter-DAI) value included in DCI indicating A/N pending for group ID=X and an A/N for a SPS PDSCH or an A/N for group ID=Y may be configured/transmitted on the same single PUCCH (or PUSCH), or 2) (except for a PDSCH where A/N pending is not indicated) an A/N for a PDSCH for which A/N pending is indicated for group ID=X and an A/N for a SPS PDSCH or an A/N for group ID=Y may be configured/transmitted together on the same single PUCCH (or PUSCH), or 3) through DCI indicating A/N feedback for group ID=Y, it may be specified that A/N feedback for group ID=X is always indicated together.

Additionally, when a Type-1 or Type-2 A/N codebook method is configured, an operation of dynamically triggering A/N feedback transmission based on a Type-3 A/N codebook method through specific DCI may be applied/allowed. On the other hand, when a Type-2a A/N codebook method is configured, it may be specified/defined so that DCI-based dynamic Type-3 A/N codebook triggering is not applied/allowed. In addition, when a Type-1 or Type-2 A/N codebook method is configured, an A/N pending indication operation (in a form of indicating an invalid or non-numeric A/N timing value for a PDSCH) as described above through DCI (e.g., DL grant) may not be applied/allowed. On the other hand, when a Type-2a method is configured, it may be specified/defined so that an A/N pending indication operation (in a form of indicating an invalid or non-numeric A/N timing value) through DCI is applied/allowed.

(e) A/N Feedback Transmission Operation for SPS PDSCH

Meanwhile, an SPS PDSCH transmitted without a corresponding DCI (e.g., DL grant) and A/N feedback for the SPS PDSCH in a situation where a Type-2a (or Type-1 or Type-2) A/N codebook method is configured/indicated may be considered. For more details about a Type-2a (or Type-1 or Type-2) A/N codebook method, refer to Proposed Method 3. In this case, since a retransmission request (e.g., according to LBT failure of a UE and/or A/N detection failure of a base station) for A/N feedback corresponding to an SPS PDSCH is not possible because there is no separate slot group ID designation for an SPS PDSCH, 1) A/N feedback transmission time for an SPS PDSCH, and 2) A/N feedback configuration/mapping rule on a Type-2a A/N codebook may be required.

First, in case of A/N feedback transmission time for an SPS PDSCH, for example, an SPS PDSCH period is configured with L slots and an A/N timing (delay) corresponding to an SPS PDSCH is indicated with K slots. In this case, A/N feedback for an SPS PDSCH transmitted in slot #n may be transmitted (repeatedly) through all A/N timings indicated in an interval from slot #(n+K) to slot #(n+K+L−1). Alternatively, Type-2a (or Type-1 or Type-2) codebook-based A/N feedback for an SPS PDSCH transmitted in slot #n is transmitted only through slot #(n+K), and it may be (additionally) transmitted through the time indicated by a Type-3 codebook-based A/N timing in an interval from slot #(n+K) to slot #(n+K+L−1). As another method, when operating in a Type-2a A/N codebook method, a specific (slot) group ID to which SPS PDSCHs to be transmitted later belong may be designated through SPS activation DCI (e.g., SPS activation PDCCH). Accordingly, when configuring/transmitting A/N feedback for the corresponding (slot) group ID (according to a request from a base station), it may be configured/transmitted including an A/N for the corresponding SPS PDSCH.

Meanwhile, an A/N configuration/mapping for an SPS PDSCH on a Type-2a A/N codebook may be configured/mapped by separating from an A/N for PDSCHs to which a slot group ID is assigned through DCI (e.g., DL grant). As an example, on an A/N payload of a Type-2a codebook, it may be configured that an A/N for a PDSCH for which a slot group ID is designated may be mapped to a lower bit index part starting with a MSB (e.g., configured as a form of a first A/N sub-codebook), and then an A/N for an SPS PDSCH is mapped (to a higher bit index part) after it (e.g., configured as a form of a second A/N sub-codebook). In addition, an A/N configuration/mapping for an SPS PDSCH on a Type-3 A/N codebook may be configured/mapped separately from an A/N for PDSCHs for which a HARQ process ID is designated through DCI (e.g., DL grant). As an example, on an A/N payload of a Type-3 codebook, it may be configured that an A/N for a PDSCH for which a HARQ process ID may designated through DCI is mapped to a lower bit index part starting with a most significant bit (MSB) (e.g., configured as a form of a first A/N sub-codebook), and then an A/N for an SPS PDSCH is mapped (to a higher bit index part) after it (e.g., configured as a form of a second A/N sub-codebook).

Meanwhile, in case of Type-3 A/N codebook, an A/N payload may be configured in a form in which an A/N corresponding to each HARQ process ID is mapped. In addition, a PDCCH indicating release for a SPS PDSCH may indicate that the PDCCH is for releasing a SPS by using a HARQ process ID field in DCI. Considering this, an entire Type-3 A/N codebook may be configured in a form of adding (1-bit) A/N information for a SPS release PDCCH to a specific location of an A/N payload in the state that an A/N payload is configured by mapping an A/N by each HARQ process ID. The specific location may be determined as 1) a next position of/a position after the last A/N bit of an entire A/N payload, 2) a next position of/a position after the last A/N bit corresponding to a CC in which an SPS release PDCCH is transmitted in an A/N payload, 3) a next position of/a position after the last A/N bit corresponding to a CC in which an SPS PDSCH corresponding to an SPS release PDCCH is transmitted in an A/N payload, or 4) an A/N bit corresponding to a specific HARQ process ID reserved for transmitting an SPS PDSCH corresponding to an SPS release PDCCH.

Meanwhile, additionally, through DCI indicating SPS activation, when an A/N timing corresponding to SPS PDSCH reception is indicated as an inapplicable (or invalid or non-numeric) value (refer to Table 6), a method of transmitting the corresponding A/N feedback by applying a specific applicable (or valid or numeric) value as A/N timing for an initial PDSCH reception corresponding to the corresponding DCI and then pending A/N feedback corresponding to SPS PDSCHs may be considered. In this case, a PUCCH resource for A/N feedback transmission corresponding to an initial PDSCH reception may be 1) directly indicated through SPS activation DCI, 2) determined as a specific (e.g., corresponding to the minimum or maximum index) resource among a plurality of candidate PUCCH resource indexes (PRI) configured through RRC, or 3) predefined as a specific resource or configured through RRC. In addition, a specific applicable value applied to an A/N transmission timing for an initial PDSCH reception may be 1) predefined as a specific value or configured through RRC, 2) determined as a specific (e.g., minimum or maximum) value among a plurality of candidate (applicable) K1 values configured through RRC, or 3) directly indicated through SPS activation DCI.

Meanwhile, an operation (e.g., A/N pending indication) in which a non-applicable value is indicated as an A/N timing through DCI indicating SPS activation may be allowed only when a Type-2a (and/or Type-3) A/N codebook or a Type-2 (and/or Type-3) A/N codebook is configured for a UE, and the corresponding operation may not be allowed when a Type-1 (and/or Type-3) A/N codebook is configured for a UE. The reason is that a batch (from a base station) A/N feedback request for a plurality of SPS PDSCHs in which A/N pending is indicated can be requested through any DCI indicating A/N transmission based on a Type-2a and/or Type-3 codebook when a Type-2a A/N codebook is configured for a UE, and can be requested through any DCI indicating A/N transmission based on a Type-2 and/or Type-3 codebook when a Type-2 A/N codebook is configured for a UE, and can be request only through DCI indicating A/N transmission based on a Type-3 codebook (with a small request opportunity and limitedly) when a Type-1 A/N codebook is configured for a UE.

In addition, additionally, for DCI indicating A/N feedback transmission based on a Type-3 codebook and/or DCI indicating SPS activation and/or DCI indicating SPS release and/or a specific cell (e.g., Scell), in relation to DCI indicating switching to a specific (e.g., dormant) BWP configured to disable a PDCCH monitoring or decoding operation of a UE (for convenience, this DCI is referred to as "special DCI"), etc., an A/N timing corresponding to the corresponding DCI reception may be defined so that it is not indicated as an unapplicable value (or so that it is indicated only as an applicable value). Accordingly, when a non-applicable value is indicated as an A/N timing through special DCI, a UE may operate to ignore the special DCI. Here, ignoring special DCI includes ignoring/discarding information in the special DCI, and through this, an operation indicated through the special DCI may not be performed. The reason is that when A/N feedback for special DCI reception is pending, ambiguity or misalignment may occur between a UE and a base station with respect to whether and when an operation (e.g., SPS release for SPS PDSCH transmission/reception operation or BWP switching for switching transmission/reception operation to dormant BWP) indicated through the special DCI is applied/performed.

Figure 18:
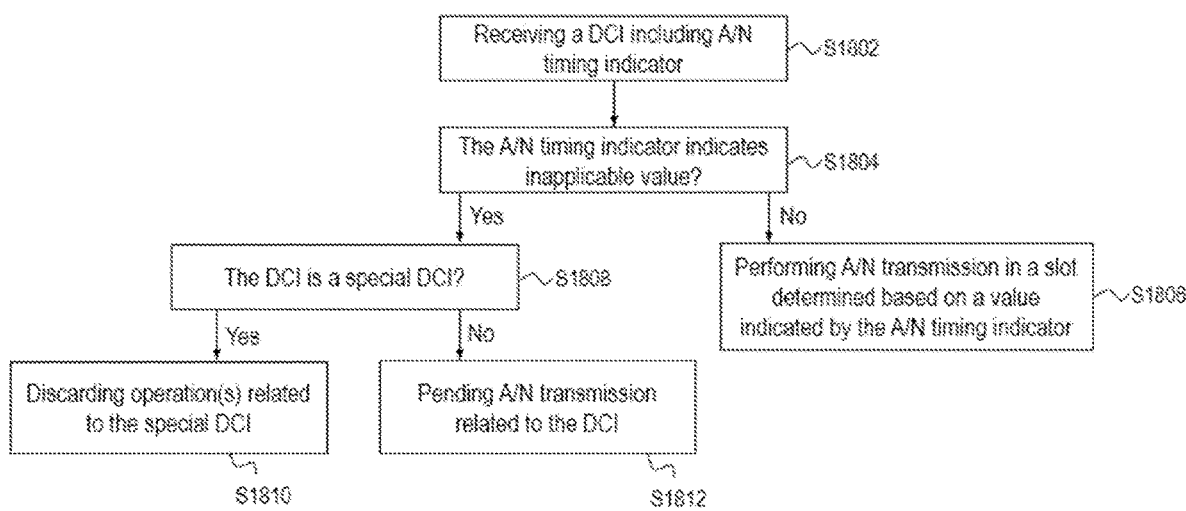

FIG. 18 illustrates an A/N process according to the present disclosure. In reference to FIG. 18, a UE may receive DCI (e.g., DL grant DCI; DCI format 1_X) including an A/N timing indicator (refer to Table 6) (S1802). Here, DCI may be accompanied by PDSCH scheduling or may request A/N feedback without PDSCH scheduling. Meanwhile, when an A/N timing indicator indicates an applicable value (S1804; No), a UE may perform A/N transmission in a slot determined based on a value indicated by an A/N timing indicator (S1806). When an A/N timing indicator indicates an unapplicable value (S1804; Yes) and the received DCI is special DCI (S1808; Yes), a UE may ignore an operation indicated through the special DCI (S1810). On the other hand, when an A/N timing indicator indicates an unapplicable value (S1804; Yes) and the received DCI is non-special DCI (S1808; No), a UE may pend A/N transmission related to DCI. (S1812). Here, special DCI includes, for example, DCI indicating A/N feedback transmission based on a Type-3 codebook, DCI indicating SPS activation, etc.

In another method, a method of analyzing/applying a state to which an inapplicable value is mapped among states indicated by an A/N timing field in DCI is substituted/changed with a specific applicable value for special DCI is also possible. In this case, a specific applicable value may be 1) predefined as a specific value or configured through RRC, or 2) determined (e.g., as a value plus a specific offset) based on a specific (e.g., minimum or maximum) value among a plurality of candidate (applicable) K1 values configured through RRC (e.g., determined as the minimum K1−a (e.g., a=1) or the maximum K1+b (e.g., b=1)).

Figure 19:
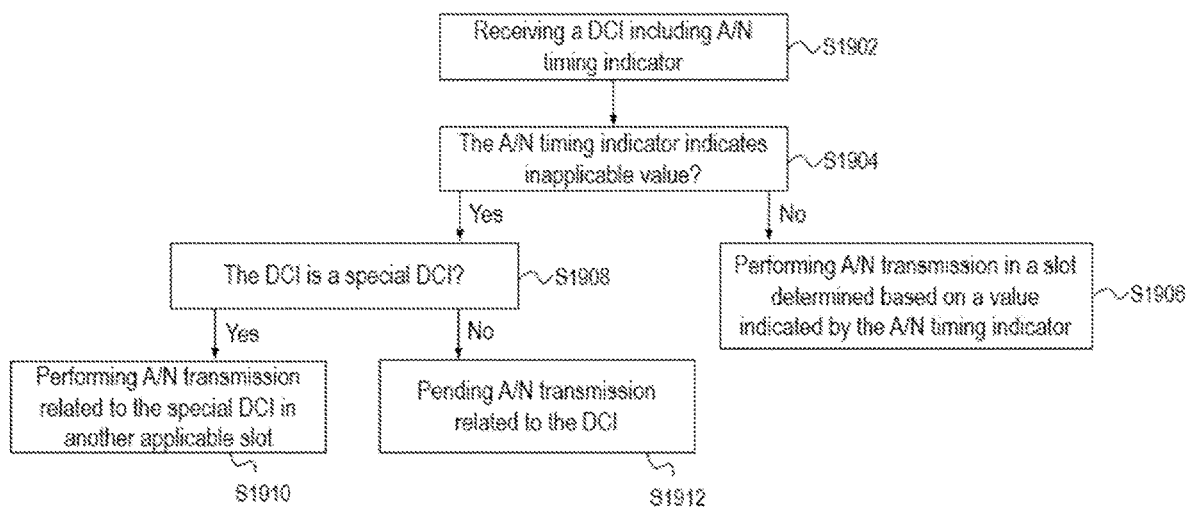

FIG. 19 illustrates an A/N process according to the present disclosure. In reference to FIG. 19, a UE may receive DCI (e.g., DL grant DCI; DCI format 1_X) including an A/N timing indicator (refer to Table 6) (S1902). Here, DCI may be accompanied by PDSCH scheduling or may request A/N feedback without PDSCH scheduling. Meanwhile, when an A/N timing indicator indicates an applicable value (S1904; No), a UE may perform A/N transmission in a slot determined based on a value indicated by an A/N timing indicator (S1906). If an A/N timing indicator indicates a non-applicable value (S1904; Yes), and the received DCI is special DCI (S1908; Yes), a UE may perform A/N transmission related to special DCI in a slot determined based on a specific applicable value according to the proposed method (S1910). On the other hand, when an A/N timing indicator indicates an unapplicable value (S1904; Yes) and the received DCI is non-special DCI (S1908; No), a UE may pend A/N transmission related to DCI (S1912).

(f) Determination of Minimum Processing Time for DCI Indicating Type-3 A/N Codebook As DL grant DCI indicating A/N feedback transmission based on a Type-3 codebook, two methods of Case 1) DCI including PDSCH scheduling, or Case 2) DCI without PDSCH scheduling may be considered. In Case 2, if a PDSCH frequency resource allocated by the corresponding DCI is invalid (e.g., empty), a UE may operate by recognizing that a Type-3 A/N codebook is indicated without PDSCH scheduling. Meanwhile, in Case 2, it is necessary to define that a HARQ-ACK timing (e.g., K1) value indicated by the corresponding DCI is applied based on which time, specifically Opt 1) a time after K1 slots from a slot in which the corresponding DCI is received may be determined as an A/N transmission time, or Opt 2) a time after K1 slots from a slot indicated as a PDSCH reception time through the corresponding DCI (although not actually transmitted) may be determined as an A/N transmission time.

Meanwhile, in the current NR system, a minimum processing time (e.g., N1) is specified in relation to PDSCH reception of a UE. Specifically, when an interval from a PDSCH (last symbol) reception time to a corresponding A/N PUCCH (first symbol) transmission time is secured is secured by N1 symbols or more, a UE may operate to feed back valid A/N information (reflecting a final decoding result) for the PDSCH reception. On the other hand, when the corresponding interval is less than N1 symbols, a UE may not feed back valid A/N information. N1 may have different values according to SCS applied to PDSCH and A/N PUCCH transmission, and a DMRS symbol pattern configured in a PDSCH. Table 8 represents a minimum PDSCH processing time (N1) according to an SCS value and a DMRS pattern.

TABLE 8

| SCS (kHz) | Without additional DMRS symbol (group) | With additional DMRS symbol (group) |
|---|---|---|
| 15 | 8 | 13 or 14 |
| 30 | 10 | 13 |
| 60 | 17 | 20 |
| 120 | 20 | 24 |

In addition, the NR system defines a minimum processing time (e.g., N2) in relation to PUSCH transmission of a UE. Specifically, when an interval from a UL grant PDCCH (last symbol) reception time to a corresponding PUSCH (first symbol) transmission time is secured by N2 symbols or more, a UE transmits a PUSCH carrying a TB scheduled by the UL grant PDCCH. On the other hand, when the corresponding interval is less than N2 symbols, a UE may ignore a UL grant PDCCH and drop a corresponding PUSCH transmission. N2 may have different values according to SCS applied to UL grant PDCCH and PUSCH transmission. Table 9 represents a minimum PUSCH processing time (N2) according to a SCS value.

TABLE 9

| SCS (kHz) | |
|---|---|
| 15 | 10 |
| 30 | 12 |
| 60 | 23 |
| 120 | 36 |

In addition, in the NR system, a minimum processing time (e.g., N) is specified in relation to reception of a PDCCH indicating an SPS PDSCH release. Specifically, when an interval from a PDCCH (last symbol) reception time to a corresponding A/N PUCCH (first symbol) transmission time is secured by N symbols or more, a terminal may feed back valid A/N (e.g., ACK) information for the corresponding PDCCH reception. On the other hand, when the corresponding interval is less than N symbols, a UE may not feed back valid A/N information. N may have different values according to SCS applied to PDCCH and A/N PUCCH transmission. Table 10 represents an SPS PDSCH release PDCCH processing time (N) according to an SCS value.

TABLE 10

| SCS (kHz) | |
|---|---|
| 15 | 10 |
| 30 | 12 |
| 60 | 22 |
| 120 | 25 |

Meanwhile, as in Case 2, when a DL grant PDCCH indicates only (Type-3 codebook-based) A/N feedback transmission without PDSCH scheduling, it may be necessary to define a minimum processing time to be applied to an interval from a PDCCH (last symbol) reception time to a corresponding A/N PUCCH (first symbol) transmission time and the corresponding number of symbols (e.g., Nx). Specifically, when an interval from a PDCCH (last symbol) reception time to a corresponding A/N PUCCH (first symbol) transmission time is secured by Nx symbols or more, a UE may feed back valid (Type-3 codebook-based) A/N information corresponding to a corresponding PDCCH. On the other hand, if the corresponding interval is less than Nx symbols, a UE may 1) not feed back valid A/N information, or 2) ignore a corresponding PDCCH itself Meanwhile, in case of an Nx value, N1 values (or, (N1+a) value obtained by adding a specific number a of symbols to N1, where a may be configured to a positive or negative number) applied when an additional DMRS symbol (group) is not configured among the values shown in Table 8 may be applied as the Nx value. This is because, since there is no actually scheduled PDSCH and a processing procedure required for this can be omitted, so it is possible to apply the smallest N1 value to each SCS. Alternatively, conversely, N1 values (or, (N1+a) value obtained by adding a specific number a of symbols to N1, where a may be configured to a positive or negative number) applied when an additional DMRS symbol (group) is configured among the values shown in Table 8 may be applied as the Nx value. In case of a PDCCH, since a DMRS is included in each of all symbols constituting the PDCCH, it may not be unreasonable to apply the largest N1 value to each SCS in consideration of the corresponding channel estimation time.

As another method, the N2 values shown in Table 9 (or, (N2+a) value obtained by adding a specific number a of symbols to N2, where a may be configured to a positive or negative number) may be applied as the Nx value. This is because Case 2 is a form of receiving DL control and transmitting a corresponding UL channel similarly to a PUSCH scheduling/transmission case, so it may not be difficult to apply the N2 value defined for each SCS. Alternatively, the N values shown in Table 10 (or, (N+a) value obtained by adding a specific number a of symbols to N, where a may be configured to a positive or negative number) may be applied as the Nx value. Since Case 2 (information indicated through a PDCCH is different from SPS PDSCH release) is a form of receiving a PDCCH and transmitting a corresponding A/N PUCCH, it may be possible to apply the N value defined for each SCS.

(g) Type-2a A/N Codebook-Related DL/UL (Grant) DCI Signaling Considering CBG-Based Transmission Configuration When CBG-based PDSCH transmission is configured in a specific cell configured for a UE, the following DL DCI signaling method may be considered for configuring a Type-2 A/N codebook.

1) When total-DAI (T-DAI) and NFI information for a (PDSCH) slot group corresponding to an other-ID is configured to be indicated through DL DCI (hereinafter, DCI-X). That is, when T-DAI and NFI information for each of a PDSCH group (i.e., the current group) corresponding to a current-ID and tahe PDSCH group (i.e., the other group) corresponding to an other-ID are configured to be indicated.

A. Method 0a: Both T-DAI information for a TB-based PDSCH (for TB-based A/N sub-codebook configuration corresponding to this) and T-DAI information for a CBG-based PDSCH (for CBG-based A/N sub-codebook configuration corresponding to this) for the other group are indicated (through DCI-X).

B. Method 1a: Only one T-DAI information to the other group (in this case, a T-DAI indicates only T-DAI information for one PDSCH type (hereinafter, PDSCH type-X) of a TB-based PDSCH and a CBG-based PDSCH) is indicated (through DCI-X).

i. In this method, PDSCH type-X may be fixed to a TB-based PDSCH (or a CBG-based PDSCH).

ii. Meanwhile, for PDSCH type-1 (e.g., when PDSCH type-X is a TB-based PDSCH, PDSCH type-1 becomes a CBG-based PDSCH, and when PDSCH type X is a CBG-based PDSCH, PDSCH type-1 becomes a TB-based PDSCH) other than PDSCH type-X (common to methods 1a/2a/3a/4a), a corresponding A/N feedback (sub-codebook) by applying the most recently received T-DAI information (through another DCI scheduling PDSCH type-1 of the other group) is configured.

C. Method 2a: Only one T-DAI information to the other group is indicated (through DCI-X) (in this case, a T-DAI indicates only T-DAI information for one PDSCH type (hereinafter, PDSCH type-X) of a TB-based PDSCH and a CBG-based PDSCH).

i. When there is another DCI-1 that schedules the other group and indicates the same A/N transmission slot as DCI-X, PDSCH type-X is determined as the last scheduled PDSCH type from the DCI-1 (or, when CBG-based PDSCH transmission is configured in the last scheduled cell from DCI-1, PDSCH type-X is determined as a CBG-based PDSCH, otherwise (e.g., TB-based PDSCH transmission is configured) PDSCH type-X is determined as a TB-based PDSCH).

ii. When there is no other DCI-1 that schedules the other group and indicates the same A/N transmission slot as DCI-X, PDSCH type-X is determined as a TB-based PDSCH (or, determined as a CBG-based PDSCH, or whether PDSCH type-X is a TB-based PDSCH or a CBG-based PDSCH may be configured through RRC signaling).

D. Method 3a: Only one T-DAI information for the other group is indicated (through DCI-X) (in this case, a T-DAI indicates only T-DAI information for one PDSCH type (hereinafter, PDSCH type-X) of a TB-based PDSCH and a CBG-based PDSCH).

i. When there are other DCI-1s that schedule the other group and indicate the same A/N transmission slot as DCI-X, and the DCI-1s schedule both a TB-based PDSCH and a CBG-based PDSCH, the PDSCH type-X is determined as a TB-based PDSCH (or, determined as a CBG-based PDSCH, or whether PDSCH type-X is a TB-based PDSCH or a CBG-based PDSCH may be configured through RRC signaling).

ii. When there is another DCI-1 that schedules the other group and indicates the same A/N transmission slot as DCI-X, and DCI-1 schedules only one PDSCH type-1 among a TB-based PDSCH and a CBG-based PDSCH, PDSCH type-X may be determined as PDSCH type-1.

iii. If there is no other DCI-1 that schedules the other group and indicates the same A/N transmission slot as DCI-X, PDSCH type-X is determined as a TB-based PDSCH (or, determined as a CBG-based PDSCH, or whether PDSCH type-X is a TB-based PDSCH or a CBG-based PDSCH may be configured through RRC signaling).

E. Method 4a: Only one T-DAI information for the other group is indicated (through DCI-X) (In this case, a T-DAI indicates only T-DAI information for one PDSCH type (hereinafter, PDSCH type-X) of a TB-based PDSCH and a CBG-based PDSCH).

i. Whether PDSCH type-X is a TB-based PDSCH or a CBG-based PDSCH is indicated through the same DL DCI (i.e., DCI-X) (e.g., by a separate 1-bit) or may be configured through RRC signaling.

ii. Meanwhile, for PDSCH type-1 other than PDSCH type-X, corresponding A/N feedback (sub-codebook) is configured by applying the most recently received T-DAI information (through DCI scheduling PDSCH type-1 of the other group), or in case of Method 4a, A/N feedback (sub-codebook) may not be configured/transmitted for PDSCH 2) When configured so that T-DAI and NFI information for the other group is not indicated through DCI-X (i.e., only T-DAI and NFI information for the current group is indicated).

A. Method 5a: For the other group, for each PDSCH type (TB-based or CBG-based), it is operated to configure A/N feedback (sub-codebook) corresponding to each PDSCH type by applying the most recently received T-DAI information (through DCI scheduling the corresponding PDSCH type of the other group).

In addition, with respect to signaling T-DAI information through DL DCI (hereinafter, DCI-X), one of the following two methods may be configured for a UE through RRC signaling.

1) Method Xa: (through DCI-X) Both T-DAI information for a TB-based PDSCH and T-DAI information for a CBG-based PDSCH for the other group are indicated (same as Method 0a).

2) Method Ya: (through DCI-X) Only one T-DAI information for the other group is indicated (in this case, a T-DAI indicates T-DAI information only for one of a TB-based PDSCH and a CBG-based PDSCH).

Next, when CBG-based PDSCH transmission is configured in a specific cell configured for a UE, the following UL DCI signaling method may be considered for configuring a Type-2 A/N codebook.

1) When T-DAI information for each of two PDSCH groups is configured to be indicated through UL DCI (hereinafter, DCI-Y). That is, when, through DCI, both T-DAI information for a PDSCH group (e.g., 1st group (index 0)) corresponding to a first-ID and T-DAI information for a PDSCH group (e.g., 2nd group (index 1)) corresponding to a second-ID are configured to be indicated.

A. Method 0b: Both T-DAI information (for TB-based A/N sub-codebook configuration corresponding to this) for a TB-based PDSCH and T-DAI information (for CBG-based A/N sub-codebook configuration corresponding to this) for a CBG-based PDSCH for each PDSCH group as follows are indicated (through DCI-Y).

i. T-DAI information for a TB-based PDSCH belonging to a 1st group
  ii. T-DAI information for a CBG-based PDSCH belonging to a 1st group
  iii. T-DAI information for a TB-based PDSCH belonging to a 2nd group
  iv. T-DAI information for a CBG-based PDSCH belonging to a 2nd group B. Method 1b: Only one T-DAI information for each PDSCH group is indicated (through DCI-Y) (in this case, a T-DAI indicates only T-DAI information for one PDSCH type (hereinafter, PDSCH type-X) of a TB-based PDSCH and a CBG-based PDSCH).

i. In this method, PDSCH type-Y (corresponding to the T-DAI indicated for each PDSCH group) may be fixed to a TB-based PDSCH (or CBG-based PDSCH).
  ii. Meanwhile, for PDSCH type-1 (e.g., when PDSCH type-X is a TB-based PDSCH, PDSCH type-1 becomes a CBG-based PDSCH, and when PDSCH type-X is a CBG-based PDSCH, PDSCH type-1 becomes a TB-based PDSCH) other than PDSCH type-X for each PDSCH group (common to methods 1b/2b/3b/4b), corresponding A/N feedback (sub-codebook) is configured by applying the previously most recently received T-DAI information (through DL DCI indicating T-DAI information for a corresponding PDSCH type-1 of a corresponding PDSCH group).

C. Method 2b: Only one T-DAI information for each PDSCH group is indicated (through DCI-Y) (in this case, a T-DAI indicates only T-DAI information for one PDSCH type (hereinafter, PDSCH type-X) of a TB-based PDSCH and a CBG-based PDSCH).

i. When there is DL DCI that schedules a corresponding PDSCH group and indicates a PUSCH transmission slot indicated by DCI-Y for each PDSCH group as an A/N PUCCH transmission slot, PDSCH type-X (corresponding to a T-DAI indicated for a corresponding PDSCH group) is determined as the last scheduled PDSCH type from the DL DCI (or, when CBG-based PDSCH transmission is configured in the last scheduled cell from the DL DCI, it is determined as a CBG-based PDSCH, otherwise it is determined as a TB-based PDSCH).
  ii. When there is no DL DCI that schedules a corresponding PDSCH group and indicates a PUSCH transmission slot indicated by DCI-Y for each PDSCH group as an A/N PUCCH transmission slot, PDSCH type-X (corresponding to a T-DAI indicated for a corresponding PDSCH group) is determined as a TB-based PDSCH (or determined as a CBG-based PDSCH, or whether PDSCH type-X is a TB-based PDSCH or a CBG-based PDSCH is configured through RRC signaling).

D. Method 3b: Only one T-DAI information for each PDSCH group is indicated (through DCI-Y) (in this case, a T-DAI indicates only T-DAI information for one PDSCH type (hereinafter, PDSCH type-X) of a TB-based PDSCH and a CBG-based PDSCH).

i. When, for each PDSCH group, there are DL DCIs that schedule a corresponding PDSCH group and indicate a PUSCH transmission slot indicated by DCI-Y as an A/N PUCCH transmission slot and corresponding DL DCIs schedule both a TB-based PDSCH and a CBG-based PDSCH, PDSCH type-X (corresponding to a T-DAI indicated for a corresponding PDSCH group) is determined as a TB-based PDSCH (or, determined as a CBG-based PDSCH, or whether PDSCH type-X is a TB-based PDSCH or a CBG-based PDSCH is configured through RRC signaling).
  ii. When, for each PDSCH group, there is DL DCI that schedules a corresponding PDSCH group and indicates a PUSCH transmission slot indicated by DCI-Y as an A/N PUCCH transmission slot, and a corresponding DL DCI schedules only one of a TB-based PDSCH and a CBG-based PDSCH, PDSCH type-X (corresponding to a T-DAI indicated for a corresponding PDSCH group) is determined as PDSCH type-1.
  iii. When, for each PDSCH group, there is no DL DCI that schedules a PDSCH group while indicating a PUSCH transmission slot indicated by DCI-Y as an A/N PUCCH transmission slot, PDSCH type-X (corresponding to a T-DAI indicated for a corresponding PDSCH group) is determined as a TB-based PDSCH (or determined as a CBG-based PDSCH, or whether PDSCH type-X is a TB-based PDSCH or a CBG-based PDSCH is configured through RRC signaling).

E. Method 4b: Only one T-DAI information for each PDSCH group is indicated (through DCI-Y) (in this case, a T-DAI indicates only T-DAI information for one PDSCH type (hereinafter, PDSCH type-X) of a TB-based PDSCH and a CBG-based PDSCH).

i. Whether PDSCH type-X (corresponding to a T-DAI indicated for each PDSCH group) is a TB-based PDSCH or a CBG-based PDSCH is indicated through the same UL DCI (i.e., DCI-Y) (e.g., by a separate 1-bit) or configured through RRC signaling.
  ii. Meanwhile, for PDSCH type-1 other than PDSCH type-X for each PDSCH group, the corresponding A/N feedback (sub-codebook) may be configured by applying the most recently received T-DAI information (through DL DCI indicating T-DAI information for PDSCH type-1 of a corresponding PDSCH group), or in case of Method 4b, A/N feedback (sub-codebook) may not be configured/transmitted for PDSCH type-1.

2) When T-DAI information is configured to be indicated only for one PDSCH group X of two PDSCH groups (e.g., 1st group (index 0), 2nd group (index 1)) through DCI-Y.

A. Method 5b: Both T-DAI information (for a TB-based A/N sub-codebook configuration corresponding to this) for a TB-based PDSCH and T-DAI information (for a CBG-based A/N sub-codebook configuration corresponding to this) for a CBG-based PDSCH for PDSCH group X (through DCI-Y).

i. PDSCH group X may be determined as 1) a 1st group (i.e., a PDSCH group of the smallest index), when DL DCIs indicating a PUSCH transmission slot indicated by DCI-Y as an A/N PUCCH transmission slot schedule both PDSCH groups, 2) the corresponding specific PDSCH group, when DL DCI indicating a PUSCH transmission slot indicated by DCI-Y as an A/N PUCCH transmission slot schedules only one specific PDSCH group, or 3) a 1st group, when there is no DL DCI indicating a PUSCH transmission slot indicated by DCI-Y as an A/N PUCCH transmission slot.

ii. For PDSCH group Y other than PDSCH group X, by applying the most recently received T-DAI information (through DL DCI indicating T-DAI information for a corresponding PDSCH type of the corresponding PDSCH group Y) for each PDSCH type (TB-based or CBG-based), A/N feedback corresponding to each PDSCH type (sub-codebook) is configured.

B. Method 6b: Only one T-DAI information for PDSCH group X is indicated (through DCI-Y) (in this case, a T-DAI indicates only T-DAI information for one PDSCH type (hereinafter, PDSCH type-X) of a TB-based PDSCH and a CBG-based PDSCH).

i. PDSCH group X may be determined according to the method of Method 5b. A PDSCH type (TB-based or CBG-based) corresponding to a T-DAI indicated for PDSCH group X may be determined by applying at least one of methods 1b/2b/3b/4b.

ii. For PDSCH group Y other than PDSCH group X, corresponding A/N feedback (sub-codebook) may be configured by applying T-DAI information for each PDSCH type according to the method of Method 5b.

In addition, with respect to signaling T-DAI information through UL DCI (hereinafter, DCI-Y), one of the following two methods may be configured for a UE through RRC signaling.

1) Method Xb: Both T-DAI information for a TB-based PDSCH and T-DAI information for a CBG-based PDSCH for each PDSCH group are indicated (through DCI-Y) (same as Method 0b).

2) Method Yb: Only one T-DAI information for each PDSCH group is indicated (in this case, a T-DAI indicates T-DAI information only for one of a TB-based PDSCH and a CBG-based PDSCH).

Figure 20:
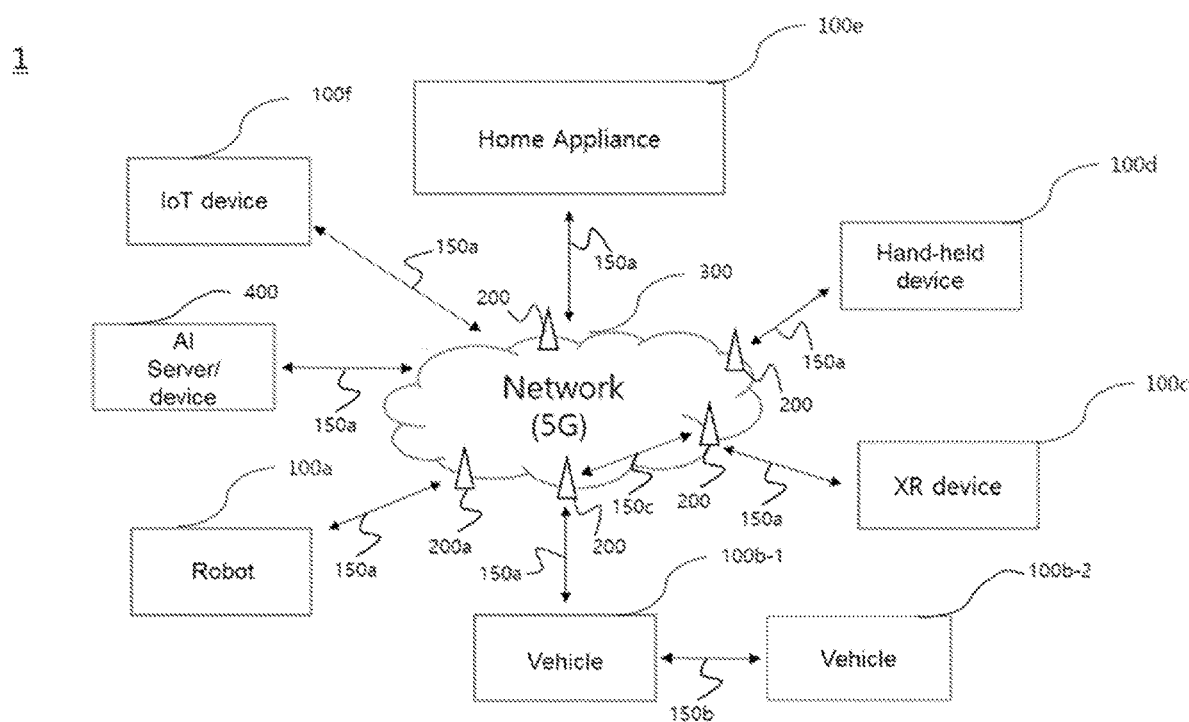
FIGS. 20 to 23 illustrates a communication system (1) and a wireless device applied to the present disclosure.

FIG. 20 illustrates a communication system 1 to which the present disclosure is applied.

Referring to FIG. 20, a communication system 1 applied to the present disclosure includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device may include robots 100a, vehicles 100b-1 and 100b-2, an extended reality (XR) device 100c, a hand-held device 100d, and a home appliance 100e. an Internet of Thing (IoT) device (100f), and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). The XR device includes AR (Augmented Reality)/VR (Virtual Reality)/MR (Mixed Reality) devices, and it may be implemented in the form of a HMD (Head-Mounted Device), a HUD (Head-Up Display) in a vehicle, a TV, a smartphone, a computer, a wearable device, a home appliance, a digital signage, a vehicle, a robot, and the like. The hand-held device may include a smart phone, a smart pad, a wearable device (e.g., a smart watch, a smart glass), a computer (e.g., a notebook computer, etc.). The home appliance may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

FIG. 20 illustrates a communication system 1 to which the present disclosure is applied.

Referring to FIG. 20, a communication system 1 applied to the present disclosure includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device may include robots 100a, vehicles 100b-1 and 100b-2, an extended reality (XR) device 100c, a hand-held device 100d, and a home appliance 100e. an Internet of Thing (IoT) device (100f), and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). The XR device includes AR (Augmented Reality)/VR (Virtual Reality)/MR (Mixed Reality) devices, and it may be implemented in the form of a HMD (Head-Mounted Device), a HUD (Head-Up Display) in a vehicle, a TV, a smartphone, a computer, a wearable device, a home appliance, a digital signage, a vehicle, a robot, and the like. The hand-held device may include a smart phone, a smart pad, a wearable device (e.g., a smart watch, a smart glass), a computer (e.g., a notebook computer, etc.). The home appliance may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (eg, NR) network, and the like. The wireless devices 100a to 100f may communicate with each other through the base station 200/network 300, but may communicate directly (e.g. sidelink communication) without passing through the base station/network. For example, the vehicles 100b-1 and 100b-2 may perform direct communication (e.g. V2V (Vehicle to Vehicle)/V2X (Vehicle to everything) communication). In addition, the IoT device (e.g., sensor) may directly communicate with other IoT devices (e.g., sensors) or other wireless devices 100a to 100f.

Wireless communication/connections 150a, 150b, and 150c may be established between the wireless devices 100a to 100f/base station 200 and the base station 200/base station 200. Here, wireless communication/connection may be achieved through various wireless access technologies (e.g. 5G NR) such as uplink/downlink communication 150a, sidelink communication 150b (or D2D communication), base station communication 150c (e.g., relay, Integrated Access Backhaul (IAB)). Through wireless communication/connections 150a, 150b, 150c, the wireless device and the base station/wireless device, and the base station and the base station can transmit/receive radio signals to each other. For example, the wireless communication/connection 150a, 150b, 150c may transmit/receive signals through various physical channels. To this end, based on various proposals of the present disclosure, for transmitting/receiving radio signals, at least some of a process of configuring various configuration information, various signal processing processes (e.g., channel encoding/decoding, modulation/demodulation, resource mapping/demapping, etc.), and resource allocation process may be performed.

Figure 21:
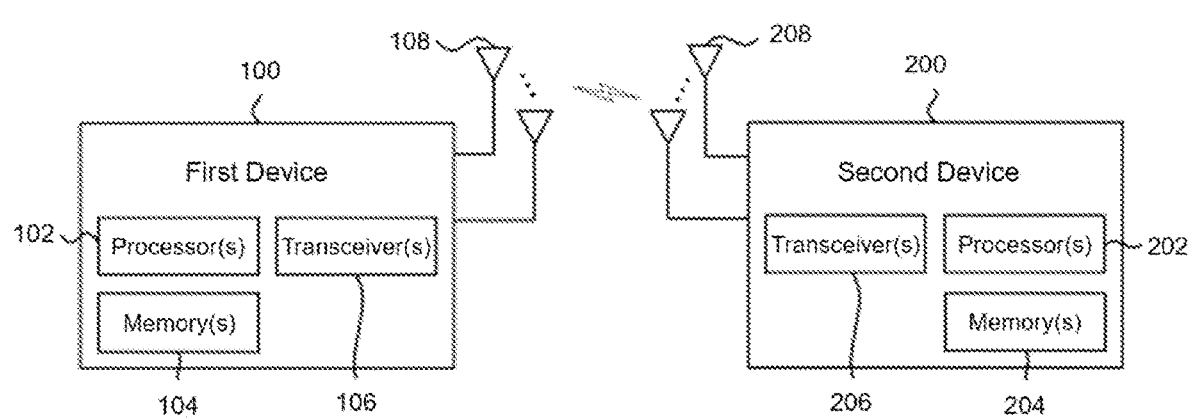

FIG. 21 illustrates a wireless device to which the present disclosure is applied.

In reference to FIG. 21, a first wireless device 100 and a second wireless device 200 may transmit and receive a wireless signal through a variety of radio access technologies (e.g., LTE, NR). Here, {first wireless device 100, second wireless device 200} may correspond to {wireless device 100x, base station 200} and/or {wireless device 100x, wireless device 100x} of FIG. 20.

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Figure 22:
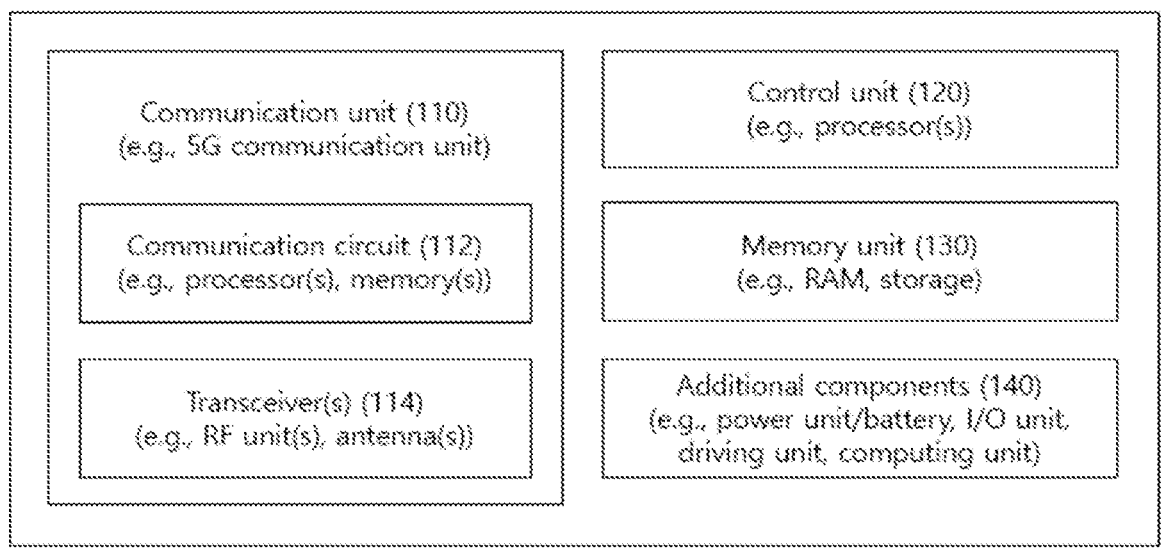

FIG. 22 illustrates another example of a wireless device to which the present disclosure is applied. Wireless devices can be implemented in various forms depending on use—examples/services. (See FIG. 20)

Referring to FIG. 22, the wireless devices 100 and 200 correspond to the wireless devices 100 and 200 of FIG. 21, and may be composed of various elements, components, units and/or modules. For example, the wireless devices 100 and 200 may include a communication unit 110, a control unit 120, a memory unit 130, and additional components 140. The communication unit may include a communication circuit 112 and a transceiver(s) 114. For example, the communication circuit 112 may include one or more processors 102 and 202 and/or one or more memories 104 and 204 of FIG. 21. For example, the transceiver(s) 114 may include one or more transceivers 106, 206 and/or one or more antennas 108, 208 of FIG. 21. The control unit 120 is electrically connected to the communication unit 110, the memory unit 130, and the additional components 140 and controls all operations of the wireless device. For example, the control unit 120 may control the electrical/mechanical operation of the wireless device based on the program/code/command/information stored in the memory unit 130. In addition, the control unit 120 may transmit the information stored in the memory unit 130 to an external (e.g., other communication device) through the communication unit 110 through a wireless/wired interface, or store information received through a wireless/wired interface from an external device (e.g., another communication device) through the communication unit 110 in the memory unit 130.

The additional components 140 may be variously configured according to the type of wireless device. For example, the additional components 140 may include at least one of a power unit/battery, a I/O unit, a driving unit, and a computing unit. Although not limited to this, the wireless device may be implemented in the form of a robot (FIG. 20, 100*a*), vehicles (FIG. 20, 100*b*-1, 100*b*-2), a XR device (FIG. 20, 100*c*), a mobile device (FIG. 20, 100*d*), an appliance (FIG. 20, 100*e*), an IoT device (FIG. 20, 100*f*), a digital broadcasting terminal, a hologram device, a public safety device, a MTC device, a medical device, a FinTech device (or financial device), a security device, a climate/environment device, an AI server/device (FIG. 20, 400), a base station (FIG. 20, 200), and a network node and the like. The wireless device may be used in a mobile or fixed place depending on the use—example/service.

In FIG. 22, various elements, components, units, and/or modules in the wireless devices 100 and 200 may be entirely interconnected through a wired interface, or at least some may be wirelessly connected through the communication unit 110. For example, in the wireless devices 100 and 200, the control unit 120 and the communication unit 110 may be connected by wire, and the control unit 120 and the first unit (e.g., 130, 140) may be connected wirelessly through the communication unit 110. In addition, each element, component, unit, and/or module in the wireless device 100 and 200 may further include one or more elements. For example, the control unit 120 may be composed of one or more processor sets. For example, the control unit 120 may be composed of a set of a communication control processor, an application processor, an electronic control unit (ECU), a graphic processing processor, and a memory control processor. As another example, the memory unit 130 may be composed of a random access memory (RAM), a dynamic RAM (DRAM), a read only memory (ROM), a flash memory, a volatile memory, and a non-volatile memory and/or a combination thereof.

Figure 23:
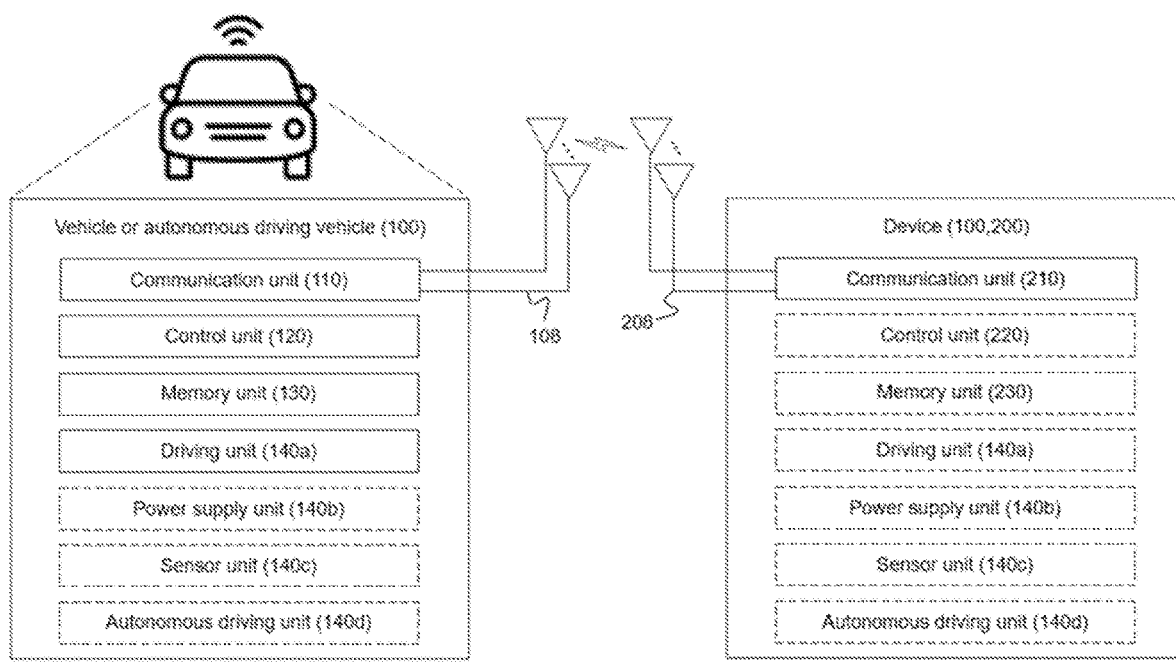

FIG. 23 illustrates a vehicle or an autonomous driving vehicle to which the present disclosure is applied. The vehicle or the autonomous driving vehicle may be implemented as a mobile robot, a vehicle, a train, an aerial vehicle (AV), a ship, and the like.

Referring to FIG. 23, the vehicle or the autonomous driving vehicle 100 may include an antenna unit 108, a communication unit 110, a control unit 120, a driving unit 140*a*, a power supply unit 140*b*, a sensor unit 140*c* and an autonomous driving unit 140*d*. The antenna unit 108 may be configured as a part of the communication unit 110. Blocks 110/130/140*a*-140*d* correspond to blocks 110/130/140 of FIG. 22, respectively.

The communication unit 110 may transmit and receive signals (e.g., data, control signals, etc.) with external devices such as other vehicles, base stations (e.g., base stations, roadside units, etc.), servers, and the like. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to run on the ground. The driving unit 140a may include an engine, a motor, a power train, a wheel, a brake, a steering device, and the like. The power supply unit 140b supplies power to the vehicle or the autonomous driving vehicle 100, and may include a wired/wireless charging circuit, a battery, and the like. The sensor unit 140c may obtain vehicle status, surrounding environment information, user information, and the like. The sensor unit 140c may include an inertial measurement unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed such as adaptive cruise control, a technology for automatically driving along a predetermined route, a technology for automatically setting a route when a destination is set, etc.

For example, the communication unit 110 may receive map data, traffic information data, and the like from an external server. The autonomous driving unit 140d may generate an autonomous driving route and a driving plan based on the acquired data. The control unit 120 may control the driving unit 140a to move the vehicle or the autonomous driving vehicle 100 along the autonomous driving path (e.g., speed/direction adjustment) according to the driving plan. During autonomous driving, the communication unit 110 may obtain the latest traffic information data from an external server aperiodically/periodically, and may acquire surrounding traffic information data from surrounding vehicles. Also, during autonomous driving, the sensor unit 140c may acquire vehicle state and surrounding environment information. The autonomous driving unit 140d may update the autonomous driving route and driving plan based on the newly acquired data/information. The communication unit 110 may transmit information about a vehicle location, an autonomous driving route, a driving plan, and the like to an external server. The external server may predict traffic information data in advance using AI technology or the like based on information collected from the vehicle or the autonomous driving vehicles, and may provide the predicted traffic information data to the vehicle or autonomous driving vehicles.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

The present disclosure can be used in a terminal, a base station, or other equipment of a wireless mobile communication system.

The invention claimed is:

1. A method of transmitting control information by a user equipment (UE) in a wireless communication system, the method comprising:
   receiving first downlink control information (DCI) for scheduling at least one physical downlink shared channel (PDSCH), wherein the first DCI includes a first PDSCH group index of one PDSCH group of two PDSCH groups and a value of a number of PDSCH groups for which acknowledgement/negative acknowledgement (A/N) feedback is required, and wherein a second PDSCH group index of the other one of the two PDSCH groups is determined based on the first PDSCH group index;
   receiving the at least one PDSCH, wherein each PDSCH belongs to one of the two PDSCH groups;
   receiving second DCI for scheduling a physical uplink shared channel (PUSCH), wherein the second DCI includes a single downlink assignment index (DAI) related to only one of the two PDSCH groups; and
   transmitting the control information including at least one of:
     first A/N codebook for one of the two PDSCH groups, or
     second A/N codebook for the other one of the two PDSCH groups,
   wherein, based on the control information including one of the first or second A/N codebooks which is related to a PDSCH group with the first PDSCH group index in the first DCI, the DAI is used to generate an A/N codebook in the control information, regardless of which PDSCH group index is indicated in the first DCI, and
   wherein, based on the control information including both the first and second A/N codebooks and the first DCI indicating a lowest value as the first PDSCH group index, the DAI is used to generate an A/N codebook for one of the two PDSCH groups with the first PDSCH group index.

2. The method of claim 1, wherein, based on A/N feedback for only one PDSCH group among the two PDSCH groups being requested by the value of a number of PDSCH groups in the first DCI, the control information includes only an A/N codebook which is related to a PDSCH group with the first PDSCH group index in the first DCI.

3. The method of claim 1, wherein, based on A/N feedback for the two PDSCH groups being requested by the value of a number of PDSCH groups in the first DCI, the control information includes both the first and second A/N codebooks.

4. The method of claim 1, wherein, based on the control information including both the first and second A/N codebooks, a size of an A/N codebook for a remaining PDSCH group among the two PDSCH groups is determined based on a total-DAI used for scheduling a PDSCH of corresponding PDSCH group.

5. The method of claim 1, wherein the control information is transmitted in an unlicensed band.

6. A user equipment (UE) used in a wireless communication system, the UE comprising:
at least one transceiver;
at least one processor; and
at least one computer memory operatively connected to the at least one processor and, when executed, causing the at least one processor to perform an operation, the operation comprising:
receiving first downlink control information (DCI) for scheduling at least one physical downlink shared channel (PDSCH), wherein the first DCI includes a first PDSCH group index of one PDSCH group of two PDSCH groups and a value of a number of PDSCH groups for which acknowledgement/negative acknowledgement (A/N) feedback is required, and wherein a second PDSCH group index of the other one of the two PDSCH groups is determined based on the first PDSCH group index;
receiving the at least one PDSCH, wherein each PDSCH belongs to one of the two PDSCH groups;
receiving second DCI for scheduling a physical uplink shared channel (PUSCH), wherein the second DCI includes a single downlink assignment index (DAI) related to only one of the two PDSCH groups; and
transmitting control information including at least one of:
first A/N codebook for one of the two PDSCH groups, or
second A/N codebook for the other one of the two PDSCH groups,
wherein, based on the control information including one of the first or second A/N codebooks which is related to a PDSCH group with the first PDSCH group index in the first DCI, the DAI is used to generate an A/N codebook in the control information, regardless of which PDSCH group index is indicated in the first DCI, and
wherein, based on the control information including both the first and second A/N codebooks and the first DCI indicating a lowest value as the first PDSCH group index, the DAI is used to generate an A/N codebook for one of the two PDSCH groups with the first PDSCH group index.

7. The UE of claim 6, wherein, based on A/N feedback for only one PDSCH group among the two PDSCH groups being requested by the value of a number of PDSCH groups in the first DCI, the control information includes only an A/N codebook which is related to a PDSCH group with the first PDSCH group index in the first DCI.

8. The UE of claim 6, wherein, based on A/N feedback for the two PDSCH groups being requested by the value of a number of PDSCH groups in the first DCI, the control information includes both the first and second A/N codebooks.

9. The UE of claim 6, wherein, based on the control information including both the first and second A/N codebooks, a size of an A/N codebook for a remaining PDSCH group among the two PDSCH groups is determined based on a total-DAI used for scheduling a PDSCH of corresponding PDSCH group.

10. The UE of claim 6, wherein the control information is transmitted in an unlicensed band.

11. A device for a user equipment (UE), the device comprising:
at least one processor; and
at least one computer memory operatively connected to the at least one processor and, when executed, causing the at least one processor to perform an operation, the operation comprising:
receiving first downlink control information (DCI) for scheduling at least one physical downlink shared channel (PDSCH), wherein the first DCI includes a first PDSCH group index of one PDSCH group of two PDSCH groups and a value of a number of PDSCH groups for which acknowledgement/negative acknowledgement (A/N) feedback is required, and wherein a second PDSCH group index of the other one of the two PDSCH groups is determined based on the first PDSCH group index;
receiving the at least one PDSCH, wherein each PDSCH belongs to one of the two PDSCH groups;
receiving second DCI for scheduling a physical uplink shared channel (PUSCH), wherein the second DCI includes a single downlink assignment index (DAI) related to only one of the two PDSCH groups; and
transmitting control information including at least one of:
first A/N codebook for one of the two PDSCH groups, or
second A/N codebook for the other one of the two PDSCH groups,
wherein, based on the control information including one of the first or second A/N codebooks which is related to a PDSCH group with the first PDSCH group index in the first DCI, the DAI is used to generate an A/N codebook in the control information, regardless of which PDSCH group index is indicated in the first DCI, and
wherein, based on the control information including both the first and second A/N codebooks and the first DCI indicating a lowest value as the first PDSCH group index, the DAI is used to generate an A/N codebook for one of the two PDSCH groups with the first PDSCH group index.

12. The device of claim 11, wherein, based on A/N feedback for only one PDSCH group among the two PDSCH groups being requested by the value of a number of PDSCH groups in the first DCI, the control information includes only an A/N codebook which is related to a PDSCH group with the first PDSCH group index in the first DCI.

13. The device of claim 11, wherein, based on A/N feedback for the two PDSCH groups being requested by the value of a number of PDSCH groups in the first DCI, the control information includes both the first and second A/N codebooks.

14. The device of claim 11, wherein, based on the control information including both the first and second A/N codebooks, a size of an A/N codebook for a remaining PDSCH group among the two PDSCH groups is determined based on a total-DAI used for scheduling a PDSCH of corresponding PDSCH group.

15. The device of claim 11, wherein the control information is transmitted in an unlicensed band.

16. A method of receiving control information by a base station in a wireless communication system, the method comprising:
transmitting first downlink control information (DCI) for scheduling at least one physical downlink shared channel (PDSCH), wherein the first DCI includes a first PDSCH group index of one PDSCH group of two PDSCH groups and a value of a number of PDSCH groups for which acknowledgement/negative acknowledgement (A/N) feedback is required, and wherein a second PDSCH group index of the other one of the two PDSCH groups is determined based on the first PDSCH group index;

transmitting the at least one PDSCH, wherein each PDSCH belongs to one of the two PDSCH groups;

transmitting second DCI for scheduling a physical uplink shared channel (PUSCH), wherein the second DCI includes a single downlink assignment index (DAI) related to only one of the two PDSCH groups; and receiving the control information including at least one of:
   first A/N codebook for one of the two PDSCH groups, or
   second A/N codebook for the other one of the two PDSCH groups, wherein, based on the control information including one of the first or second A/N codebooks which is related to a PDSCH group with the first PDSCH group index in the first DCI, the DAI is used to generate an A/N codebook in the control information, regardless of which PDSCH group index is indicated in the first DCI, and wherein, based on the control information including both the first and second A/N codebooks and the first DCI indicating a lowest value as the first PDSCH group index, the DAI is used to generate an A/N codebook for one of the two PDSCH groups with the first PDSCH group index.

* * * * *